US010627813B2

(12) United States Patent
Tsuji et al.

(10) Patent No.: US 10,627,813 B2
(45) Date of Patent: Apr. 21, 2020

(54) INFORMATION PROCESSING SYSTEM, INFORMATION PROCESSING METHOD, AND PROGRAM

(71) Applicant: PANASONIC INTELLECTUAL PROPERTY MANAGEMENT CO., LTD., Osaka (JP)

(72) Inventors: Masanaga Tsuji, Osaka (JP); Toshiya Mori, Osaka (JP); Koichi Emura, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 288 days.

(21) Appl. No.: 15/567,791

(22) PCT Filed: Apr. 21, 2016

(86) PCT No.: PCT/JP2016/002124
§ 371 (c)(1),
(2) Date: Oct. 19, 2017

(87) PCT Pub. No.: WO2016/170785
PCT Pub. Date: Oct. 27, 2016

(65) Prior Publication Data
US 2018/0052458 A1 Feb. 22, 2018

(30) Foreign Application Priority Data

Apr. 21, 2015 (JP) .................................. 2015-087069
May 14, 2015 (JP) .................................. 2015-099474
(Continued)

(51) Int. Cl.
*G05D 1/00* (2006.01)
*B60W 50/14* (2020.01)
(Continued)

(52) U.S. Cl.
CPC ........... *G05D 1/0061* (2013.01); *B60K 35/00* (2013.01); *B60K 37/06* (2013.01); *B60W 10/06* (2013.01);
(Continued)

(58) Field of Classification Search
None
See application file for complete search history.

(56) References Cited

U.S. PATENT DOCUMENTS 8,269,617 B2 * 9/2012 Cook ..................... G07C 5/085
340/439
8,718,861 B1 * 5/2014 Montemerlo ......... B60W 30/00
701/26
(Continued)

FOREIGN PATENT DOCUMENTS

DE 102011121948 A1 6/2013
EP 2669109 A1 12/2013
(Continued)

OTHER PUBLICATIONS

International Search Report (ISR) in International Pat. Appl. No. PCT/JP2016/002124, dated Jul. 26, 2016.
(Continued)

*Primary Examiner* — Jonathan M Dager
(74) *Attorney, Agent, or Firm* — Greenblum & Bernstein, P.L.C.

(57) ABSTRACT

An information processing system capable of estimating a driving conduct suited to a driver includes: a history obtainer that obtains a personal driving environment history of each of a plurality of drivers, each of the personal driving environment histories indicating one or more vehicle behaviors selected by the driver, and a driving environment associated with each of the one or more behaviors, the driving environment being a driving environment of the
(Continued)

vehicle at a point in time of selection of the behavior it is associated with; and a modeler that models, from a driving environment history including the personal driving environment histories of the plurality of drivers, the personal driving environment history of at least one of the plurality of drivers, to build a driver model indicating a relationship between a behavior and a driving environment for the vehicle of the at least one of the plurality of drivers.

14 Claims, 41 Drawing Sheets

(30) Foreign Application Priority Data

| | | |
|---|---|---|
| Jun. 12, 2015 | (JP) | 2015-119139 |
| Jan. 28, 2016 | (JP) | 2016-014950 |

(51) Int. Cl.

| | |
|---|---|
| G08G 1/16 | (2006.01) |
| B60W 30/12 | (2020.01) |
| B60W 30/18 | (2012.01) |
| B60W 40/09 | (2012.01) |
| B60K 35/00 | (2006.01) |
| B60W 10/06 | (2006.01) |
| B60W 10/18 | (2012.01) |
| B60W 10/20 | (2006.01) |
| B60K 37/06 | (2006.01) |
| B60W 30/14 | (2006.01) |
| B60W 30/16 | (2020.01) |
| G05D 1/02 | (2020.01) |
| B60W 50/00 | (2006.01) |

(52) U.S. Cl.
CPC ............ *B60W 10/18* (2013.01); *B60W 10/20* (2013.01); *B60W 30/12* (2013.01); *B60W 30/143* (2013.01); *B60W 30/16* (2013.01); *B60W 30/18154* (2013.01); *B60W 30/18163* (2013.01); *B60W 40/09* (2013.01); *B60W 50/14* (2013.01); *G05D 1/021* (2013.01); *G08G 1/16* (2013.01); *B60K 2370/1438* (2019.05); *B60K 2370/166* (2019.05); *B60K 2370/175* (2019.05); *B60W 2050/007* (2013.01); *B60W 2050/0029* (2013.01); *B60W 2050/0089* (2013.01); *B60W 2050/146* (2013.01); *B60W 2520/10* (2013.01); *B60W 2540/04* (2013.01); *B60W 2540/30* (2013.01); *B60W 2550/14* (2013.01); *B60W 2550/20* (2013.01); *B60W 2720/10* (2013.01); *B60W 2720/106* (2013.01); *B60W 2750/308* (2013.01); *G05D 2201/0213* (2013.01)

(56) References Cited

U.S. PATENT DOCUMENTS

| | | | | |
|---|---|---|---|---|
| 9,165,477 | B2 * | 10/2015 | Wilson | G08G 1/0112 |
| 9,283,968 | B2 * | 3/2016 | Yamada | B60W 50/0098 |
| 9,373,203 | B1 * | 6/2016 | Fields | G07C 5/12 |
| 9,558,662 | B2 * | 1/2017 | Nomoto | G08G 1/096775 |
| 9,776,639 | B2 * | 10/2017 | Liu | B60C 23/00 |
| 10,040,453 | B2 * | 8/2018 | Gaither | B60W 50/0097 |
| 10,054,457 | B2 * | 8/2018 | Takahara | G01C 21/3484 |
| 10,077,056 | B1 * | 9/2018 | Fields | G06Q 40/08 |
| 10,223,479 | B1 * | 3/2019 | Konrardy | G06F 17/5009 |
| 10,252,726 | B2 * | 4/2019 | Emura | B60K 37/06 |
| 10,303,176 | B2 * | 5/2019 | Miller | G01C 21/3492 |
| 10,317,906 | B2 * | 6/2019 | Ferguson | G06K 9/00798 |
| 10,358,129 | B2 * | 7/2019 | Payne | B60W 50/085 |
| 10,406,438 | B2 * | 9/2019 | Catlin | A63F 13/56 |
| 10,416,670 | B1 * | 9/2019 | Fields | B60W 50/14 |
| 2009/0082917 | A1 * | 3/2009 | Adachi | G08G 1/0104 701/420 |
| 2009/0234552 | A1 | 9/2009 | Takeda et al. | |
| 2010/0030582 | A1 * | 2/2010 | Rippel | G06Q 40/08 705/4 |
| 2012/0022764 | A1 * | 1/2012 | Tang | B60W 10/06 701/102 |
| 2012/0083964 | A1 * | 4/2012 | Montemerlo | G05D 1/0214 701/26 |
| 2012/0191343 | A1 * | 7/2012 | Haleem | G01C 21/3697 701/431 |
| 2013/0096731 | A1 * | 4/2013 | Tamari | G08G 1/0129 701/1 |
| 2013/0179023 | A1 | 7/2013 | Schmidt | |
| 2013/0302756 | A1 | 11/2013 | Takeuchi et al. | |
| 2014/0330478 | A1 * | 11/2014 | Cullinane | B60W 50/082 701/23 |
| 2015/0006132 | A1 * | 1/2015 | Matsumura | G08G 1/0112 703/2 |
| 2015/0254986 | A1 * | 9/2015 | Fairfield | G08G 1/22 707/687 |
| 2015/0291146 | A1 * | 10/2015 | Prakah-Asante | B60W 10/06 701/37 |
| 2015/0314780 | A1 * | 11/2015 | Stenneth | B60W 30/00 701/23 |
| 2016/0046170 | A1 * | 2/2016 | Lu | B60W 40/076 701/48 |
| 2016/0231743 | A1 * | 8/2016 | Bendewald | B60W 50/0097 |
| 2017/0148311 | A1 * | 5/2017 | Kashiwakura | G08G 1/096716 |
| 2017/0168484 | A1 * | 6/2017 | Knorr | G05D 1/0061 |
| 2018/0032072 | A1 * | 2/2018 | Hoye | G05D 1/0061 |
| 2018/0074497 | A1 * | 3/2018 | Tsuji | B60W 30/182 |
| 2018/0093676 | A1 * | 4/2018 | Emura | B60K 37/06 |
| 2018/0105185 | A1 * | 4/2018 | Watanabe | G08G 1/0962 |
| 2018/0113470 | A1 * | 4/2018 | Iagnemma | G05D 1/0088 |
| 2018/0148036 | A1 * | 5/2018 | Gaither | B60W 20/12 |
| 2018/0151066 | A1 * | 5/2018 | Oba | G08G 1/096725 |
| 2018/0194280 | A1 * | 7/2018 | Shibata | A61B 5/18 |
| 2018/0194349 | A1 * | 7/2018 | McGill, Jr. | G05B 13/026 |
| 2018/0322783 | A1 * | 11/2018 | Toyoda | G06T 13/80 |
| 2019/0049981 | A1 * | 2/2019 | Fischer | G05D 1/024 |
| 2019/0102840 | A1 * | 4/2019 | Perl | G06N 3/08 |
| 2019/0186936 | A1 * | 6/2019 | Ebner | G06N 20/00 |
| 2019/0241198 | A1 * | 8/2019 | Mori | B60W 40/02 |
| 2019/0265712 | A1 * | 8/2019 | Satzoda | G05D 1/0088 |
| 2019/0271981 | A1 * | 9/2019 | Oba | B60W 50/08 |

FOREIGN PATENT DOCUMENTS

| | | |
|---|---|---|
| JP | 2002-140786 | 5/2002 |
| JP | 2004-034917 A | 2/2004 |
| JP | 3583873 B2 | 11/2004 |
| JP | 2005-067483 | 3/2005 |
| JP | 2007-176396 | 7/2007 |
| JP | 2007-198853 | 8/2007 |
| JP | 2009-205646 | 9/2009 |
| JP | 2009-234442 | 10/2009 |
| JP | 2009-237937 | 10/2009 |
| JP | 2010-211380 | 9/2010 |
| JP | 2012-051441 | 3/2012 |
| JP | 2012-113631 | 6/2012 |
| JP | 2013-030188 | 2/2013 |
| JP | 2013-117809 | 6/2013 |
| JP | 2013-149154 | 8/2013 |
| JP | 2015-203876 | 11/2015 |
| WO | 2007/077867 | 7/2007 |
| WO | 2015/049231 A1 | 4/2015 |

OTHER PUBLICATIONS

The Extended European Search Report dated Mar. 6, 2018 for the European Patent Application No. 16782788.0.

(56) References Cited

OTHER PUBLICATIONS

The Extended European Search Report dated May 9, 2018 for the European Patent Application No. 16782797.1.

\* cited by examiner

FIG. 16

| DRIVING ENVIRONMENT | NEARING MERGING REGION | | | SLOW VEHICLE AHEAD | | | ... |
|---|---|---|---|---|---|---|---|
| BEHAVIOR | DECELERATE | ACCELERATE | CHANGE LANES | FOLLOW | OVERTAKE | CHANGE LANES | ... |
| DRIVER x | 3 | 1 | 5 | 2 | 2 | 1 | ... |
| DRIVER y | 9 | 1 | 2 | 0 | 0 | 0 | ... |

FIG. 17

| | DRIVING ENVIRONMENT | NEARING MERGING REGION | | | SLOW VEHICLE AHEAD | | | ... |
|---|---|---|---|---|---|---|---|---|
| | BEHAVIOR | DECELERATE | ACCELERATE | CHANGE LANES | FOLLOW | OVERTAKE | CHANGE LANES | ... |
| MODEL A | DRIVER a | 3 | 1 | 5 | 1 | 1 | 5 | ... |
| MODEL A | DRIVER b | 4 | 2 | 7 | 2 | 0 | 3 | ... |
| MODEL A | DRIVER c | 3 | 2 | 2 | 1 | 2 | 8 | ... |
| MODEL B | DRIVER d | 5 | 2 | 2 | 5 | 2 | 2 | ... |
| MODEL B | DRIVER e | 7 | 2 | 2 | 5 | 0 | 3 | ... |
| MODEL B | DRIVER f | 5 | 2 | 5 | 4 | 1 | 1 | ... |
| | ... | ... | ... | ... | ... | ... | ... | ... |

FIG. 18

| DRIVING ENVIRONMENT | NEARING MERGING REGION | | | SLOW VEHICLE AHEAD | | | ... |
|---|---|---|---|---|---|---|---|
| BEHAVIOR | DECELERATE | ACCELERATE | CHANGE LANES | FOLLOW | OVERTAKE | CHANGE LANES | ... |
| MODEL A | 3.3 | 1.7 | 4.6 | 1.3 | 1 | 5.3 | ... |
| MODEL B | 5.7 | 2 | 3 | 4.7 | 1 | 2 | ... |

FIG. 19

| DRIVING ENVIRONMENT | NEARING MERGING REGION | SLOW VEHICLE AHEAD | ... |
|---|---|---|---|
| MODEL A | CHANGE LANES | CHANGE LANES | ... |
| MODEL B | DECELERATE | FOLLOW | ... |

FIG. 20

| | DRIVING ENVIRONMENT | NEARING MERGING REGION | | | SLOW VEHICLE AHEAD | | | ... |
|---|---|---|---|---|---|---|---|---|
| | BEHAVIOR | DECELERATE | ACCELERATE | CHANGE LANES | FOLLOW | OVERTAKE | CHANGE LANES | ... |
| | DRIVER a | 3 | 1 | 5 | 1 | 1 | 5 | ... |
| | DRIVER b | 4 | 2 | 7 | 2 | 0 | 3 | ... |
| MODEL FOR DRIVER y ⇐ | DRIVER c | 3 | 2 | 2 | 1 | 2 | 8 | ... |
| MODEL FOR DRIVER y ⇐ | DRIVER d | 5 | 2 | 2 | 5 | 2 | 2 | ... |
| MODEL FOR DRIVER y ⇐ | DRIVER e | 7 | 2 | 2 | 5 | 0 | 3 | ... |
| | DRIVER f | 5 | 2 | 5 | 4 | 1 | 1 | ... |
| | ... | ... | ... | ... | ... | ... | ... | ... |

FIG. 21

| DRIVING ENVIRONMENT | NEARING MERGING REGION | | | SLOW VEHICLE AHEAD | | | ... |
|---|---|---|---|---|---|---|---|
| BEHAVIOR | DECELERATE | ACCELERATE | CHANGE LANES | FOLLOW | OVERTAKE | CHANGE LANES | ... |
| MODEL FOR DRIVER y | 5 | 2 | 2 | 3.7 | 1.3 | 4.3 | ... |

FIG. 22

| | BEHAVIOR | PASSENGERS | SPEED | STEERING WHEEL | BRAKE | ACCELERATOR | ... | COUNT |
|---|---|---|---|---|---|---|---|---|
| DRIVER x | CHANGE LANES | NONE | 8 | 4 | 6 | 8 | ... | 80 |
| | | ADULTS: 1 CHILDREN: 2 | 3 | 3 | 4 | 3 | ... | 40 |
| | | ADULTS: 1 | 5 | 7 | 5 | 5 | ... | 60 |
| | | ... | ... | ... | ... | ... | ... | ... |
| | OVERTAKE | ... | ... | ... | ... | ... | ... | ... |
| | ... | ... | ... | ... | ... | ... | ... | ... |
| DRIVER y | CHANGE LANES | ... | ... | ... | ... | ... | ... | ... |
| | OVERTAKE | ... | ... | ... | ... | ... | ... | ... |
| | ... | ... | ... | ... | ... | ... | ... | ... |
| ... | ... | ... | ... | ... | ... | ... | ... | ... |

FIG. 27

DRIVER x

| HISTORY | BEHAVIOR | HOST VEHICLE INFORMATION | LEADING VEHICLE INFORMATION | | ENVIRONMENT PARAMETERS ADJACENT LANE INFORMATION | | | | | | | MERGE LANE INFORMATION | | | POSITIONAL INFORMATION | | |
|---|---|---|---|---|---|---|---|---|---|---|---|---|---|---|---|---|
| | | | | | DIAGONALLY REARWARD VEHICLE | | | DIAGONALLY FORWARD VEHICLE | | | | | | | | |
| | | $V_a$ | $V_{ba}$ | $DR_{ba}$ | $RS_b$ | $V_{ca}$ | $D_{ca}$ | $R_{ca}$ | $V_{da}$ | $D_{da}$ | $R_{da}$ | $DR_{da}$ | $V_{ma}$ | $D_{ma}$ | $R_{ma}$ | DRIVING LANES | DISTANCE UNTIL MERGING POINT | |
| (a) | DECELERATE | 4 | 1 | 2 | 5 | 4 | 2 | 2 | 3 | 3 | 1 | 3 | 0 | 0 | 0 | 2 | 0 | ... |
| (b) | CHANGE LANES | 3 | 2 | 5 | 4 | 2 | 2 | 1 | 0 | 0 | 0 | 10 | 1 | 2 | 3 | 1 | 4 | ... |
| (c) | DECELERATE | 3 | 2 | 5 | 4 | 3 | 1 | 3 | 3 | 1 | 3 | 2 | 2 | 2 | 2 | 1 | 4 | ... |
| ... | | ... | ... | ... | ... | ... | ... | ... | ... | ... | ... | ... | ... | ... | ... | ... | ... | ... |

| BEHAVIOR | ENVIRONMENT PARAMETERS | | | | | | | | | | | | |
|---|---|---|---|---|---|---|---|---|---|---|---|---|---|
| | HOST VEHICLE INFORMATION | LEADING VEHICLE INFORMATION | | ADJACENT LANE INFORMATION | | | | | | MERGE LANE INFORMATION | | POSITIONAL INFORMATION | |
| | | | | DIAGONALLY REARWARD VEHICLE | | | DIAGONALLY FORWARD VEHICLE | | | | | | |
| | Va | Vba | DRba | RSb | Vca | Dca | Rca | Vda | Dda | Rda | DRda | Vma | Dma | Rma | DRIVING LANES | DISTANCE UNTIL MERGING POINT |
| ??? | 3 | 3 | 5 | 4 | 1 | 2 | 1 | 0 | 0 | 0 | 9 | 1 | 2 | 3 | 1 | 4 |
| ... | ... | ... | ... | ... | ... | ... | ... | ... | ... | ... | ... | ... | ... | ... | ... | ... |

(b)

| HISTORY | BEHAVIOR | ENVIRONMENT PARAMETERS | | | | | | | | | | | | |
|---|---|---|---|---|---|---|---|---|---|---|---|---|---|---|
| | | HOST VEHICLE INFORMATION | LEADING VEHICLE INFORMATION | | ADJACENT LANE INFORMATION | | | | | | MERGE LANE INFORMATION | | POSITIONAL INFORMATION | |
| | | | | | DIAGONALLY REARWARD VEHICLE | | | DIAGONALLY FORWARD VEHICLE | | | | | | |
| | | Va | Vba | DRba | RSb | Vca | Dca | Rca | Vda | Dda | Rda | DRda | Vma | Dma | Rma | DRIVING LANES | DISTANCE UNTIL MERGING POINT |
| (d) | DECELERATE | 4 | 1 | 2 | 5 | 4 | 2 | 2 | 3 | 3 | 1 | 3 | 0 | 0 | 0 | 1 | 0 |
| (e) | CHANGE LANES | 3 | 2 | 5 | 4 | 2 | 2 | 1 | 0 | 0 | 0 | 10 | 1 | 2 | 3 | 1 | 4 |
| (f) | DECELERATE | 3 | 2 | 5 | 4 | 3 | 1 | 3 | 3 | 1 | 3 | 2 | 2 | 2 | 2 | 1 | 4 |
| ... | ... | ... | ... | ... | ... | ... | ... | ... | ... | ... | ... | ... | ... | ... | ... | ... | ... |

FIG. 37

SPEED DB

| DRIVER ID | ENVIRONMENT PARAMETERS ||||||| | SPEED [km/h] |
| | ① | ② | ③ | ④ | ⑤ | ⑥ | ⑦ | ... | |
|---|---|---|---|---|---|---|---|---|---|
| 0001 | 0.1 | 0.2 | 0.5 | 0.0 | 1.0 | 0.0 | 0.3 | ... | 70 |
| 0002 | 0.5 | 0.1 | 0.4 | 0.1 | 0.2 | 0.5 | 0.0 | ... | 68 |
| 0003 | 1.0 | 0.5 | 0.0 | 0.0 | 0.0 | 0.1 | 0.7 | ... | 30 |
| 0004 | 1.0 | 1.0 | 0.1 | 0.2 | 0.5 | 0.0 | 0.1 | ... | 52 |

...

INTER-VEHICLE DISTANCE DB

| DRIVER ID | ENVIRONMENT PARAMETERS ||||||| | INTER-VEHICLE DISTANCE [m] |
| | ① | ② | ③ | ④ | ⑤ | ⑥ | ⑦ | ... | |
|---|---|---|---|---|---|---|---|---|---|
| 0001 | 0.1 | 0.2 | 0.5 | 0.0 | 1.0 | 0.0 | 0.3 | ... | 60 |
| 0002 | 0.5 | 0.1 | 0.4 | 0.1 | 0.2 | 0.5 | 0.0 | ... | 100 |
| 0003 | 1.0 | 0.5 | 0.0 | 0.0 | 0.0 | 0.1 | 0.7 | ... | 32 |
| 0004 | 1.0 | 1.0 | 0.1 | 0.2 | 0.5 | 0.0 | 0.1 | ... | 90 |

ACCELERATION RATE PATTERN DB

| DRIVER ID | ENVIRONMENT PARAMETERS | | | | | | | | PATTERN |
|---|---|---|---|---|---|---|---|---|---|
| | ① | ② | ③ | ④ | ⑤ | ⑥ | ⑦ | ... | |
| 0001 | 0.1 | 0.2 | 0.5 | 0.0 | 1.0 | 0.0 | 0.3 | ... | A |
| 0002 | 0.5 | 0.1 | 0.4 | 0.1 | 0.2 | 0.5 | 0.0 | ... | A |
| 0003 | 1.0 | 0.5 | 0.0 | 0.0 | 0.0 | 0.1 | 0.7 | ... | C |
| 0004 | 1.0 | 1.0 | 0.1 | 0.2 | 0.5 | 0.0 | 0.1 | ... | B |
| ... | | | | | | | | | |

FIG. 43

| VEHICLE ID | SITUATION DESCRIPTION PARAMETERS (FEATURE AMOUNTS) | | | | | | | DEPRESSION AMOUNT (BEHAVIOR) |
|---|---|---|---|---|---|---|---|---|
| | VEHICLE TYPE ID | ACCELERATION RATE [m/s²] | SPEED [km/h] | ROAD CONDITION(*) | GRADIENT [%] | WIND SPEED [m/s] | WEIGHT [kg] | ... |
| A | 001 | 0.5 | 10 | 1 | 3.0 | 5.0 | 60 | | 0.5 |
| A | 001 | 0.3 | 15 | 0 | 0 | 4.0 | 120 | | 0.3 |
| B | 003 | 0.1 | 30 | 0 | -0.5 | 0.0 | 150 | | 0.7 |
| B | 003 | 0.1 | 31 | 2 | 0.3 | 1.0 | 100 | | 0.1 |

(*) ROAD CONDITION – 0: NOT SLIPPERY; 1: WET, SLIGHTLY SLIPPERY; 2: FROZEN, SLIPPERY

FIG. 46

| DRIVER ID | ENVIRONMENT PARAMETERS ||||| RISK |
| --- | --- | --- | --- | --- | --- | --- |
| | SPEED | LEADING VEHICLE INTER-VEHICLE DISTANCE | LEADING VEHICLE RELATIVE RATE OF CHANGE | FRONT-LEFT VEHICLE INTER-VEHICLE DISTANCE | FRONT-LEFT VEHICLE RELATIVE RATE OF CHANGE | ... |
| 0001 | 60 | 20 | 1.5 | 50 | -0.3 | REAR-END COLLISION |
| 0001 | 50 | — | — | 60 | 0 | LANE DEPARTURE |
| 0001 | 40 | 50 | 1.5 | 30 | 0 | CONTACT WITH BACK-RIGHT VEHICLE |

INFORMATION PROCESSING SYSTEM, INFORMATION PROCESSING METHOD, AND PROGRAM

TECHNICAL FIELD

The present invention relates to an information processing system, an information processing method, and a program for processing information related to a vehicle.

BACKGROUND ART

In recent years, various techniques have been presented relating to vehicles capable of both manual driving in which a driving operation is performed by the driver and autonomous driving in which a driving operation is partially or completely performed autonomously based on the surroundings of the vehicle and/or the driving state of the vehicle (for example, control information on the speed, steering, accelerator, brake, turn signals, and/or an actuator of the vehicle), and fully autonomous vehicles.

For example, Patent Literature (PTL) 1 discloses a driving control device that allows the driver to visually recognize the activation state of the autonomous steering control mode and/or autonomous acceleration/deceleration control when the vehicle switches to autonomous steering control mode and/or autonomous acceleration/deceleration control.

CITATION LIST

Patent Literature

PTL 1: Japanese Unexamined Patent Application Publication No. 2005-67483

SUMMARY OF THE INVENTION

Technical Problem

However, with the driving control device (i.e., information processing system) according to PTL 1, there is a problem that it is difficult to estimate a driving operation suited to the driver. Note that "driving operation" is also referred to as "driving conduct" or "behavior".

In light of this, the present invention provides, for example, an information processing system capable of estimating a driving conduct suited to the driver.

Solutions to Problem

An information processing system according to one aspect of the present invention includes: a history obtainer that obtains a personal driving environment history of each of a plurality of drivers, each of the personal driving environment histories indicating one or more behaviors, of a vehicle, selected by the driver, and a driving environment associated with each of the one or more behaviors, the driving environment being a driving environment of the vehicle at a point in time of selection of the behavior it is associated with; and a modeler that models, from a driving environment history including the personal driving environment histories of the plurality of drivers, the personal driving environment history of at least one of the plurality of drivers, to build a driver model indicating a relationship between a behavior and a driving environment for the vehicle of the at least one of the plurality of drivers. For example, the information processing system further includes an environment obtainer that obtains a driving environment of a vehicle of a driver that is a target for estimation; and a behavior estimation unit configured to, in the driver model built, estimate a behavior associated with the driving environment obtained by the environment obtainer, as a behavior of the vehicle of the driver that is the target for estimation.

This makes it possible to appropriately estimate a behavior of the vehicle of the driver that is a target for estimation even when the personal driving environment history of the driver that is the target for estimation is not sufficient for behavior estimation, since the behavior of the vehicle of the driver that is the target for estimation is estimated using a driver model. In other words, a driving conduct suited to the driver can be estimated.

Moreover, the modeler may model similar personal driving environment histories included in the driving environment history for each group of the similar personal driving environment histories, to build the driver model indicating a relationship between a behavior and a driving environment for the vehicle for each model driver. The behavior estimation unit may be configured to: select, from the driver model, a model driver having a relationship, between a behavior and a driving environment, that is similar to the personal driving environment history of the driver that is the target for estimation; and estimate, in the relationship between the behavior and the driving environment of the model driver selected, a behavior associated with the driving environment obtained by the environment obtainer, as a behavior of the vehicle of the driver that is the target for estimation.

With this, since a model driver having a behavior-driving environment relationship that is similar to the personal driving environment history of the driver that is a target for estimation is selected and a behavior of the vehicle of the driver that is the target for estimation is estimated by using the model driver's relationship, a behavior (i.e., driving conduct) that is more suited to the driver can be estimated.

Moreover, each of the personal driving environment histories of the plurality of drivers may indicate, on a per driving environment basis, a frequency of selection of each of predetermined one or more behaviors in the driving environment, and the modeler, on a per driving environment basis, for each of the predetermined one or more behaviors, may average the frequency of selection of each of the predetermined one or more behaviors indicated in the similar personal driving environment histories, to model the similar personal driving environment histories.

This makes it possible to easily and appropriate perform modeling.

Moreover, the modeler may model, from the driving environment history, a plurality of personal driving environment histories that are similar to the personal driving environment history of the driver that is the target for estimation, to build the driver model corresponding to the driver that is the target for estimation.

With this, since, in the driving environment history, a plurality of personal driving environment histories that are similar to the personal driving environment history of the driver that is a target for estimation are modeled, it is possible to estimate a behavior (i.e., driving conduct) that is more suited to the driver.

Moreover, each of the personal driving environment histories of the plurality of drivers may indicate the driving environment of the vehicle at the point in time of selection of the behavior it is associated with, as a first parameter set, the first parameter set being a parameter set including each value of at least one environment parameter. The modeler may model the value of each environment parameter included in the first parameter set indicated in the personal driving environment history of the at least one of the plurality of drivers, to build the driver model indicating a relationship between a behavior and the first parameter set for the vehicle of the at least one of the plurality of drivers. The environment obtainer may obtain the driving environment of the vehicle of the driver that is the target for estimation as a parameter set. The behavior estimation unit may be configured to, in the driver model built, estimate a behavior associated with the first parameter set that is similar to the parameter set obtained by the environment obtainer, as a behavior of the vehicle of the driver that is the target for estimation.

With this, since the driving environment is expressed as parameters, it is possible to segment the driving environment, and thus possible to estimate a behavior (i.e. driving conduct) corresponding to the driving environment not matter what the driving environment is.

Moreover, the information processing system may further include a display unit configured to display a behavior candidate. Each of the personal driving environment histories of the plurality of drivers may further indicate, for each behavior, of the vehicle, selected by the driver, a second parameter set in association with a corresponding behavior, as a driving environment at the time the corresponding behavior was displayed as the behavior candidate, the second parameter set being a parameter set including each value of at least one environment parameter. The modeler may model the value of each environment parameter included in the first parameter set and the value of each environment parameter included in the second parameter set indicated in the personal driving environment history of the at least one of the plurality of drivers, to build the driver model indicating a relationship between a behavior, the first parameter set, and the second parameter set for the vehicle of the at least one of the plurality of drivers. The behavior estimation unit may be configured to, in the driver model built, estimate a behavior associated with the first parameter set or the second parameter set that is similar to the parameter set obtained by the environment obtainer, as a behavior of the vehicle of the driver that is the target for estimation.

This makes it possible to estimate a more appropriate behavior (i.e., driving conduct) in advance.

Moreover, the behavior estimation unit may be configured to, in the driver model built, preferentially estimate a behavior associated with the first parameter set that is similar to the parameter set obtained by the environment obtainer, as a behavior of the vehicle of the driver that is the target for estimation.

This makes it possible to appropriately perform the processing for behavior estimation.

Moreover, the personal driving environment history may indicate driving at one or more types of speeds as the one or more behaviors. The environment obtainer may obtain, as a parameter set, the driving environment of the vehicle of the driver that is the target for estimation, at a time the vehicle is driving at an acceleration rate in a predetermined range including zero, continuously for a first period of time. The behavior estimation unit may be configured to, in the driver model built, estimate driving at a speed associated with the first parameter set that is similar to the parameter set obtained by the environment obtainer, as a behavior of the vehicle of the driver that is the target for estimation. The information processing system may further include a vehicle controller that controls the vehicle to cause the vehicle to drive at the speed estimated by the behavior estimation unit.

This makes it possible to cause the vehicle to drive at a speed that is both in accordance with the driving environment and suited to the driver.

Moreover, the personal driving environment history may indicate driving at one or more types of inter-vehicle distances as the one or more behaviors. The environment obtainer may obtain, as a parameter set, the driving environment of the vehicle of the driver that is the target for estimation, at a time an amount of change per unit time in inter-vehicle distance between the vehicle and another vehicle is within a predetermined range including zero, continuously for a second period of time. The behavior estimation unit may configured to, in the driver model built, estimate driving at an inter-vehicle distance associated with the first parameter set that is similar to the parameter set obtained by the environment obtainer, as a behavior of the vehicle of the driver that is the target for estimation. The information processing system may further include a vehicle controller that controls the vehicle to cause the vehicle of the driver that is the target for estimation to drive at the inter-vehicle distance estimated by the behavior estimation unit.

This makes it possible to cause the vehicle to drive at an inter-vehicle distance that is both in accordance with the driving environment and suited to the driver.

Moreover, the personal driving environment history may indicate driving at one or more types of acceleration rate patterns as the one or more behaviors. The environment obtainer may obtain, as a parameter set, the driving environment of the vehicle of the driver that is a target for estimation, at a point in time corresponding to a period from when an absolute value of an acceleration rate of the vehicle exceeds a first threshold until the acceleration rate reaches or drops below a second threshold lower than the first threshold. The behavior estimation unit may be configured to, in the driver model built, estimate driving in accordance with an acceleration rate pattern associated with the first parameter set that is similar to the parameter set obtained by the environment obtainer, as a behavior of the vehicle of the driver that is the target for estimation. The information processing system may further include: a vehicle controller that controls the vehicle to cause the vehicle of the driver that is the target for estimation t drive in accordance with the acceleration rate pattern estimated by the behavior estimation unit.

This makes it possible to cause the vehicle to drive in accordance with an acceleration rate pattern that is both appropriate for the driving environment and suited to the driver.

Moreover, the information processing system may further include a characteristics obtainer that obtains a personal driving characteristic of each of a plurality of drivers, each of the personal driving characteristics indicating one or more behaviors, of a vehicle, implemented by driving by the driver, and a feature amount associated with each of the one or more behaviors, the feature amount being a feature amount of the driving of the vehicle performed to implement the behavior it is associated with; and a vehicle controller that controls the vehicle of the driver that is the target for estimation. The modeler may further model, from driving characteristics including the personal driving characteristics of the plurality of drivers, the personal driving characteristic of at least one of the plurality of drivers, to build a driving characteristics model indicating a relationship between a behavior and a feature amount for the vehicle of the at least one of the plurality of drivers. The vehicle controller, when any behavior among the one or more behaviors is selected by the driver as a target for implementation or estimated by the behavior estimation unit as a target for implementation, may control driving of the vehicle of the driver that is the target for estimation in accordance with a feature amount associated with the behavior that is the target for implementation in the driving characteristics model built.

With this, the behavior of the vehicle of the driver is implemented in accordance with the driving characteristics of that driver, that is to say, with the driving habits of that driver, and as such, it is possible to perform a driving conduct that is further suited to that driver.

Moreover, the information processing system may further include a danger determination unit configured to, for each of the plurality of drivers, obtain a behavior, of the vehicle, selected by the driver and a driving environment of the vehicle at a time of selection of the behavior, and determine, based on a predetermined determination criterion, whether that behavior is dangerous or not. A dangerous history obtainer that obtains a personal dangerous driving environment history of each of the plurality of drivers; and a warning processing unit configured to perform a process for warning a driver. The danger determination unit may configured to, when a behavior of the vehicle is (a) determined to be not dangerous, output information including the behavior and the driving environment as personal driving information, and when (b) determined to be dangerous, output information including the behavior and the driving environment, as personal dangerous driving information. The history obtainer may obtain, for each of the plurality of drivers, an information group including a plurality of units of the personal driving information output from the danger determination unit, as the personal driving environment history of the driver. The dangerous history obtainer may obtain, for each of the plurality of drivers, an information group including a plurality of units of the personal dangerous driving information output from the danger determination unit as the personal dangerous driving environment history of the driver. The modeler may further model, from a dangerous driving environment history including the personal dangerous driving environment histories of the plurality of drivers, the personal dangerous driving environment history of at least one of the plurality of drivers, to build a dangerous driver model indicating a relationship between a dangerous behavior and a driving environment for the vehicle of the at least one of the plurality of drivers. The warning processing unit may be configured to, in the driver model built, estimate a dangerous behavior associated with the driving environment obtained by the environment obtainer, as a behavior of the vehicle of the driver that is the target for estimation, and execute processing for warning the driver that is the target for estimation of the estimated dangerous behavior.

With this, when the driver that is a target for estimation is manually driving, it is possible to alert the driver to avoid a dangerous behavior such as a rear-end collision or lane departure, which makes it possible to reduce the occurrence of dangerous behavior.

Moreover, the information processing system may further include a notifier that notifies the driver that is the target for estimation of the behavior estimated by the behavior estimation unit, before the behavior is implemented.

With this, since the estimated behavior is notified, the driver can easily comprehend what sort of behavior is going to be implemented before it is implemented, which relieves any concern the driver may have.

Note that general or specific aspects of the above may be realized as a system, method, integrated circuit, computer program, computer readable medium such as a CD-ROM, or any given combination thereof.

Since the vehicle is being consigned with driving during autonomous driving (including both fully and partially autonomous driving), trust between the vehicle and driver is extremely important. Accordingly, the exchange of appropriate information between vehicle and driver (passenger) is necessary. In PTL 1, only the current operational state is notified to the driver.

During autonomous driving, notifying the driver of only the current behavior (operational state) of the vehicle leads to substantial uneasiness in the driver when the driver is not privy to anything about the behavior to be implemented next (for example, the behavior, such as changing lanes, accelerating, decelerating, to be implemented by the vehicle when, in particular, the vehicle is approaching a merging region, is approaching an intersection, is coming into proximity with an emergency vehicle, or when a surrounding vehicle performs or attempts some driving maneuver). This is a first problem.

Moreover, in the case of fully autonomous driving, there is a high possibility that the driver will do something else other than supervise the driving, so even if the current operational state is suddenly displayed, the driver cannot comprehend the current surroundings of the vehicle or the driving state of the vehicle, making it impossible to immediately react when the driver is prompted make a conscious driving choice, whereby the driver cannot smoothly instruct the vehicle. This is a second problem.

Moreover, by only notifying the driver of the current operational state, even if the driver attempts to manually drive the vehicle directly, the driver cannot immediately switch over to manual driving. This is a third problem.

Moreover, when the computer attempts to implement the same movement as the driver or passenger, the timing and/or input amount of the movement differs from person to person, and as such, there may be a discrepancy from the sensation of when the driver is driving manually, and in a worst case scenario, this may induce the driver to intervene the autonomous driving and make an unnecessary operational input. This is a fourth problem.

In light of this, the present invention provides an information notification device, information notification method, information notification program, and information processing system capable of solving at least one of the above-described problems, during fully or partially autonomous driving.

In other words, an information notification device according to one aspect of the present invention is installed in a vehicle including: a detector that detects surroundings of the vehicle and a driving state of the vehicle; and a vehicle controller that determines a behavior of the vehicle based on the surroundings of the vehicle and the driving state of the vehicle detected by the detector. The information notification device includes an information obtainer that obtains information on a behavior to be implemented, when it is determined that there is a possibility that the behavior of the vehicle may be updated during autonomous driving, and a notifier that notifies the driver of the behavior to be implemented before the behavior is updated.

An information notification method according to one aspect of the present invention is implemented in a vehicle that detects surroundings of the vehicle and a driving state of the vehicle; and determines a behavior of the vehicle based on the surroundings of the vehicle and the driving state of the vehicle detected by the detector. The information notification method includes obtaining information on a behavior to be implemented, when it is determined that there is a possibility that the behavior of the vehicle may be updated during autonomous driving, and notifying the driver of the behavior to be implemented before the behavior is updated.

An information notification program according to one aspect of the present invention is executed by a computer in a vehicle that detects surroundings of the vehicle and a driving state of the vehicle; and determines a behavior of the vehicle based on the surroundings of the vehicle and the driving state of the vehicle detected by the detector. The information notification program causes the computer to function as an information obtainer that obtains information on a behavior to be implemented, when it is determined that there is a possibility that the behavior of the vehicle may be updated during autonomous driving, and notifier that notifies the driver of the behavior to be implemented before the behavior is updated.

With such an information notification device, information notification method, and information notification program, during fully or partially autonomous driving, it is possible to appropriately convey information with minimal conflict between the vehicle and the driver so as to achieve a more pleasant autonomous driving experience.

Advantageous Effect of Invention

With the present invention, it is possible to estimate a driving conduct suited to the driver.

BRIEF DESCRIPTION OF DRAWINGS

FIG. 16 illustrates one example of a driving environment history.

FIG. 17 illustrates a method of building a clustering driver model.

FIG. 18 illustrates one example of a built clustering driver model.

FIG. 19 illustrates another example of a built clustering driver model.

FIG. 20 illustrates a method of building an individual adaptive driver model.

FIG. 21 illustrates one example of a built individual adaptive driver model.

FIG. 22 illustrates one example of a driving characteristics model.

FIG. 27 illustrates one example of a driving environment history.

FIG. 28 illustrates a usage method of a driver model according to this variation.

FIG. 37 illustrates examples of information stored in storage according to Embodiment 5.

FIG. 38 illustrates examples of information stored in storage according to Embodiment 5.

FIG. 43 illustrates vehicle characteristics according to one aspect of the present invention.

FIG. 46 illustrates one example of a dangerous driving environment history stored in a dangerous a driving environment history storage in an information processing system according to a variation of one aspect of the present invention.

DESCRIPTION OF EXEMPLARY EMBODIMENTS

Figure 1:
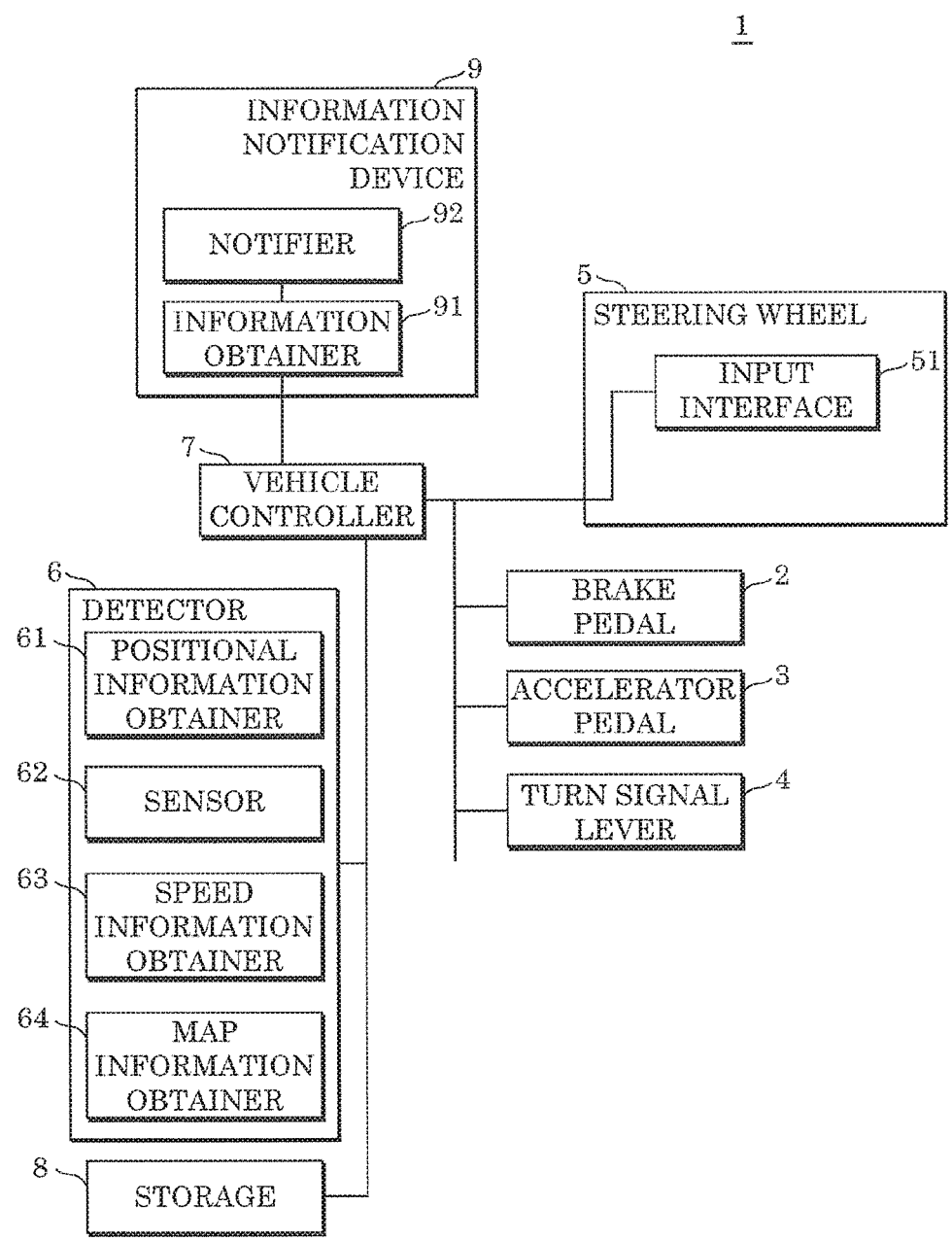
FIG. 1 is a block diagram illustrating relevant components in a vehicle including the information notification device according to Embodiment 1 of the present invention.

Hereinafter, embodiments of the present invention will be described in detail with reference to the drawings. In Embodiments 1 through 3, an information notification device, information notification method, and information notification program capable of appropriately conveying information with minimal conflict between the vehicle and the driver so as to achieve a more pleasant autonomous driving experience will be described. In Embodiments 4 through 5, an information processing system, information processing method, and program according to one aspect of the present invention that are capable of estimating a driving conduct suited to a driver will be described.

Note that each of the embodiments described below is merely one specific example of the present invention, and therefore do not limit the present invention. The following embodiments each present a general or specific example. The numerical values, shapes, materials, elements, arrangement and connection of the elements, steps, and order of the steps, etc., indicated in the following embodiments are given merely by way of illustration and are not intended to limit the present invention. Therefore, among elements in the following embodiments, those not recited in any one of the independent claims defining the broadest aspect the present invention are described as optional elements.

Note that the drawings are represented schematically and are not necessarily precise illustrations. Additionally, like elements share like reference numerals in the drawings.

Embodiment 1

FIG. 1 is a block diagram illustrating relevant components in vehicle 1 including the information notification device according to Embodiment 1 of the present invention. Vehicle 1 is a vehicle that does not require operational input from a driver and can, fully or partially, autonomously control driving.

Vehicle 1 includes brake pedal 2, accelerator pedal 3, turn signal lever 4, steering wheel 5, detector 6, vehicle controller 7, storage 8, and information notification device 9.

Brake pedal 2 causes vehicle 1 to decelerate upon receiving a braking operation by the driver. Brake pedal 2 may also make changes in the amount of braking in correspondence with the degree of deceleration of vehicle 1 upon receiving a control result from vehicle controller 7. Accelerator pedal 3 increases the speed of vehicle 1 upon receiving an acceleration operation by the driver. Accelerator pedal 3 may also make changes in the amount of acceleration in correspondence with the degree of increase in speed of vehicle 1 upon receiving a control result from vehicle controller 7. Turn signal lever 4 activates the turn signal, which is not illustrated in the drawings of vehicle 1, upon the driver operating turn signal lever 4. Upon receiving a control result from vehicle controller 7, turn signal lever 4 may also change the state of turn signal lever 4 so as to correspond to the turning state of vehicle 1 and active the turn signal, which is not illustrated in the drawings of vehicle 1, accordingly.

Steering wheel 5 changes the driving direction of vehicle 1 upon receiving a steering operation by the driver. Steering wheel 5 may also make changes in the amount of steering in correspondence with the driving direction of vehicle 1 upon receiving a control result from vehicle controller 7. Steering wheel 5 includes input interface 51.

Input interface 51 is disposed on the front surface (the surface facing the driver) of steering wheel 5, and receives an input from the driver. For example, input interface 51 is a device such as a button, touch panel, or grip sensor. Input interface 51 outputs, to vehicle controller 7, information on the input received from the driver.

Detector 6 detects a driving state of vehicle 1 and detects the surroundings of vehicle 1. Detector 6 outputs information on the detected driving state and detected surroundings to vehicle controller 7.

Detector 6 includes positional information obtainer 61, sensor 62, speed information obtainer 63, and map information obtainer 64.

Positional information obtainer 61 obtains positional information on vehicle 1 via, for example, global positioning system (GPS), as information on the driving state.

Sensor 62 detects the surroundings of vehicle 1 based on the position of another vehicle in the vicinity of vehicle 1 and lane positional information, such as determining the position of another vehicle, determining whether another vehicle is a leading vehicle, the time to collision (TTC) from the speed of another vehicle and the speed of the host vehicle, and whether there is an obstacle in the vicinity of vehicle 1.

Speed information obtainer 63 obtains, as information on the driving state, information such as the speed and driving direction of vehicle 1 from, for example, a speed sensor, which is not illustrated in the drawings.

Map information obtainer 64 obtains, as information on the surroundings of vehicle 1, map information on the surroundings of vehicle 1, such as information on the road on which vehicle 1 is driving, information on a merge point where vehicle 1 merges with other vehicles on the road, information on the current lane that vehicle 1 is driving in, and information on intersections.

Note that sensor 62 includes a millimeter-wave radar, laser radar, or camera, or any combination thereof.

Storage 8 is a storage device such as read only memory (ROM), random access memory (RAM), hard disk drive, or solid state drive (SSD), and stores associations between the current driving environment and behavior candidates of next (after elapse of a first predetermined period of time) possible behaviors.

The current driving environment is an environment determined based on, for example, the position of vehicle 1, the road on which vehicle 1 is driving, and the positions and speeds of other vehicles in the vicinity of vehicle 1. Note that the determination need not be based only on instantaneous data, and may be based on data before and after that point in time. For example, the determination may be made based on data indicating that there is a chance for collision one second after a vehicle cuts in while accelerating or decelerating, determined from the position and/or speed of the vehicle. This makes it possible to predict the behavior of other vehicles, making it possible to more precisely and in more detail, comprehend the driving environment. The behavior candidate is a candidate for a next (after elapse of a first predetermined period of time) possible behavior to be implemented by vehicle 1 with respect to the current driving environment.

For example, in a driving environment in which: there is a merging region ahead in the lane in which vehicle 1 is driving; a vehicle is attempting to merge from the left of the lane in which vehicle 1 is driving; and it is possible for vehicle 1 to change lanes from the lane in which vehicle 1 is driving to a lane to the right, three behavior candidates are stored in storage 8 in advance in association with such an environment: causing vehicle 1 to accelerate, causing vehicle 1 to decelerate, and causing vehicle 1 to change to a lane to the right.

Moreover, in a driving environment in which: a vehicle is driving in front of and in the same lane as vehicle 1 (hereinafter referred to as a "leading vehicle") and at a slower speed than vehicle 1; and it is possible for vehicle 1 to change to an adjacent lane, three behavior candidates are stored in storage 8 in advance in association with such an environment: causing vehicle 1 to overtake the leading vehicle, causing vehicle 1 to change lanes to an adjacent lane, and causing vehicle 1 to decelerate and follow the leading vehicle.

Storage 8 may further store priorities for each of the behavior candidates. For example, storage 8 may store the number of times a behavior is actually used in the same driving environment, and set the priority higher for behaviors having a high usage count.

For example, vehicle controller 7 may be realized as an LSI circuit or part of an electronic control unit (ECU) that controls the vehicle. Vehicle controller 7 controls the vehicle based on information on the driving state and the surroundings obtained from detector 6, and controls brake pedal 2, accelerator pedal 3, turn signal lever 4, and information notification device 9 in accordance with the vehicle control result. Note that the elements controlled by vehicle controller 7 are not limited to these examples.

First, vehicle controller 7 determines the current driving environment based on information on the driving state and the surroundings. Various conventional methods can be used to perform such a determination.

For example, vehicle controller 7 determines, based on information on the driving state and the surroundings, that the current driving environment is a "driving environment in which there is a merging region ahead in the lane in which vehicle 1 is driving, a vehicle is attempting to merge from the left of the lane in which vehicle 1 is driving, and it is possible for vehicle 1 to change lanes from the lane in which vehicle 1 is driving to a lane to the right".

Moreover, for example, vehicle controller 7 determines, from information on the driving state and the surroundings, that a time series of the driving environment is "a driving environment in which a vehicle is driving in front of and in the same lane as vehicle 1, and at a slower speed than vehicle 1, and it is possible for vehicle 1 to change to an adjacent lane".

Vehicle controller 7 causes notifier 92 of information notification device 9 to notify the driver with information on the driving environment, which indicates the driving state and the surroundings. Moreover, vehicle controller 7 reads, from storage 8, candidates for a next (after elapse of a first predetermined period of time) possible behavior to be implemented by vehicle 1 with respect to the determined driving environment.

Vehicle controller 7 determines which of the read behavior candidates is the most appropriate for the current driving environment, and sets the most appropriate behavior candidate for the current driving environment as a primary behavior. Note that the primary behavior may be the same as the current behavior currently implemented by the vehicle, in which case this means the vehicle continues implementing the same behavior. Then, vehicle controller 7 sets each behavior candidate capable of being implemented by the driver in the current driving environment that is not the primary behavior as a secondary behavior (i.e., a behavior different from a behavior to be implemented).

For example, vehicle controller 7 may set the most appropriate behavior as the primary behavior by using a conventional technique for determining the most appropriate behavior based on information on the driving state and the surroundings.

Moreover, vehicle controller 7 may: set a preset behavior from among a plurality of behavior candidates as the most appropriate behavior; information on a previously selected behavior may be sorted in storage 8 and vehicle controller 7 may determine the previously selected behavior to be the most appropriate behavior; a number of times each behavior has been selected may be stored in storage 8 and vehicle controller 7 may determine the behavior having the highest count to be the most appropriate behavior.

Vehicle controller 7 then causes notifier 92 of information notification device 9 to notify the driver with information on the primary behavior and the secondary behavior(s). Note that when vehicle controller 7 determines that there is no secondary behavior, vehicle controller 7 may cause notifier 92 to notify the driver of only information on the primary behavior.

Note that vehicle controller 7 may simultaneously notify notifier 92 of the information on the primary behavior and the secondary behavior(s) and the information on the driving state and the surroundings.

Vehicle controller 7 further obtains information on an input received by input interface 51 from the driver. After notifying the primary behavior and the secondary behavior (s), vehicle controller 7 determines whether input interface 51 has received an input or not within a second predetermined period of time. An input is, for example, a selection of one of the secondary behaviors.

When input interface 51 does not receive an input within the second predetermined period of time, vehicle controller 7 controls the vehicle by causing the vehicle to implement the primary behavior, and controls brake pedal 2, accelerator pedal 3, and turn signal lever 4 in accordance with the vehicle control result.

When input interface 51 receives an input within the second predetermined period of time, vehicle controller 7 performs control corresponding to the input received.

Information notification device 9 obtains various types of information related to the driving of vehicle 1 from vehicle controller 7, and notifies the driver of the obtained information. Information notification device 9 includes information obtainer 91 and notifier 92.

Information obtainer 91 obtains various types of information related to the driving of vehicle 1 from vehicle controller 7. For example, when vehicle controller 7 determines that the behavior of vehicle 1 may be updated, information obtainer 91 obtains information on the primary behavior and information on the secondary behavior(s) from vehicle controller 7.

Information obtainer 91 then temporarily stores the obtained information in storage (not illustrated in the drawings), and reads stored information from the storage and outputs it to notifier 92 as necessary.

Notifier 92 notifies the driver of information related to the driving of vehicle 1. For example, notifier 92 may be a display that displays information, such as a light-emitting unit, like an LED, disposed on steering wheel 5 or a pillar of the vehicle, or a car navigation system, head-up display, or center display installed in the vehicle, may be a speaker that notifies the driver by converting the information into speech, and may be a vibrating body disposed in a location that is sensible by the driver (for example, the driver's seat or steering wheel 5). Moreover, notifier 92 may be a combination of any of these examples.

In the following description, notifier 92 is exemplified as a display device.

In such a case, notifier 92 is, for example, a head-up display (HUD), liquid crystal display (LCD), head-mounted display or helmet-mounted display (HMD), or a display provided in glasses (smart glasses), or some other dedicated display. For example, the HUD may be disposed on the windshield of vehicle 1 and may be disposed on a separate glass or plastic surface (for example, a combiner). Moreover, the "windshield" may be the front windshield, a side window, or the rear window of vehicle 1.

Further, the HUD may be a light-transmissive display provided on the surface of or inner side of the windshield. Here, a light-transmissive display is, for example, a light-transmissive organic EL display, or a transparent display that employs a glass that emits light upon being irradiated with light of a specific wavelength. Driver can simultaneously view the outside scenery and the imagery displayed on the light-transmissive display. In this way, notifier 92 may be a display medium that transmits light. In any case, an image is displayed on notifier 92.

Notifier 92 notifies the driver of information related to the driving obtained from vehicle controller 7 via information obtainer 91. For example, notifier 92 notifies the driver of information on the primary behavior and information on the secondary behavior(s) obtained from vehicle controller 7.

Next, a detailed example of the information displayed and inputs made on input interface 51 will be given.

Figure 2:
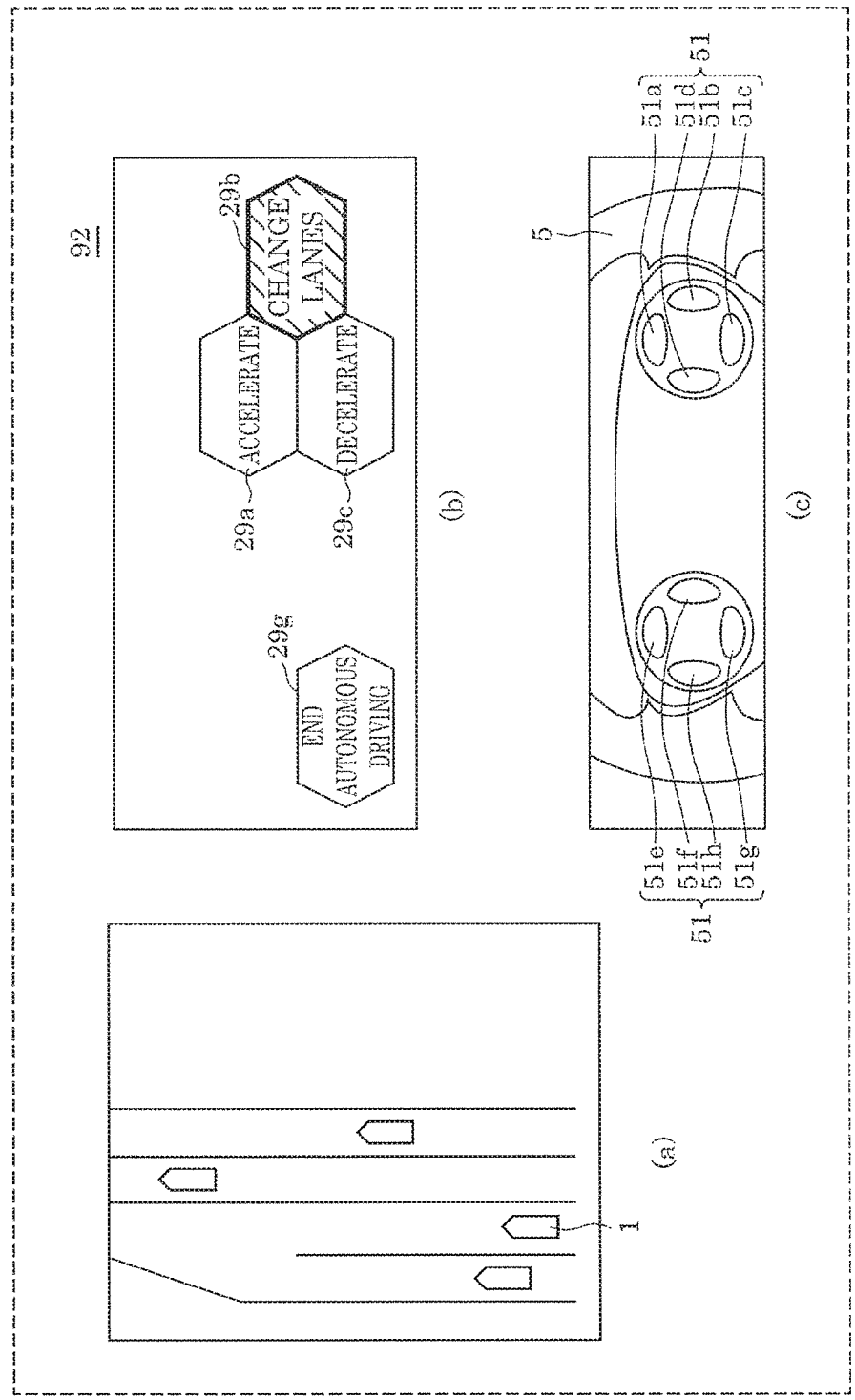
FIG. 2 illustrates a first example of a driving environment, a display on a notifier related to the first example, and inputs included in an input interface.

FIG. 2 illustrates a first example of a driving environment, a display on notifier 92 related to the first example, and inputs included in input interface 51.

In FIG. 2, (a) illustrates a bird's-eye view of the driving environment of vehicle 1. More specifically, (a) in FIG. 2 illustrates a driving environment in which there is a merging region ahead in the lane in which vehicle 1 is driving, a vehicle is attempting to merge from the left of the lane in which vehicle 1 is driving, and it is possible for vehicle 1 to change lanes from the lane in which vehicle 1 is driving to a lane to the right.

Vehicle controller 7 determines that the current driving environment is the driving environment illustrated in (a) in FIG. 2 based on information on the driving state and the surroundings. Note that vehicle controller 7 may generate the bird's-eye view illustrated in (a) in FIG. 2, and, in addition to the information on the primary behavior and the secondary behavior(s), may cause notifier 92 to notify the generated bird's-eye view.

In FIG. 2, (b) illustrates one example of a display on notifier 92 related to the driving environment illustrated in (a) in FIG. 2. In the display area on notifier 92, selections related to the behavior of vehicle 1 are displayed on the right, and information for switching to manual driving is displayed on the left.

The primary behavior is, among display regions 29*a* through 29*c* and 29*g*, display region 29*b* that is highlighted and indicates "change lanes". "Accelerate" and "decelerate" indicated in display regions 29*a* and 29*c*, respectively, are secondary behaviors. Moreover, display region 29*g* displays "end autonomous driving" which indicates switching to manual driving.

In FIG. 2, (c) illustrates one example of input interface 51 disposed on steering wheel 5. Input interface 51 includes input buttons 51*a* through 51*d* disposed on the right side of steering wheel 5 and input buttons 51*e* through 51*h* disposed on the left side of steering wheel 5. Note that the number and shapes, etc., of input interface 51 disposed on steering wheel 5 is not limited to this example.

In this embodiment, display regions 29*a* through 29*c* illustrated in (b) in FIG. 2 correspond to input buttons 51*a* through 51*c*, respectively, and display region 29*g* corresponds to input button 51*g*.

With this configuration, the driver presses the input buttons corresponding to the display regions to select the actions indicated in the display regions. For example, the driver presses input button 51*a* to select the behavior "accelerate" indicated in display region 29*a*.

Note that in (b) in FIG. 2, only text information is shown in the display regions, but as will be described next, symbols or icons relating to driving the vehicle may be displayed in the display regions. This allows the driver to comprehend the indicated action at a glance.

Figure 3:
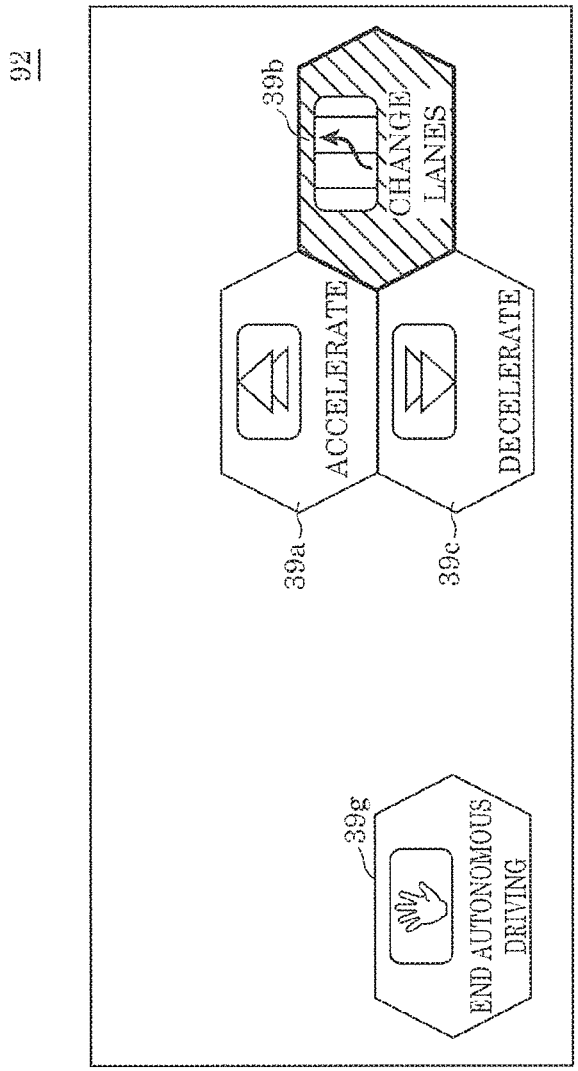
FIG. 3 illustrates another example of a display displayed by the notifier.

FIG. 3 illustrates another example of a display displayed by notifier 92. As illustrated in FIG. 3, display regions 39*a* through 39*c*, 39*g* include both text information and symbols illustrating the text information. Note that display regions may include only symbols.

Next, a detailed example of a driving environment will be given, and display control flow will be described.

Figure 4:
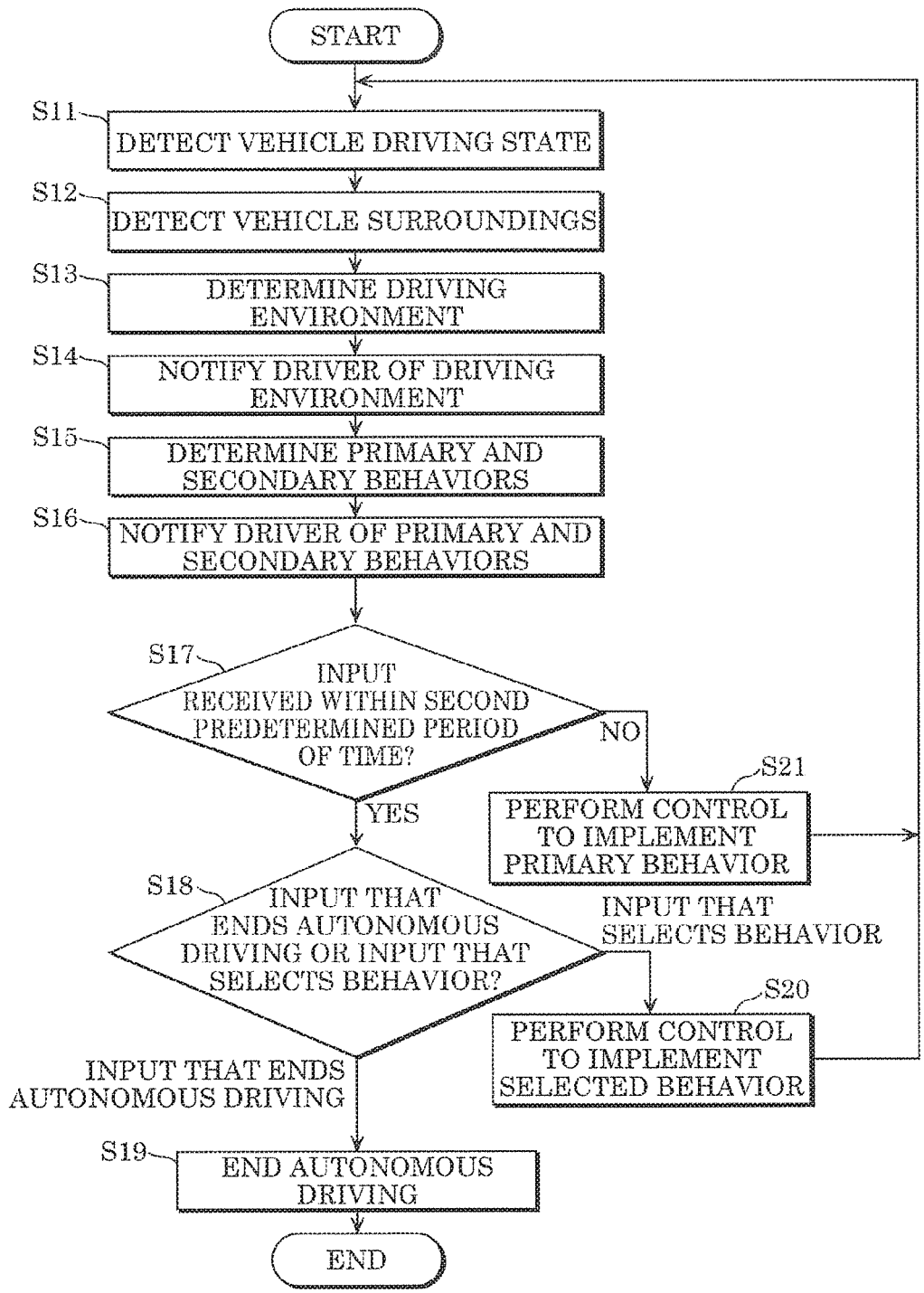
FIG. 4 is a flow chart illustrating a sequence of information notification processes according to this embodiment.
Figure 5:
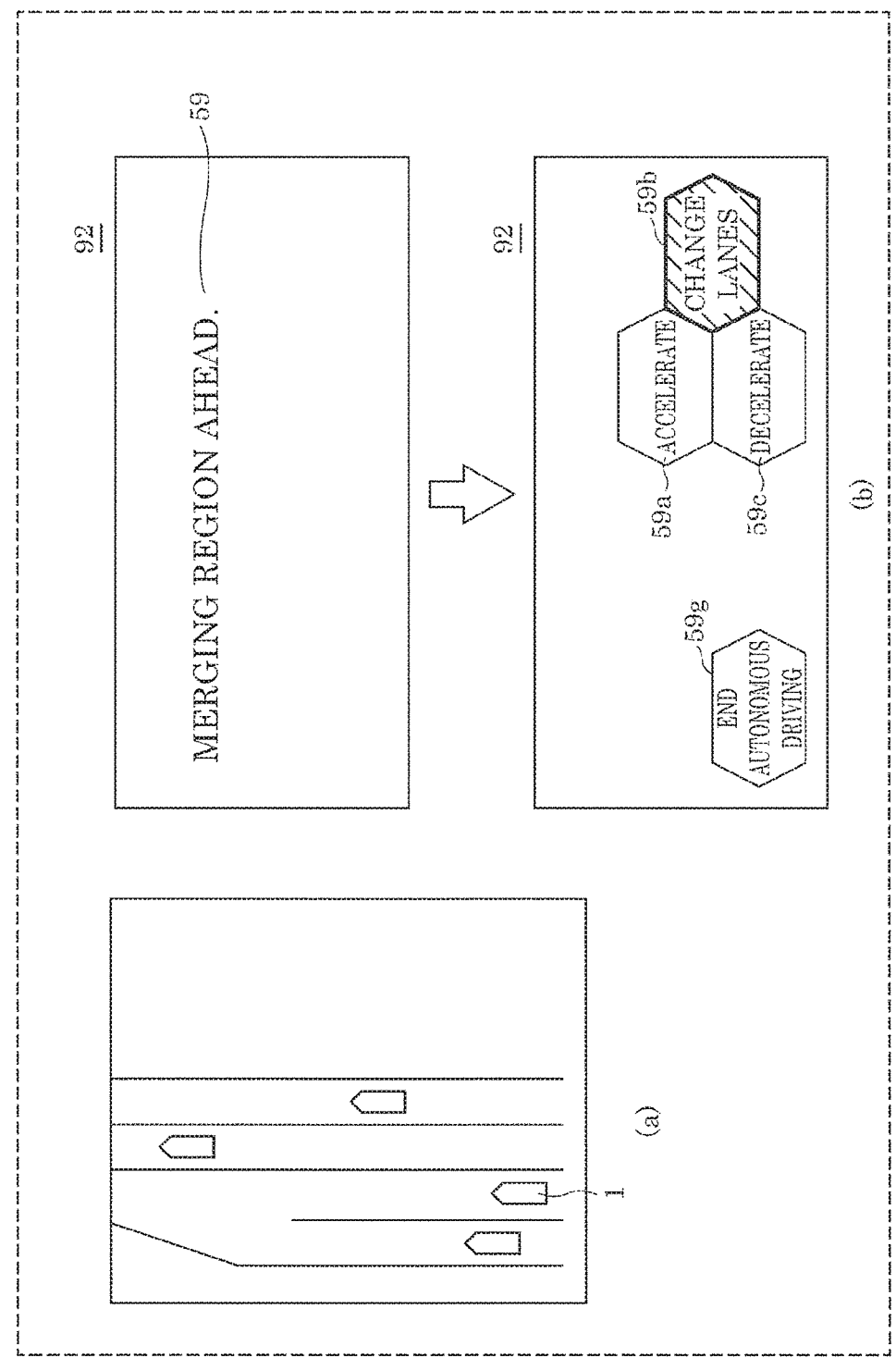
FIG. 5 illustrates the first example of the driving environment and display control related to the first example.

FIG. 4 is a flow chart illustrating a sequence of information notification processes according to this embodiment. FIG. 5 illustrates a first example of a driving environment and display control related to the first example.

As illustrated in FIG. 4, detector 6 detects the driving state of the vehicle (step S11). Next, detector 6 detects the surroundings of the vehicle (step S12). Information on the detected driving state of the vehicle and the surroundings of the vehicle is output to vehicle controller 7 by detector 6.

Next, vehicle controller 7 determines the current driving environment based on the information on the driving state and the surroundings (step S13). In the example illustrated in (a) in FIG. 5, vehicle controller 7 determines that the current driving environment is a "driving environment in which there is a merging region ahead in the lane in which vehicle 1 is driving, a vehicle is attempting to merge from the left of the lane in which vehicle 1 is driving, and it is possible for vehicle 1 to change lanes from the lane in which vehicle 1 is driving to a lane to the right".

Vehicle controller 7 then causes notifier 92 of information notification device 9 to notify the driver with information on the determined driving environment (step S14). In the example illustrated in (b) in FIG. 5, vehicle controller 7 outputs the information on the determined driving environment to information obtainer 91. Notifier 92 obtains the information on the driving environment from information obtainer 91, and displays this information as text information 59. Note that vehicle controller 7 may notify the driver with information on the driving environment by speech via a speaker instead of displaying the information on the driving environment on notifier 92. This makes it possible to convey the information to the driver with certainty, so as to circumvent instances in which the driver is not looking at the display or monitor or misses the notification thereon.

Next, vehicle controller 7 determines whether the determined driving environment may possibly lead to an update in the behavior, and when vehicle controller 7 determines that the behavior may be updated, vehicle controller 7 further determines the primary behavior and the secondary behavior(s) (step S15). The determination of whether the driving environment may possibly lead to an update in the behavior is based on whether the driving environment has changed or not. Examples of updated behaviors to be implemented include, for example, decelerating when there is a chance of a collision with, for example, another vehicle, modifying the speed when there ceases to be a leading vehicle when adaptive cruise control (ACC) is being used, and changing lanes when an adjacent lane is open. A conventional technique is used when determining whether to update.

In this case, vehicle controller 7 reads, from storage 8, candidates for a next (after elapse of a first predetermined period of time) possible behavior to be implemented by vehicle 1 with respect to the determined driving environment. Vehicle controller 7 then determines which of the read behavior candidates is the most appropriate for the current driving environment, and sets the most appropriate behavior candidate for the current driving environment as a primary behavior. Then, vehicle controller 7 sets each behavior candidate other than the primary behavior as a secondary behavior.

In the example illustrated in (b) in FIG. 5, vehicle controller 7 reads three behavior candidates from storage 8: causing vehicle 1 to accelerate, causing vehicle 1 to decelerate, and causing vehicle 1 to switch to a lane to the right. Vehicle controller 7 then determines that causing vehicle 1 to switch to a lane to the right is the most appropriate behavior based on the speed of the vehicle merging from the left and the state of the lane to the right of vehicle 1, and then sets that behavior as the primary behavior. Then, vehicle controller 7 sets each behavior candidate other than the primary behavior as a secondary behavior.

Vehicle controller 7 then causes notifier 92 of information notification device 9 to notify the driver with information on the primary behavior and the secondary behavior(s) (step S16). In the example illustrated in (b) in FIG. 5, notifier 92 displays the text information "change lanes," which is the primary behavior information, in the highlighted display region 59b, and displays "accelerate" and "decelerate," which are secondary behavior information, in display regions 59a and 59c, respectively.

Next, vehicle controller 7 determines, within a second predetermined period of time, whether input interface 51 has received an input from the driver or not (step S17).

For example, after vehicle controller 7 determines that the current driving environment is the driving environment illustrated in (a) in FIG. 5, vehicle controller 7 sets the first predetermined period of time to the time until the merge point is reached. Vehicle controller 7 then sets the second predetermined period of time, which is shorter than the first predetermined period of time, to a period of time in which it is possible to receive an input of the next behavior to be implemented before the merge point.

When input interface 51 receives an input from the driver within the second predetermined period of time (YES in step S17), vehicle controller 7 determines whether the received input is an input ending autonomous driving or an input selecting (or updating) a behavior (step S18).

As described with reference to FIG. 2, each display region in notifier 92 corresponds with one of the input buttons in input interface 51. When the driver wants to select "end autonomous driving" in (b) in FIG. 5, the driver presses input button 51g in (c) in FIG. 2. When the driver wants to select a behavior, the driver presses one of input buttons 51a through 51c in (c) in FIG. 2.

When the input received by input interface 51 is an input that ends autonomous driving (i.e., when vehicle controller 7 is notified that input button 51g is pressed), vehicle controller 7 ends autonomous driving (step S19). When the input received by input interface 51 is an input selecting a behavior (i.e., when any one of input buttons 51a through 51c is pressed), vehicle controller 7 controls vehicle 1 so as to implement the behavior corresponding to the pressed input button (step S20).

When input interface 51 does not receive an input from the driver within the second predetermined period of time (NO in step S17), vehicle controller 7 controls vehicle 1 so as to implement the primary behavior (step S21).

Figure 6:
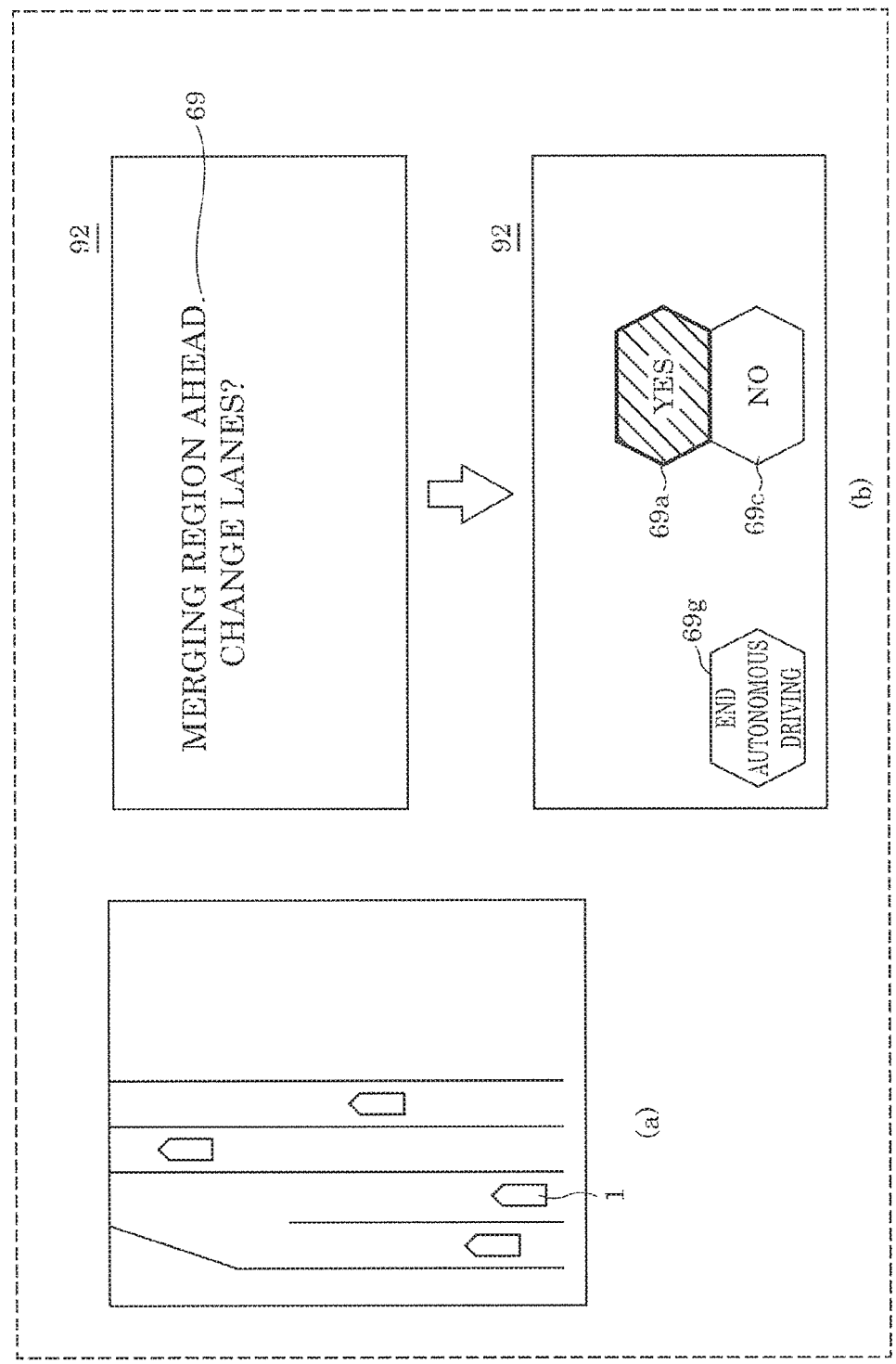
FIG. 6 illustrates the first example of the driving environment and another example of display control related to the first example.

FIG. 6 illustrates the first example of a driving environment and another example of display control related to the first example. In FIG. 6, (a) is the same as (a) in FIG. 5, and the display control illustrated in (b) in FIG. 6 is different from the display control illustrated in (b) in FIG. 5.

Similar to the example that referenced (b) in FIG. 5, vehicle controller 7 reads, from storage 8, three behavior candidates with respect to the driving environment illustrated in (a) in FIG. 6: causing vehicle 1 to accelerate, causing vehicle 1 to decelerate, and causing vehicle 1 to change lanes to the right. We will assume that the behavior of causing vehicle 1 to change lanes to the right is stored as the highest priority behavior in storage 8.

In this case, vehicle controller 7 then causes notifier 92 to notify the driver with information on the driving environment and information on the primary behavior. In the example illustrated in (b) in FIG. 6, vehicle controller 7 generates information on the driving environment and text information 69 indicating the information on the primary behavior, and causes notifier 92 to display text information 69.

Vehicle controller 7 then displays, in display regions 69a and 69c, displays prompting the driver to adopt or reject the primary behavior. Vehicle controller 7 also displays, in display region 69g, "end autonomous driving" which indicates switching to manual driving.

Here, vehicle controller 7 highlights the display of "YES" corresponding to the selection to adopt the primary behavior. Whether "YES" or "NO" is displayed highlighted may be determined in advance; the previously selected option may be highlighted; the number of time each option has been previously selected may be stored in storage 8 and the option selected the most may be highlighted on notifier 92.

By learning previously selected behaviors, vehicle controller 7 can appropriately notify the driver with information. Moreover, with this, the number of displays notified by notifier 92 is less than that in the example in (b) in FIG. 5, which reduces the burden placed on the driver.

Figure 7:
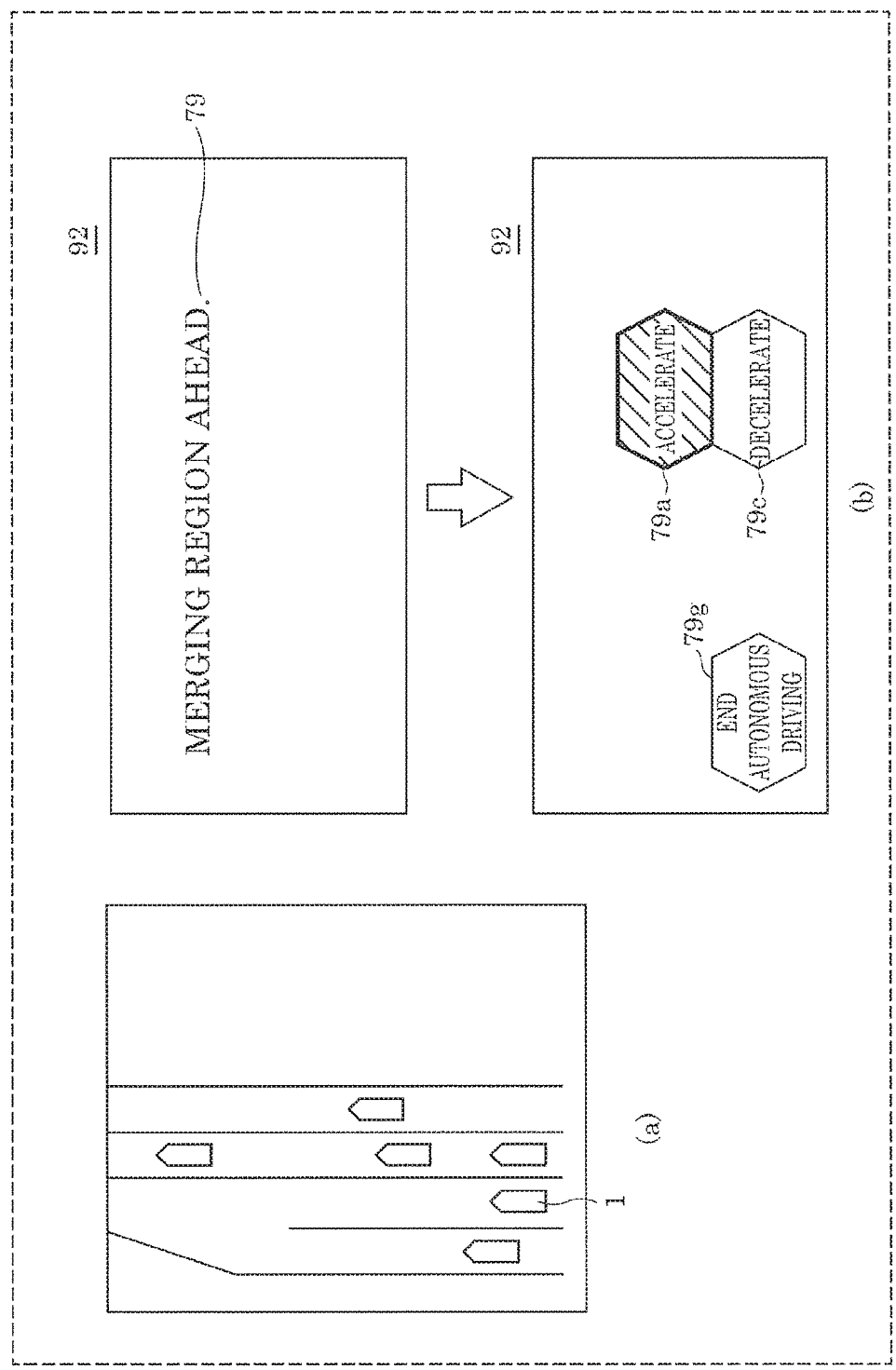
FIG. 7 illustrates a second example of the driving environment and display control related to the second example.

FIG. 7 illustrates a second example of a driving environment and display control related to the second example. In FIG. 7, (a) illustrates a bird's-eye view of the driving environment. The driving environment illustrated in (a) in FIG. 7 is similar to the driving environment illustrated in (a) in FIG. 5 and (a) in FIG. 6 in that there is a merging region in front of vehicle 1, but differs from the driving environment illustrated in (a) in FIG. 5 and (a) in FIG. 6 in that there are vehicles to the right of vehicle 1. In such a case, vehicle controller 7 determines to not change lanes.

Then, when vehicle controller 7 determines that the driving environment of vehicle 1 is a driving environment like the one illustrated in (a) in FIG. 7, vehicle controller 7 displays information on the determined driving environment as text information 79 on notifier 92, as illustrated in (b) in FIG. 7.

Vehicle controller 7 further selects either causing vehicle 1 to accelerate or causing vehicle 1 to decelerate from among the three behavior candidates read from storage 8 of causing vehicle 1 to accelerate, causing vehicle 1 to decelerate, and causing vehicle 1 to change lanes to the right, since vehicle 1 cannot change lanes to the right.

Moreover, vehicle controller 7 predicts that vehicle 1 would come too close to the merging vehicle if vehicle 1 were to continue traveling at its current speed, and determines that causing vehicle 1 to decelerate is the most appropriate behavior, i.e., determines that causing vehicle 1 to decelerate is the primary behavior.

Here, determining which of the two behavior candidates is the most appropriate behavior is determined using a conventional technique for determining the most appropriate behavior based on information on the driving state and the surroundings. Moreover, which is the most appropriate behavior may be determined in advance, the previously selected behavior may be sorted in storage 8 the previously selected behavior may be determined to be the most appropriate behavior, a number of times each behavior has been selected may be stored in storage 8, the behavior having the highest count may be determined to be the most appropriate behavior.

Then, vehicle controller 7 displays "decelerate" in display region 79c as the primary behavior, and displays "accelerate" in display region 79a as a secondary behavior. Vehicle controller 7 also displays, in display region 79g, "end autonomous driving" which indicates switching to manual driving.

With this sort of display control, vehicle controller 7 can notify the driver of the most appropriate behavior for any given driving environment as the primary behavior.

The information on the primary behavior may be arranged on top and the information on the secondary behavior(s) may be arranged on the bottom, and the selection function for each may be respectively assigned to input buttons 51a and 51c; information on the acceleration behavior may be arranged on top, information on the deceleration behavior may be arranged on the bottom, information on a behavior corresponding to a lane change to the right may be arranged on the right, information on a behavior corresponding to a lane change to the left may be arranged on the left, and the selection function for each may be respectively assigned to input buttons 51a, 51c, 51b, and 51d to make it possible to switch between the selections; moreover, priority may be given to the arrangement of the behaviors, and priority may be given to the arrangement of the input buttons. Further, the display size of the information on the primary behavior may be increased and the display size of the information on the secondary behavior may be reduced. Note that by arranging the display of the behavior information so as to correspond to the forward, rearward, left, and right behaviors of the vehicle, the driver can more intuitively operate the inputs.

Next, an example of a driving environment other than one including a merging region in front of vehicle 1 will be given.

Figure 8:
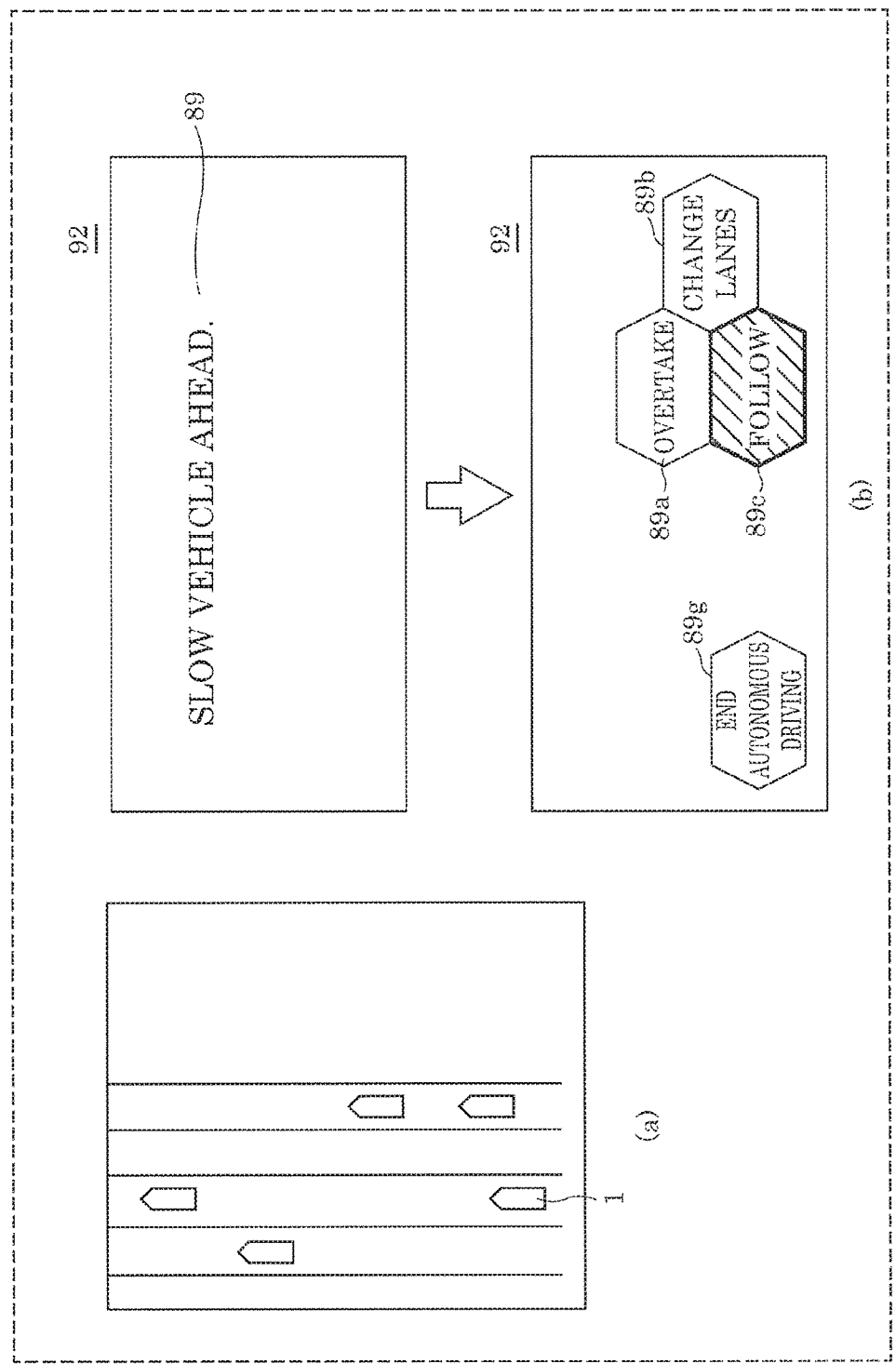
FIG. 8 illustrates a third example of the driving environment and display control related to the third example.

FIG. 8 illustrates a third example of a driving environment and display control related to the third example. In FIG. 8, (a) illustrates a bird's-eye view of the driving environment of vehicle 1. More specifically (a) in FIG. 8 illustrates a driving environment in which the leading vehicle in front of vehicle 1 is traveling slower than vehicle 1 and vehicle 1 can change lanes to an adjacent lane.

Vehicle controller 7 determines that the current driving environment is the driving environment illustrated in (a) in FIG. 8 based on information on the driving state and the surroundings. In this case, vehicle controller 7 causes notifier 92 to display information on the determined driving environment as text information 89.

Vehicle controller 7 reads three behavior candidates from storage 8 as behavior candidates corresponding to the determined driving environment: overtaking the leading vehicle, changing lanes to an adjacent lane, and causing vehicle 1 to decelerate and follow the leading vehicle.

Then, since the speed of the leading vehicle after the leading vehicle decelerates is higher than a predetermined value and thus allowable, vehicle controller 7 determines that causing vehicle 1 to decelerate and follow the leading vehicle is the most appropriate behavior, i.e., determines that causing vehicle 1 to decelerate and follow the leading vehicle is the primary behavior.

Here, determining which of the three behavior candidates is the most appropriate behavior is determined using a conventional technique for determining the most appropriate behavior based on information on the driving state and the surroundings. Moreover, which is the most appropriate behavior may be determined in advance, the previously selected behavior may be sorted in storage 8 the previously selected behavior may be determined to be the most appropriate behavior, a number of times each behavior has been selected may be stored in storage 8, the behavior having the highest count may be determined to be the most appropriate behavior.

Moreover, as illustrated in (b) in FIG. 8, vehicle controller 7 highlights and displays the text information "follow" indicating the primary behavior in display region 89c, and displays the text information "overtake" and "change lanes" as secondary behaviors in display regions 89a and 89b, respectively. Vehicle controller 7 also displays, in display region 89g, "end autonomous driving" which indicates switching to manual driving.

The information on the primary behavior may be arranged on top and the information on the secondary behavior(s) may be arranged on the bottom, and the selection function for each may be respectively assigned to input buttons 51a and 51c; information on the overtake behavior may be arranged on top, information on the follow behavior may be arranged on the bottom, information on a behavior corresponding to a lane change to the right may be arranged on the right, information on a behavior corresponding to a lane change to the left may be arranged on the left, and the selection function for each may be respectively assigned to input buttons 51a, 51c, 51b, and 51d to make it possible to switch between the selections; moreover, priority may be given to the arrangement of the behaviors, and priority may be given to the arrangement of the input buttons. Further, the display size of the information on the primary behavior may be increased and the display size of the information on the secondary behavior may be reduced.

Figure 9:
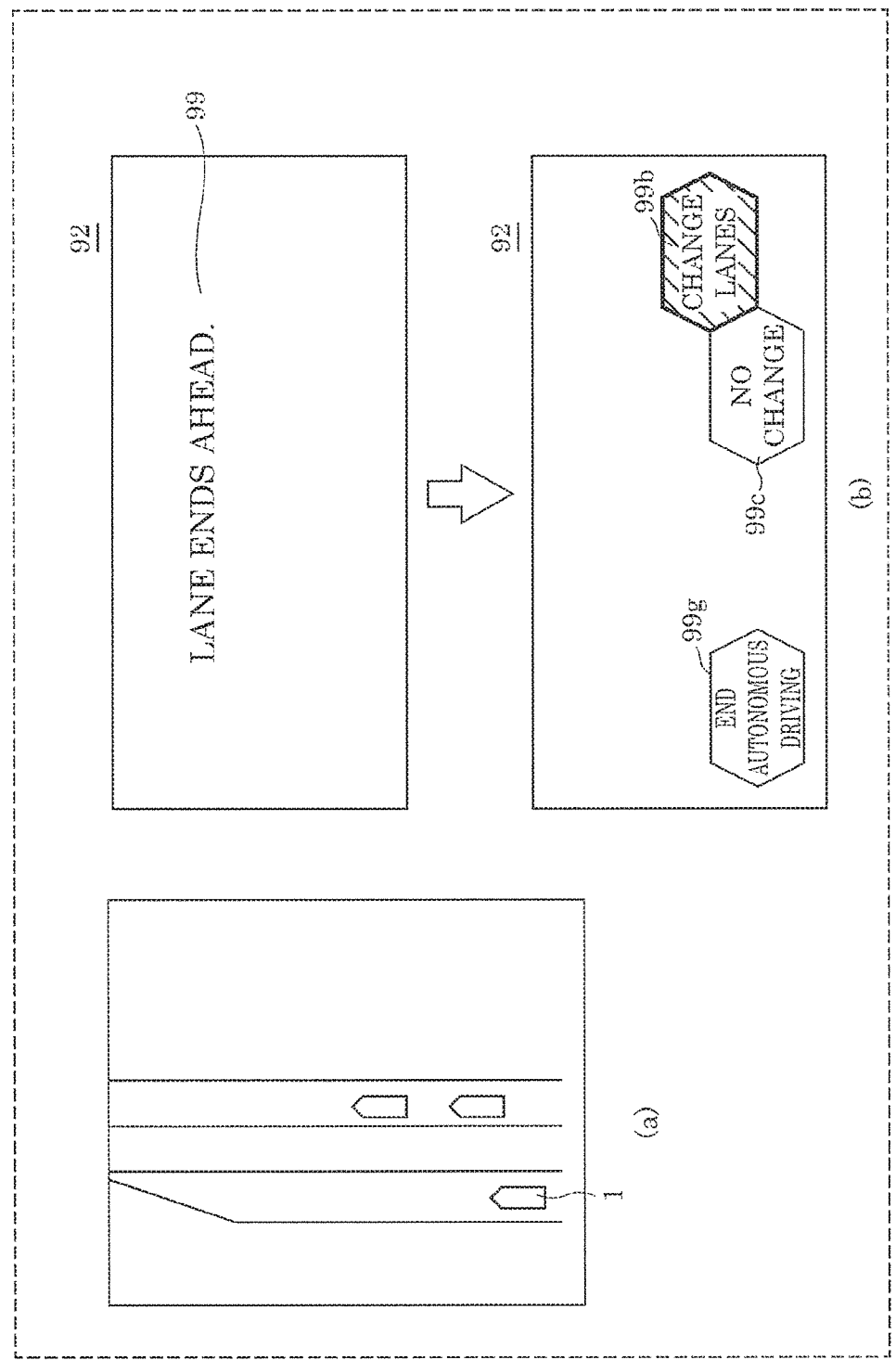
FIG. 9 illustrates a fourth example of the driving environment and display control related to the fourth example.

FIG. 9 illustrates a fourth example of a driving environment and display control related to the fourth example. In FIG. 9, (a) illustrates a bird's-eye view of the driving environment of vehicle 1. More specifically, the driving environment illustrated in (a) in FIG. 9 is a driving environment in which the lane in which vehicle 1 is driving ends ahead.

Vehicle controller 7 determines that the current driving environment is the driving environment illustrated in (a) in FIG. 9 based on information on the driving state and the surroundings. In this case, vehicle controller 7 causes notifier 92 to display information on the determined driving environment as text information 99.

Vehicle controller 7 reads two behavior candidates from storage 8 as behavior candidates corresponding to the determined driving environment: changing lanes to an adjacent lane; and continuing driving in the current lane.

Then, since the TTC to the point where the lane ends is less than a predetermined value, vehicle controller 7 determines that changing lanes to an adjacent lane is the most appropriate behavior, i.e., determines that changing lanes to an adjacent lane is the primary behavior.

Here, determining which of the two behavior candidates is the most appropriate behavior is determined using a conventional technique for determining the most appropriate behavior based on information on the driving state and the surroundings. Moreover, which is the most appropriate behavior may be determined in advance; the previously selected behavior may be sorted in storage 8 the previously selected behavior may be determined to be the most appropriate behavior; a number of times each behavior has been selected may be stored in storage 8 and the behavior having the highest count may be determined to be the most appropriate behavior.

Moreover, as illustrated in (b) in FIG. 9, vehicle controller 7 highlights and displays the text information "change lanes" indicating the primary behavior in display region 99b, and displays the text information "no change" as the secondary behavior in display region 99c. Vehicle controller 7 also displays, in display region 99g, "end autonomous driving" which indicates switching to manual driving.

The information on the primary behavior may be arranged on top and the information on the secondary behavior may be arranged on the bottom, and the selection function for each may be respectively assigned to input buttons 51a and 51c; information indicating no change in behavior may be arranged on the bottom, information on a behavior corresponding to a lane change to the right may be arranged on the right, information on a behavior corresponding to a lane change to the left may be arranged on the left, and the selection function for each may be respectively assigned to input buttons 51c, 51b, and 51d to make it possible to switch between the selections; moreover, priority may be given to the arrangement of the behaviors, and priority may be given to the arrangement of the input buttons. Further, the display size of the information on the primary behavior may be increased and the display size of the information on the secondary behavior may be reduced. Note that assigning different functions to the different display regions in accordance with different driving environments, as illustrated in FIG. 7, FIG. 8, and FIG. 9, makes it possible to notify the driver of information and allow the driver to make inputs in a compact region.

In the above example, vehicle controller 7 causes notifier 92 to notify the driver of behaviors in accordance with information on the driving environment and the surroundings, but the present invention is not limited to this example. For example, notifier 92 may be caused to notify the driver of behaviors when driver makes a predetermined input.

Figure 10:
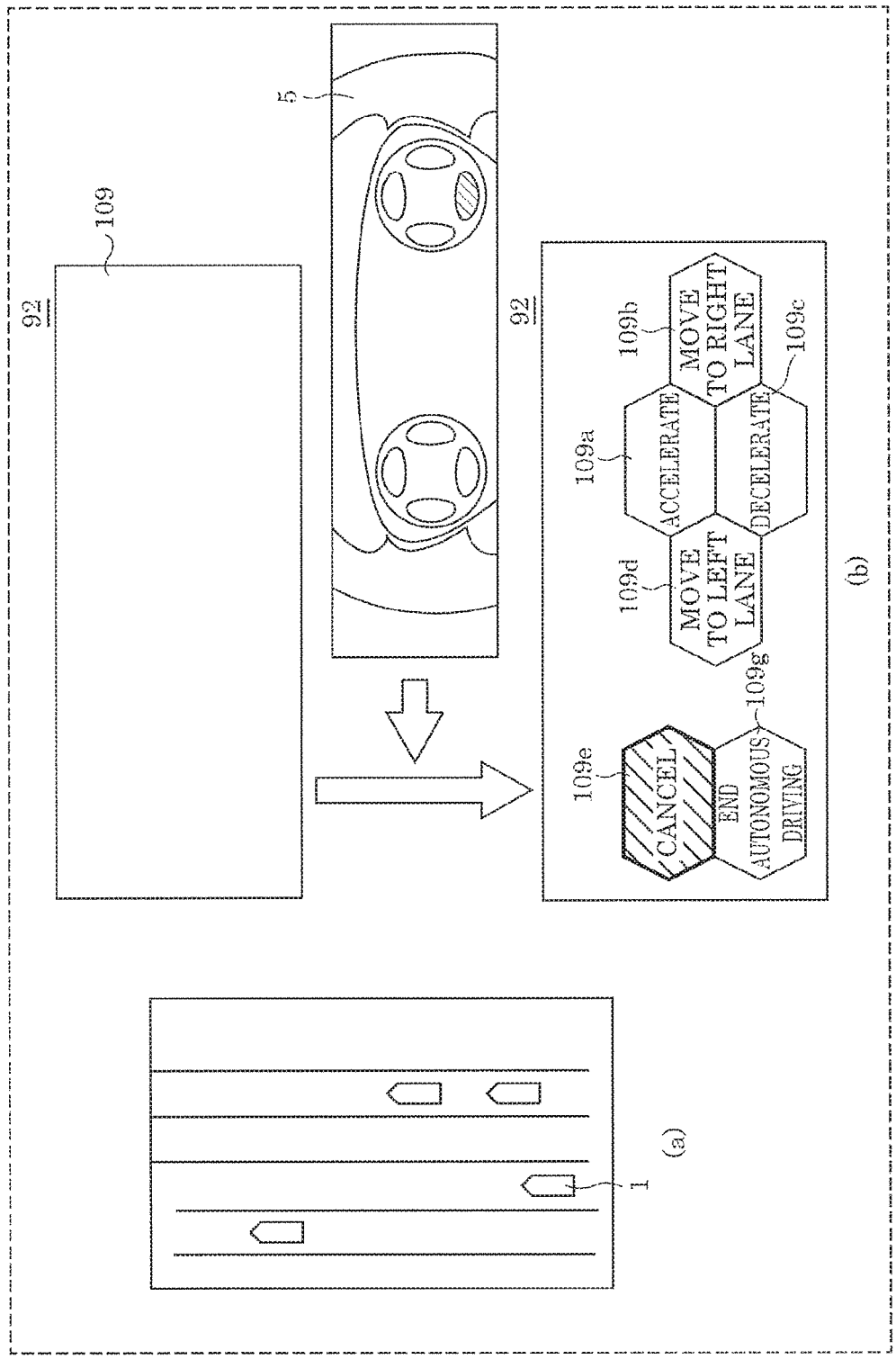
FIG. 10 illustrates a fifth example of the driving environment and display control related to the fifth example.

FIG. 10 illustrates a fifth example of a driving environment and display control related to the fifth example. In FIG. 10, (a) illustrates a bird's-eye view of the driving environment of vehicle 1. More specifically, (a) in FIG. 10 illustrates a driving environment in which it is possible for vehicle 1 to change lanes to the left and to the right.

The driving environment illustrated in (a) in FIG. 10 differs from the driving environments illustrated in (a) in FIG. 5 through (a) in FIG. 9 in that normal driving, i.e., driving in which changing lanes, acceleration or deceleration is not necessary, is possible. In this case, vehicle controller 7 need not cause notifier 92 to display information on the driving environment as text information, as is illustrated in display 109 in (b) in FIG. 10.

In this way, in situations where text information is not displayed on notifier 92, when the driver presses any one of the input buttons in input interface 51, vehicle controller 7 reads, from storage 8, behavior candidates for normal driving.

More specifically, four behavior candidates are stored in storage 8 in association with a normal driving environment, such as the driving environment illustrated in (a) in FIG. 10: causing vehicle 1 to accelerate, causing vehicle 1 to decelerate, causing vehicle 1 to change lanes to the right, and causing vehicle 1 to change lanes to the left. Vehicle controller 7 reads these behavior candidates and displays them in display region 109a through 109d on notifier 92.

Vehicle controller 7 also displays, in display region 99g, "end autonomous driving" which indicates switching to manual driving, and highlights and displays, in display region 109e, "cancel" which indicates cancelling of the behavior update.

With the present embodiment described above, it is possible to efficiently notify the driver of candidates for the behavior to be implemented next, and allow the driver to select a preferable behavior.

Note that instead of the driver selecting the behavior to be implemented, the driver may manually perform the behavior directly using, for example, the steering wheel. This allows the driver to quickly switch to manual driving operation at the driver's will.

(Variation)

In the present embodiment described above, the display of notifier 92 is exemplified as displaying text information, but notifier 92 is not limited to this example. For example, notifier 92 may display visual information to the driver using symbols indicating the behaviors. Hereinafter, an example will be given in which the examples illustrated in FIG. 5 and FIG. 7 display symbols as visual indicators to the driver.

Figure 11:
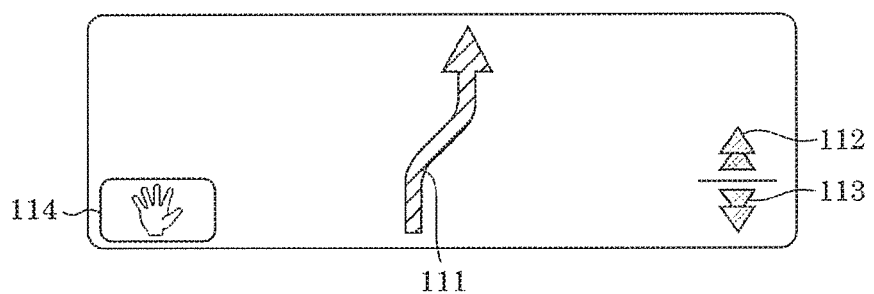
FIG. 11 illustrates another example of display control for the first example of the driving environment illustrated in FIG. 5.

FIG. 11 illustrates another example of display control for the first example of a driving environment illustrated in FIG. 5. In this example, the primary behavior is causing vehicle 1 to switch lanes to the right, and the secondary behaviors are causing vehicle 1 to accelerate and causing vehicle 1 to decelerate.

In these cases, symbol 111 indicating "change lanes", which is the primary behavior, is displayed as a large symbol in the center, symbol 112 indicating "cause vehicle 1 to accelerate" and symbol 113 indicating "cause vehicle 1 to decelerate", which are secondary behaviors, are displayed as small symbols to the right. Moreover, symbol 114 indicating "end autonomous driving" is displayed as a small symbol to the left.

If no instruction to change the behavior of vehicle 1 is received from the driver, vehicle 1 will be caused to change lanes.

Figure 12:
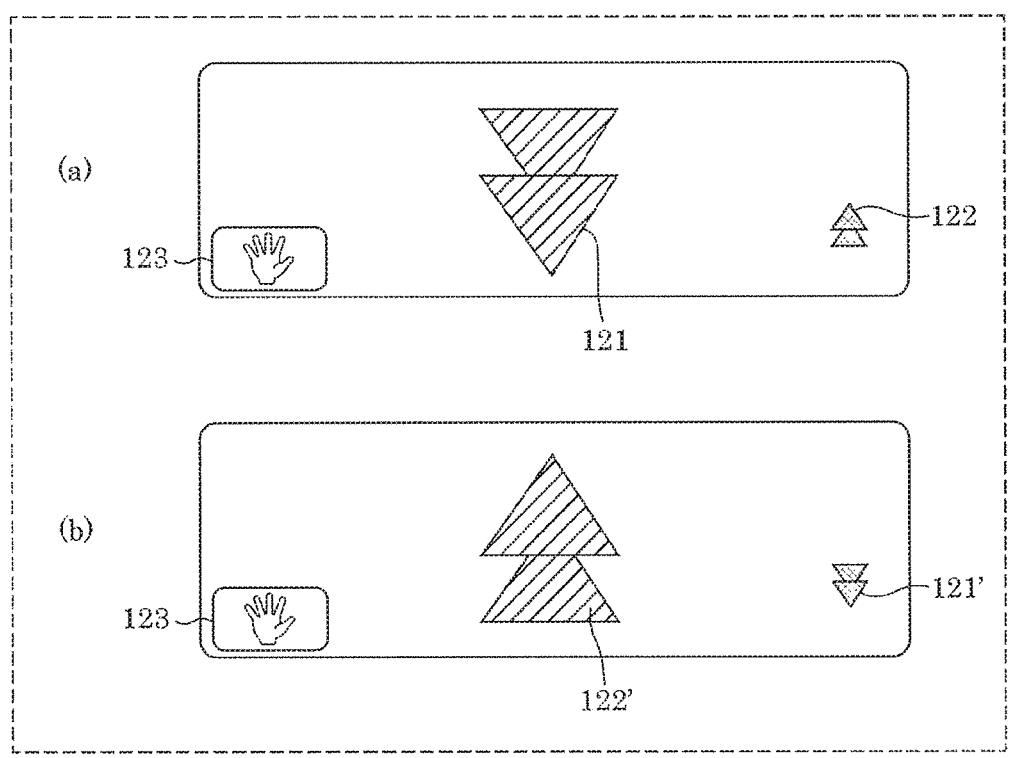
FIG. 12 illustrates another example of display control for the second example of the driving environment illustrated in FIG. 7.

FIG. 12 illustrates another example of display control for the second example of a driving environment illustrated in FIG. 7. In this example, in contrast to the first example, since there is a vehicle driving to the right of vehicle 1, vehicle 1 cannot change lanes. Accordingly, "cause vehicle 1 to decelerate" is set as the primary behavior, and "cause vehicle 1 to accelerate" is set as a secondary behavior.

In these cases, as illustrated in (a) in FIG. 12, symbol 121 indicating "cause vehicle 1 to decelerate", which is the primary behavior, is displayed as a large symbol in the center, and symbol 122 indicating "cause vehicle 1 to accelerate", which is a secondary behavior, is displayed as a small symbol to the right. Moreover, symbol 123 indicating "end autonomous driving" is displayed as a small symbol to the left.

Here, we will assume input interface 51 receives an input selecting "cause vehicle 1 to accelerate" from the driver. In these cases, as illustrated in (b) in FIG. 12, symbol 122' indicating "cause vehicle 1 to accelerate", which is the primary behavior, is displayed as a large symbol in the center, and symbol 121' indicating "cause vehicle 1 to decelerate", which is a secondary behavior, is displayed as a small symbol to the right.

With the present embodiment described above, it is possible to efficiently notify the driver of candidates for the behavior to be implemented next, and allow the driver to select a preferable behavior. The driver can also comprehend the behavior implemented by the vehicle and other selectable behaviors, reassuring the driver and allowing the driver to continue with autonomous driving. Moreover, this allows the driver to give instructions to the vehicle in a smooth manner.

Moreover, with this embodiment, the selections notified by the notifier, i.e., the secondary behaviors, are variable in accordance with the driving environment.

Embodiment 2

In Embodiment 1, an example is given in which inputs based on content displayed on notifier 92 is made via input interface 51 disposed on steering wheel 5. In this embodiment, an example in which a touch panel is used instead of input interface 51 disposed on steering wheel 5.

Figure 13:
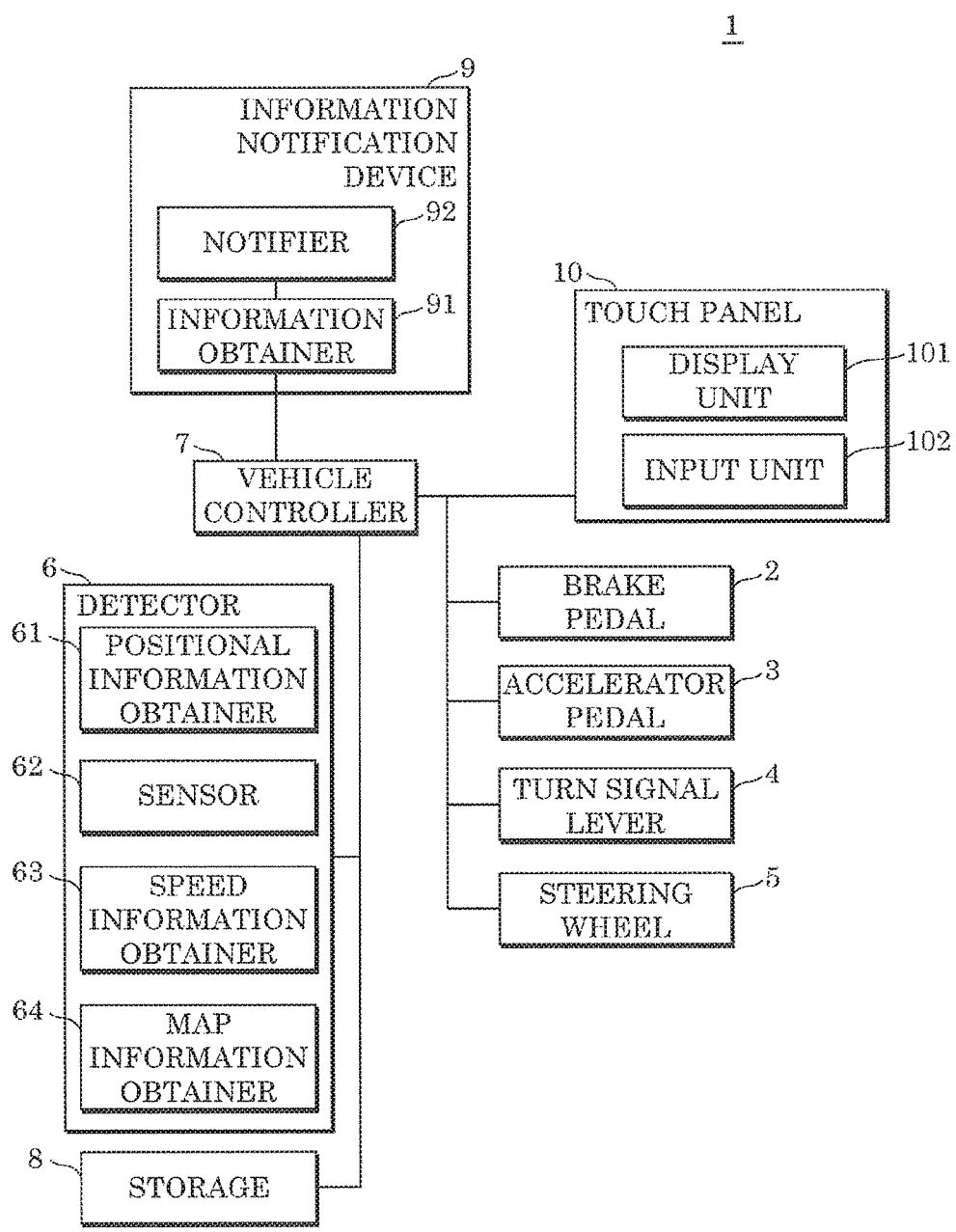
FIG. 13 is a block diagram illustrating relevant components in a vehicle including the information notification device according to Embodiment 2 of the present invention.

FIG. 13 is a block diagram illustrating relevant components in vehicle 1 including the information notification device according to Embodiment 2 of the present invention. Note that in FIG. 13, elements that are the same as in FIG. 1 share like reference marks, and detailed description thereof will be omitted. Vehicle 1 illustrated in FIG. 13 includes touch panel 10 instead of input interface 51 disposed on steering wheel 5.

Touch panel 10 is a device capable of displaying information and receiving an input, such as a liquid crystal panel, and is connected to vehicle controller 7. Touch panel 10 includes display unit 101 that displays information based on control performed by vehicle controller 7, and input unit 102 that receives an input from, for example, the driver, and outputs the received input to vehicle controller 7.

Next, display control related to touch panel 10 will be described. Here, display control for a situation in which vehicle 1 is driving in the middle lane of a three lane road, and it is possible for vehicle 1 to change lanes to either of the left or right lanes will be described.

Figure 14:
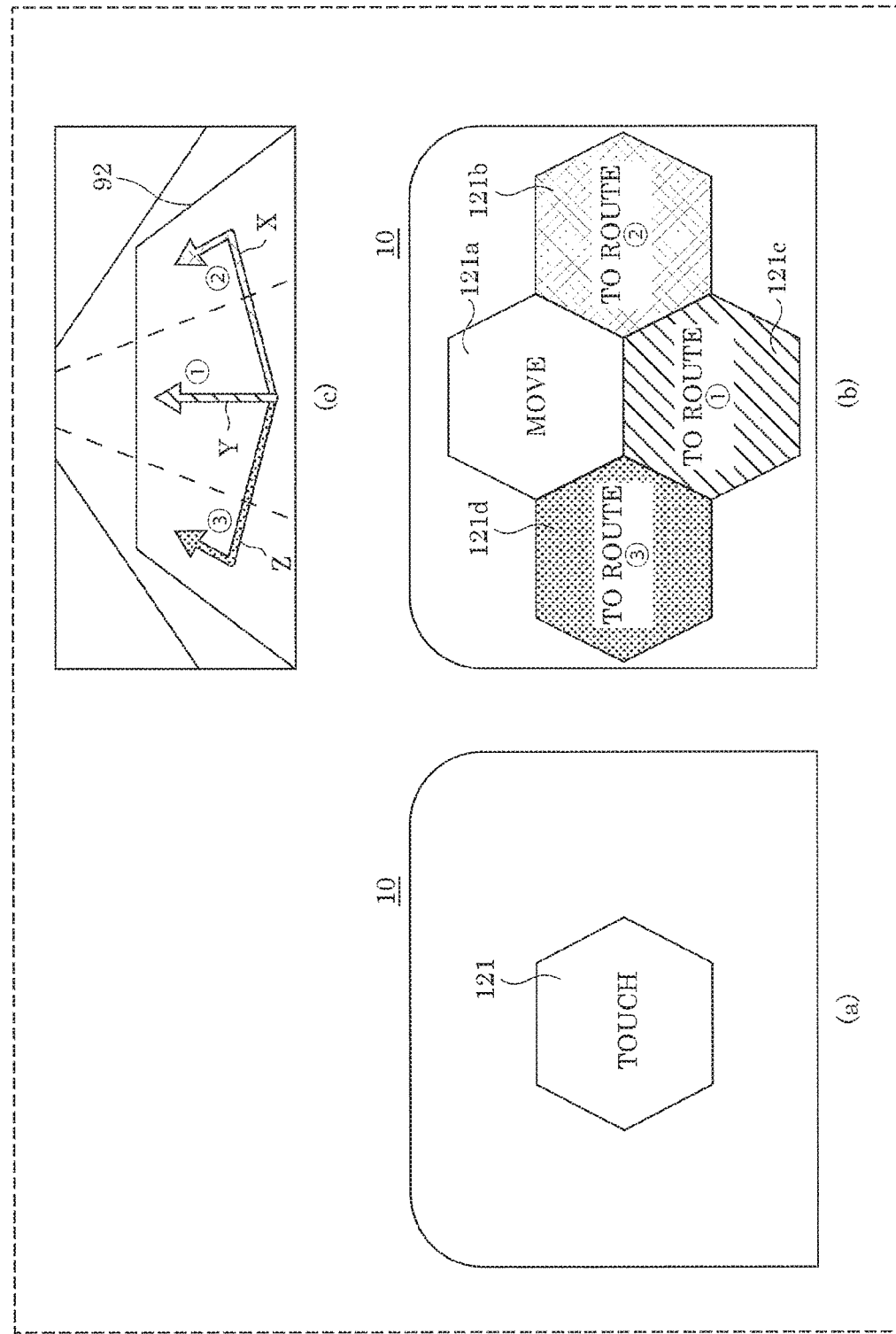
FIG. 14 illustrates screens displayed by a touch panel according to Embodiment 2.

FIG. 14 illustrates screens displayed by touch panel 10 according to Embodiment 2. In FIG. 14, (a) illustrates an initial display of display unit 101 of touch panel 10. When vehicle controller 7 determines that vehicle 1 can change lanes to either the right or left lane, vehicle controller 7 causes display unit 101 of touch panel 10 to display a screen like the one illustrated in (a) in FIG. 14. Here, the display of "touch" in display region 121 indicates that touch panel 10 is in a mode in which touch inputs can be received by driver.

In the screen illustrated in (a) in FIG. 14, when the driver makes an input by touching display region 121, input unit 102 receives this input and outputs, to vehicle controller 7, information indicating that such an input was made. Upon receiving such information, vehicle controller 7 causes display unit 101 to display the screen illustrated in (b) in FIG. 14, and causes notifier 92 to display the screen illustrated in (c) in FIG. 14.

In (b) in FIG. 14, display region 121a indicating "move" indicating an input instructing vehicle 1 to move is displayed. Moreover, in (b) in FIG. 14, display regions 121b through 121d indicating that vehicle 1 can drive in any of the three lanes are displayed. Note that display regions 121b through 121d each correspond to one of the arrows in (c) in FIG. 14 labeled X, Y, and Z, each of which indicates a lane.

Moreover, each display region in (b) in FIG. 14 and a corresponding one of the arrows in (c) in FIG. 14 correspond in some aspect (for example, color or position). This yields a more intuitive display for the driver.

Further, for example, the thickness of each of the X, Y, and Z arrows may be changed to differentiate between the behavior implemented by the vehicle determined by the vehicle control and the behavior(s) selectable by the driver.

The driver selects a behavior of vehicle 1 by touching one of display regions 121b through 121d corresponding to the lane in which the driver wants to drive. In these cases, input unit 102 receives an input of a behavior selection made by the driver, and outputs, to vehicle controller 7, information on the selected behavior. Then, vehicle controller 7 controls vehicle 1 so as to implement the selected behavior. This results in vehicle 1 driving in the lane that the driver wants to drive in.

Note that the driver may make an input on touch panel 10 via a swipe gesture rather than a touch gesture. For example, in the example illustrated in FIG. 14, when the driver wants to change lanes to the lane indicated by the X arrow in (c) in FIG. 14, the driver swipes to the right on touch panel 10.

In these cases, input unit 102 receives an input of a swipe gesture, and outputs, to vehicle controller 7, information indicating the characteristics of the swipe gesture. Then, vehicle controller 7 controls vehicle 1 so as to implement the selected behavior of changing lanes to the lane indicated by the X arrow.

Further, when display region 121a indicating "move" indicating an input instructing vehicle 1 to move is displayed, "behavior selection" may be announced by speech. This allows for control via only HUD display, eliminating the need for the driver to look at the touch panel.

Moreover, when an input of a touch or swipe gesture is made, an aspect of the display of the lane corresponding to the selected display region of the touch panel may be changed to allow the driver to confirm, before finalizing the selection, which lane is being selected. For example, at the instance that display region b is touched, the thickness of lane X may be enlarged, and in the case that the driver immediately removes his or her finger, lane X may be cancelled from being selected and returned to its original thickness, and at the instant the touch moves to display region 121c, the thickness of lane Y may be enlarged, and in the case that the driver keeps touching display region 121c, lane Y may be selected and lane Y may be displayed as flashing to notify the driver that lane Y has been selected. This makes it possible to select and confirm the selection without making the driver look at his or her hands.

Note that just as in Embodiment 1, vehicle control functions such as acceleration, deceleration, overtaking, and no change may be assigned to display regions in accordance with the driving environment.

According to this embodiment described above, by providing a touch panel instead of the input interface, the driver can intuitively make inputs. Moreover, since it is possible to freely change, for example, the number, shape and size of the display regions which receive the inputs with a touch panel, the degree of freedom with respect to the user interface increases.

Embodiment 3

In Embodiment 1, an example was given in which the primary behavior and the secondary behavior(s) are displayed at the same time. In this embodiment, a configuration in which the primary behavior is first displayed on notifier 92, and after an input is received from the driver, the secondary behavior(s) is/are displayed will be described.

The configuration according to this embodiment includes, in addition to the configuration illustrated in FIG. 1 and described in Embodiment 1, a grip sensor in input interface 51 that detects whether the driver is gripping steering wheel 5 or not.

Figure 15:
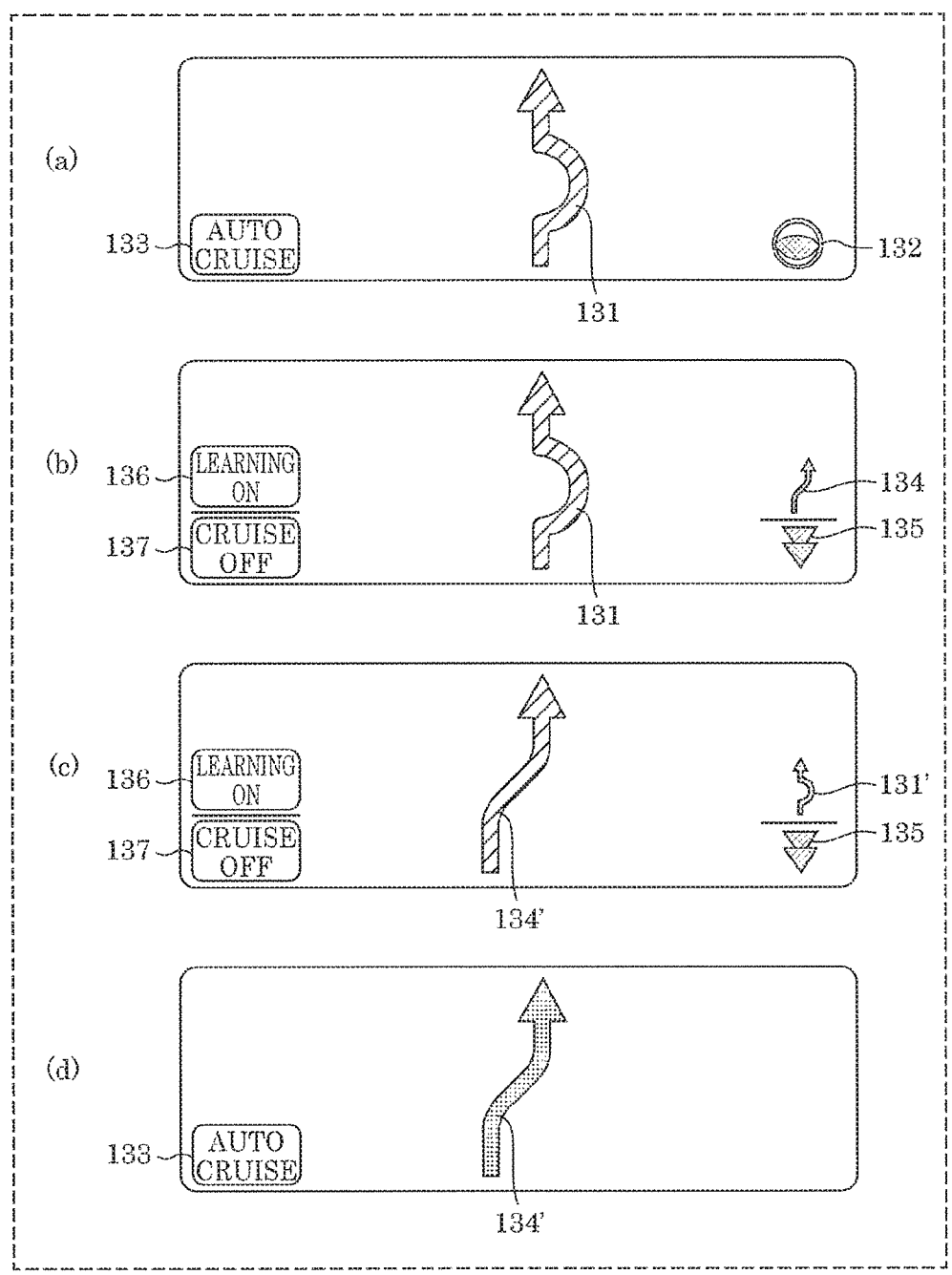
FIG. 15 illustrates screens displayed by a notifier according to Embodiment 3 of the present invention.

FIG. 15 illustrates screens displayed by notifier 92 according to Embodiment 3 of the present invention. Just as in the example illustrated in (a) in FIG. 8, FIG. 15 illustrates an example of a driving environment in which the leading vehicle in front of vehicle 1 is traveling slower than vehicle 1 and vehicle 1 can change lanes to an adjacent lane.

When vehicle controller 7 determines that the driving environment is the driving environment illustrated in (a) in FIG. 8, vehicle controller 7 first causes notifier 92 to display the screen illustrated in (a) in FIG. 15.

In (a) in FIG. 15, among behavior candidates to be implemented after elapse of a first predetermined period of time, symbol 131 indicating "overtake", which is the primary behavior, is displayed in a first aspect (for example, in a first color).

After notifier 92 is caused to display the screen in (a) in FIG. 15, after elapse of a second predetermined period of time, vehicle controller 7 causes notifier 92 change the display of symbol 131 from the first aspect to a different second aspect (for example, a second color different from the first color). Here, the second predetermined period of time is the same as the second predetermined period of time described in Embodiment 1.

In other words, while symbol 131 is being displayed in the first aspect, the driver can select a secondary behavior, but when symbol 131 is changed to the second aspect, the driver is not allowed to select a secondary behavior.

Moreover, in (a) in FIG. 15, symbol 132, which has the shape of a steering wheel and indicates that a secondary behavior is selectable, is displayed. When symbol 132 is being displayed, the secondary behavior(s) are displayed by the driver gripping steering wheel 5. Although symbol 132 indicates that a secondary behavior is selectable, the driver may be notified that a secondary behavior is selectable by symbol 131 being displayed in the first aspect. In these cases, symbol 132 need not be displayed.

Moreover, in (a) in FIG. 15, symbol 133, which indicates that autonomous driving is currently implemented, is displayed. Symbol 133 is an auxiliary display that indicates to the driver that autonomous driving is currently implemented, and symbol 133 need not be displayed.

When the driver grips steering wheel 5 while the screen in (a) in FIG. 15 is being displayed, it is detected by the grip sensor, and information on the detection result is output to vehicle controller 7. In these cases, vehicle controller 7 causes notifier 92 to display the screen illustrated in (b) in FIG. 15.

Just like in (a) in FIG. 15, in (b) in FIG. 15, symbol 131 indicating "overtake", which is the primary behavior, is displayed in the first aspect (for example, in the first color). Moreover, symbol 134 indicating "change lanes", which is a secondary behavior, and symbol 135 indicating "decelerate", which is a secondary behavior, are displayed.

The driver changes the driving behavior from the primary behavior to the secondary behavior by making an input on input interface 51 on steering wheel 5. For example, the driver changes the behavior to "change lanes" (symbol 134) or "decelerate" (symbol 135) by pressing input button 51a or input button 51c (see (c) in FIG. 2) on input interface 51.

Moreover, in (b) in FIG. 15, symbol 136, which indicates that the behavior of vehicle 1 is being learned by vehicle controller 7, is displayed. When symbol 136 is displayed, vehicle controller 7 learns the behavior selected by the driver. Symbol 136 need not be displayed. Moreover, learning may be performed at all times.

In other words, vehicle controller 7 stores, in storage 8, the behavior selected by the driver, and the next time vehicle 1 encounters the same driving environment, vehicle controller 7 causes notifier 92 to display the stored behavior as the primary behavior. Moreover, vehicle controller 7 may store, in storage 8, the number of times that each behavior is selected in the past, and cause notifier 92 to display the most selected behavior as the primary behavior.

Moreover, in (b) in FIG. 15, symbol 137, which indicates that autonomous driving is not currently implemented, is displayed. When symbol 137 is displayed, vehicle controller 7 waits until a behavior to be implemented after elapse of the first predetermined period of time is selected by the driver.

When the driver presses input button 51a on input interface 51 to select "change lanes" while the screen in (b) in FIG. 15 is being displayed, vehicle controller 7 receives information on this selection, and causes notifier 92 to display the screen in (c) in FIG. 15.

In (c) in FIG. 15, symbol 134' indicating "change lanes" is displayed in the first aspect. When vehicle controller 7 receives information on a selection of "change lanes", vehicle controller 7 determines that the selected behavior is the behavior to be implemented next, and causes notifier 92 to display symbol 134' indicating "change lanes" in the first aspect.

Moreover, symbol 131' in (c) in FIG. 15 indicates that symbol 131 displayed as the primary behavior in (b) in FIG. 15 is displayed in place of symbol 134.

The input previously selected by the driver may be cancelled when the driver presses any one of the input buttons twice sequentially while the screen in (c) in FIG. 15 is being displayed. In these cases, vehicle controller 7 receives information on the input of pressing any one of the input buttons twice sequentially, and causes notifier 92 to switch from the screen illustrated in (b) in FIG. 15 to the screen illustrated in (c) in FIG. 15.

After causing notifier 92 to display the screen in (a) in FIG. 15, in the time until the second predetermined period of time elapses, vehicle controller 7 causes notifier 92 to switch displays to the screen in (b) in FIG. 15 or the screen in (c) in FIG. 15, based on the input made by the driver. Vehicle controller 7 then causes notifier 92 to display the screen illustrated in (a) in FIG. 15, and after the second predetermined period of time has elapsed, subsequently causes notifier 92 to display the screen illustrated in (d) in FIG. 15.

Note that when vehicle controller 7 receives information from the grip sensor indicating that the driver has removed his or her hand or hands from steering wheel 5, vehicle controller 7 may cause notifier 92 to display the screen illustrated in (d) in FIG. 15 before the second predetermined period of time has elapsed.

Here, in (d) in FIG. 15, symbol 134' selected by the driver indicating "change lanes" is displayed as the next behavior in the second aspect, and symbol 133 indicating that autonomous driving is currently implemented is once again displayed.

With the present embodiment described above, vehicle controller 7 changes the displays on notifier 92 so that other behavior candidates can be checked only when the driver wants to update the next behavior to be implemented. This configuration makes it possible to reduce the number of displays that the driver looks at and thus reduce burden placed on the driver.

Embodiment 4

In the above embodiments, methods of determining which of a plurality of behavior candidates implementable by vehicle 1 is the most appropriate behavior were described. In this embodiment, a method of determining the most appropriate behavior using a driver model built by preliminary learning will be described.

Here, a method of building a driver model will be described. A driver model is modeling of the tendency of a driver to perform an operation in each driving environment based on, for example, information of the frequency of the behavior. The driver model is built by aggregating a plurality of driver driving environment histories.

A driver driving environment history is, for example, a history in which the frequency of the behavior actually selected by the driver among the plurality of behavior candidates corresponding to the driving environments is aggregated for each behavior candidate.

FIG. 16 illustrates one example of a driving environment history. In FIG. 16, in a driving environment of "nearing a merging region", it is shown that the behavior candidates of "decelerate", "accelerate", and "change lanes" were selected 3 times, 1 time, and 5 times, respectively by driver x. Moreover, in FIG. 16, in a driving environment of "a slow vehicle ahead", it is shown that the behavior candidates of "follow", "overtake", and "change lanes" were selected 2 times, 2 times, and 1 time, respectively by driver x. The same types of statistics are also shown for driver y.

The driver driving environment history may include an aggregation of behaviors selected while autonomous driving, and may include an aggregation of behaviors implemented while the driver was manually driving. This makes it possible to collect a driving environment history in accordance with the driving state, i.e., where the vehicle was being autonomously or manually driven.

Driver models include clustering driver models in which driving environment histories for a plurality of drivers are clustered and built, and individual adaptive driver models in which a driver model for a specific driver (for example, driver x) is built from a plurality of driving environment histories that are similar to the driving environment history of driver x.

First, the clustering driver model will be described. The building method of the clustering driver model includes preliminarily aggregating driving environment histories for a plurality of drivers, as illustrated in FIG. 16. Then, a plurality of drivers whose driving environment histories have a high degree of similarity, that is to say, a plurality of drivers who have similar driving operation tendencies, are grouped to build the driver model.

FIG. 17 illustrates a method of building a clustering driver model. In FIG. 17, driving environment histories for drivers a through f are shown in a chart. From the driving environment histories for drivers a through a, model A is built from the driving environment histories for drivers a through c, and model B is built from the driving environment histories for drivers d through f.

The degree of similarity in driving environment histories may be treated as a frequency distribution of the frequencies (values) in the driving environment histories for driver a and driver b, and a correlation value for both frequency distributions may be calculated, and the calculated correlation value may be used as the degree of similarity. In such cases, for example, when the correlation value calculated from the driving environment histories for driver a and driver b exceeds a predetermined value, the driving environment histories for driver a and driver b are grouped together.

Note that the calculation of the degree of similarity is not limited to this example. For example, in each driving environment history for driver a and driver b, the degree of similarity may be calculated based on the number of behaviors having the highest frequency that match.

Then the clustering driver model is built by calculating an average for each frequency in the driving environment histories of the drivers in the same group, for each group.

FIG. 18 illustrates one example of a built clustering driver model. In the driving environment histories of the drivers in each group in FIG. 17, the average of each frequency is calculated to calculate a driving environment history average frequency for the group. In this way, the clustering driver model is built using an average frequency for a behavior defined per driving environment.

Note that the driver model may be built using only the highest frequency from among the calculated average frequencies. FIG. 19 illustrates one example of another built clustering driver model. As illustrated in FIG. 19, the most frequency behavior is selected per driving environment, and the driver model is built using the selected behavior.

Here, a usage method of the built clustering driver model will be described by giving an example.

The driver model illustrated in FIG. 18 is stored in storage 8 in vehicle 1 in advance. Moreover, vehicle controller 7 stores in advance in storage 8 the driving environment history for when driver y previously drove the vehicle. Note that driver y is identified using, for example, a camera (not illustrated in the drawings) installed in the cabin of the vehicle.

Vehicle controller 7 then calculates a degree of similarity between the driving environment history for driver y and each model driving environment history in the driver model, and determines which model is the most appropriate for driver y. For example, in the case of the driving environment history for driver y illustrated in FIG. 16 and the driver model illustrated in FIG. 18, vehicle controller 7 determines that model B is most appropriate for driver y.

During autonomous driving, in each driving environment in model B, vehicle controller 7 determines that the most frequent behavior is the most appropriate behavior for driver y, that is to say, is the primary behavior.

In this way, by building, in advance, a driver model from driving environment histories of a plurality of drivers, the driver can be notified of an even more appropriate behavior.

For example, as illustrated in FIG. 16, even when the frequency of a behavior for the driving environment "a slow vehicle ahead" in the driving environment history for driver y is 0, that is to say, even when the driver has never selected a behavior of "follow", "overtake", or "change lanes" in the driving environment "a slow vehicle ahead", vehicle controller 7 can determine "follow" as the primary behavior in the driving environment "a slow vehicle ahead", based on model B illustrated in FIG. 18.

Next, an individual adaptive driver model will be described. The building method of the individual adaptive driver model includes preliminarily aggregating driving environment histories for a plurality of drivers, as illustrated in FIG. 16, just like with the clustering driver model. Here, the point of difference with the clustering driver model is that the driver model is built for each driver. Hereinafter, an example will be given in which a driver model is built for driver y.

First, from among the aggregated driving environment histories for the plurality of drivers, a plurality of driver driving environment histories having a high degree of similarity with the driving environment history for driver y are extracted. Then, the driver model for driver y is built from the extracted driving environment histories for the plurality of drivers.

FIG. 20 illustrates a method of building an individual adaptive driver model. Just like in FIG. 17, in FIG. 20, driving environment histories for drivers a through f are shown in a chart. Moreover, in FIG. 20, it is shown that the driver model for driver y is built from the driving environment history for driver y illustrated in FIG. 16, and the driving environment histories for drivers c through e having a high degree of similarity.

The individual adaptive driver model is built by calculating an average for each frequency in the extracted driving environment histories for the drivers.

FIG. 21 illustrates one example of a built individual adaptive driver model. In the driving environment history for driver y illustrated in FIG. 16 and the driving environment histories for drivers c through e illustrated in FIG. 20, an average frequency is calculated for each behavior, in each driving environment. In this way, the individual adaptive driver model for driver y is build using average frequencies for behaviors corresponding to each driving environment.

Here, a usage method of the built individual adaptive driver model will be described by giving an example.

The driver model for driver y illustrated in FIG. 21 is stored in storage 8 in vehicle 1 in advance. Moreover, vehicle controller 7 stores in advance in storage 8 the driving environment history for when driver y previously drove the vehicle. Note that driver y is identified using, for example, a camera (not illustrated in the drawings) installed in the cabin of the vehicle.

During autonomous driving, in each driving environment in the driver model for driver y, vehicle controller 7 determines that the most frequent behavior is the most appropriate behavior for driver y, that is to say, is the primary behavior.

In this way, by building, in advance, a personal driver model from driving environment histories for a plurality of drivers, the driver can be notified of an even more appropriate behavior.

For example, as illustrated in FIG. 16, even when the frequency of a behavior for the driving environment "a slow vehicle ahead" in the driving environment history for driver y is 0, that is to say, even when the driver has never selected a behavior of "follow", "overtake", or "change lanes" in the driving environment "a slow vehicle ahead", vehicle controller 7 can determine "change lanes" as the primary behavior in the driving environment "a slow vehicle ahead", based on the driver model illustrated in FIG. 21.

Next, an example in which driving characteristics (driving habits) of the driver are obtained and autonomous driving is implemented in accordance with the preferences of the driver. Generally, the actual movements (for example, the acceleration extent, deceleration extent, or steering wheel input amount) made to implement one behavior (for example, to change lanes) differs from driver to driver. Accordingly, by implementing autonomous driving in accordance with the preferences of the driver, the driver can have a more pleasant driving experience.

Note that in the following description, an example is given in which driving characteristics of the driver are obtained during manual driving, and the obtained driving characteristics are applied when autonomous driving is implemented, but the present invention is not limited to this example.

Vehicle controller 7 extracts feature amounts indicating driving characteristics of the driver from among driver input information from components in vehicle 1, and stores the feature amount in storage 8. Here, a feature amount is, for example, a feature amount related to speed, a feature amount related to steering, a feature amount related to input timing, a feature amount related to vehicle external detection, or a feature amount related to vehicle internal detection.

The feature amount related to speed includes, for example, the speed of the vehicle, acceleration rate, and deceleration rate, and these feature amounts are obtained from, for example, a speed sensor included in the vehicle.

The feature amount related to steering includes, for example, steering angle, angular velocity, and the acceleration rate of these, and these feature amounts are obtained from, for example, steering wheel 5.

The feature amount related to input timing includes, for example, the input timing of the brake pedal, accelerator, turn signal level, and steering wheel, and these feature amounts are obtained from brake pedal 2, accelerator pedal 3, turn signal lever 4, and steering wheel 5, respectively.

The feature amount related to vehicle external detection includes, for example, inter-vehicle distance, which is the distance between the host vehicle and a vehicle to the front, side, or back of the drier's vehicle, and this feature amount is obtained from sensor 62.

The feature amount related to vehicle internal detection includes personal recognition information indicating who the driver is and who the passengers are, and this feature amount is obtained from, for example, a camera installed inside the cabin of the vehicle.

For example, when the driver manually changes lanes, vehicle controller 7 detects that the driver manually changed lanes. The detection is performed by formulating rules in advance from time series data on lane change inputs, and analyzing time series data on the inputs obtained from, for example, CAN information. In this case, vehicle controller 7 obtains the above-described feature amounts. Vehicle controller 7 stores feature amounts for each driver in storage 8 and builds a driving characteristics model for each driver.

Note that vehicle controller 7 may build the above-described driver model based on the feature amounts for each driver. In other words, vehicle controller 7 extracts a feature amount related to speed, a feature amount related to steering, a feature amount related to input timing, a feature amount related to vehicle external detection, and a feature amount related to vehicle internal detection, and stores them in storage 8. Then, vehicle controller 7 may build a driver model associated with information on frequencies for each input and tendencies of each input by the driver for each driving environment, based on the feature amount stored in storage 8.

FIG. 22 illustrates one example of a driving characteristics model. In FIG. 22, feature amounts for each driver are shown in a chart. Moreover, in FIG. 22, the number of times each behavior was selected in the past is shown for each driver. Although only a portion of the feature amounts are entered in the chart, any or all of the above-described examples of the feature amounts may be entered in the chart.

Next, the feature amounts entered in FIG. 22 will be described in detail. The value for speed indicates the actually speed in steps. The steering wheel, brake, and accelerator values indicate input amounts in steps. These values are obtained by, for example, calculating average values for input amounts for speed, steering wheel, brake, and the accelerator, and expressing these average values in steps.

For example, in FIG. 22, when driver x changes lanes when there are no passengers in the vehicle, the speed level is 8, and the input amount levels for the steering wheel, brake, and accelerator are 4, 6, and 8, respectively.

Upon entering autonomous driving, vehicle controller 7 selects, from the driving characteristics model illustrated in FIG. 22, a driving characteristics model corresponding to the driver, behavior, and passengers, in accordance with who the driver is, what sort of behavior will be implemented, and who the passenger is or passengers are.

Then, vehicle controller 7 causes vehicle 1 to drive at the speed corresponding to the selected driving characteristics model, or controls vehicle 1 based on combinations of the steering wheel, brake, and accelerator input amounts and the timings thereof. This makes it possible to implement autonomous driving in accordance with the preferences of the driver. Note that the information in the driving characteristics model illustrated in FIG. 22 can be notified by notifier 92.

Figure 23:
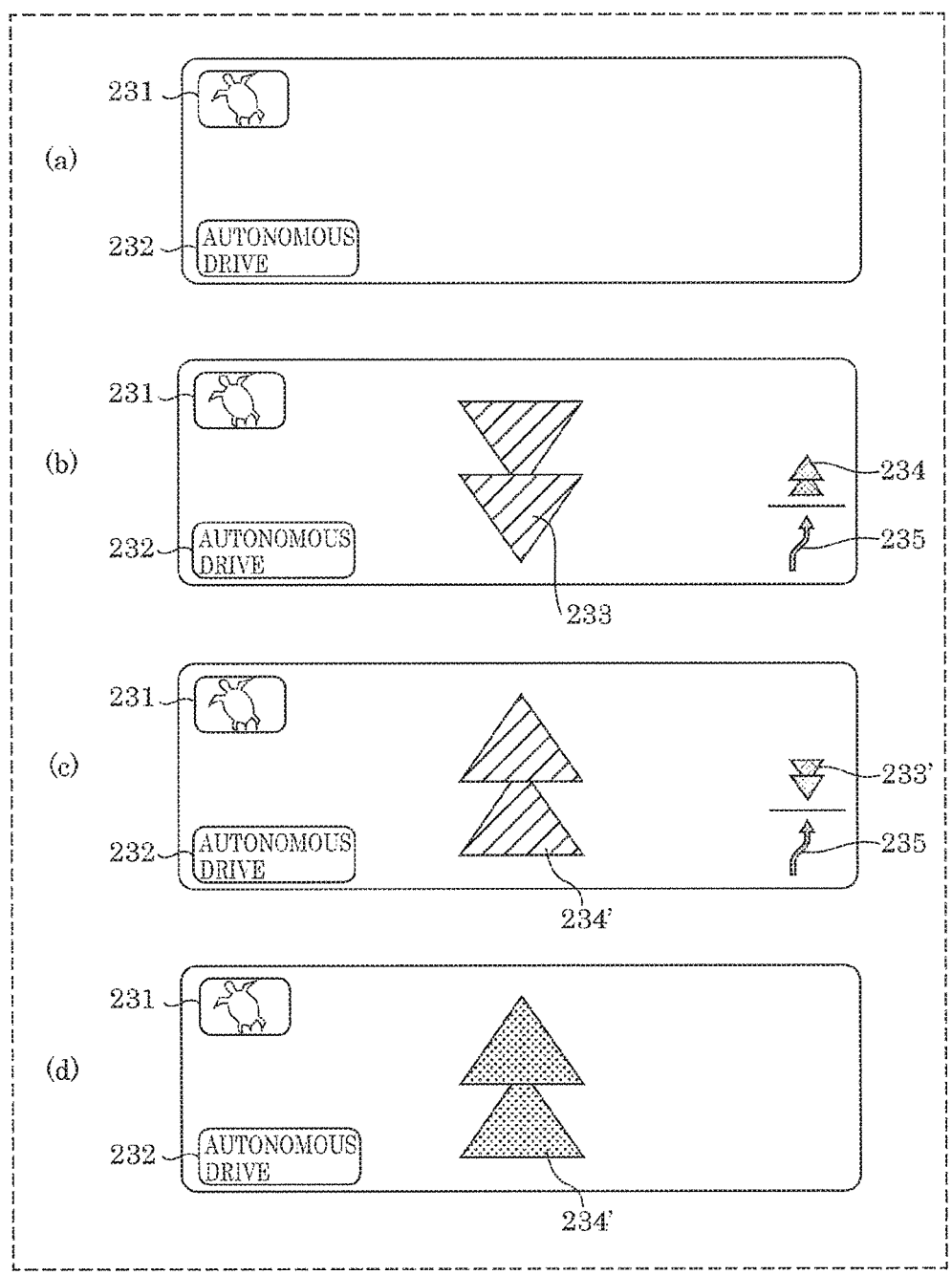
FIG. 23 illustrates screens displayed by a notifier according to Embodiment 4 of the present invention.

FIG. 23 illustrates screens displayed by notifier 92 according to Embodiment 4 of the present invention. The illustrations in FIG. 23 correspond to the first example of a driving environment illustrated in FIG. 5.

In (a) in FIG. 23, a screen displayed by notifier 92 during the normal driving in which the changing of lanes and the acceleration or deceleration of the vehicle are unnecessary. In (a) in FIG. 23, symbol 231 indicating that a driving characteristic of the driver is "decelerates often" and symbol 232 indicating that autonomous driving is currently being implemented are displayed.

Vehicle controller 7 determines a driving characteristic of the driver based on, for example, the number of time each behavior was selected in the past as indicated in the driving characteristics model illustrated in FIG. 22. In these cases, vehicle controller 7 causes notifier 92 to display a screen including symbol 231 such as shown in FIG. 23 to a driver that "decelerates" often (i.e., a driver that selected "decelerate" a high number of times) as determined based on the driving characteristics.

Then, when vehicle controller 7 determines that the driving environment is the first example illustrated in FIG. 5, vehicle controller 7 determines that the primary behavior is "decelerate" based on the fact that the driving characteristic of the driver is "decelerates often", and causes notifier 92 to display the screen illustrated in (b) in FIG. 23.

In (b) in FIG. 23, symbol 233 indicating "decelerate", which is the primary behavior, is displayed in a first aspect (for example, in a first color). Moreover, symbol 234 indicating "accelerate", which is a secondary behavior, and symbol 235 indicating "change lanes", which is a secondary behavior, are displayed.

When the driver changes the behavior to "accelerate" using inputs such as those described in Embodiment 1, vehicle controller 7 causes notifier 92 to display the screen illustrated in (c) in FIG. 23.

In (c) in FIG. 23, symbol 234' indicating "accelerate", which is the selected behavior, is displayed in the first aspect. Moreover, symbol 233' indicates that symbol 233 displayed as the primary behavior in (b) in FIG. 23 is displayed in place of symbol 234.

Vehicle controller 7 then causes notifier 92 to display the screen illustrated in (a) in FIG. 23, and after the second predetermined period of time has elapsed, subsequently causes notifier 92 to display the screen illustrated in (d) in FIG. 23. Here, in (d) in FIG. 23, symbol 234' selected by the driver as the next behavior and indicating "accelerate" is displayed in a second state.

When vehicle controller 7 determines that the next behavior is "accelerate", vehicle controller 7 reads feature amounts corresponding to the behavior "accelerate" from the driving characteristics model, and causes vehicle 1 to implement the behavior "accelerate" incorporated with the feature amounts.

Figure 24:
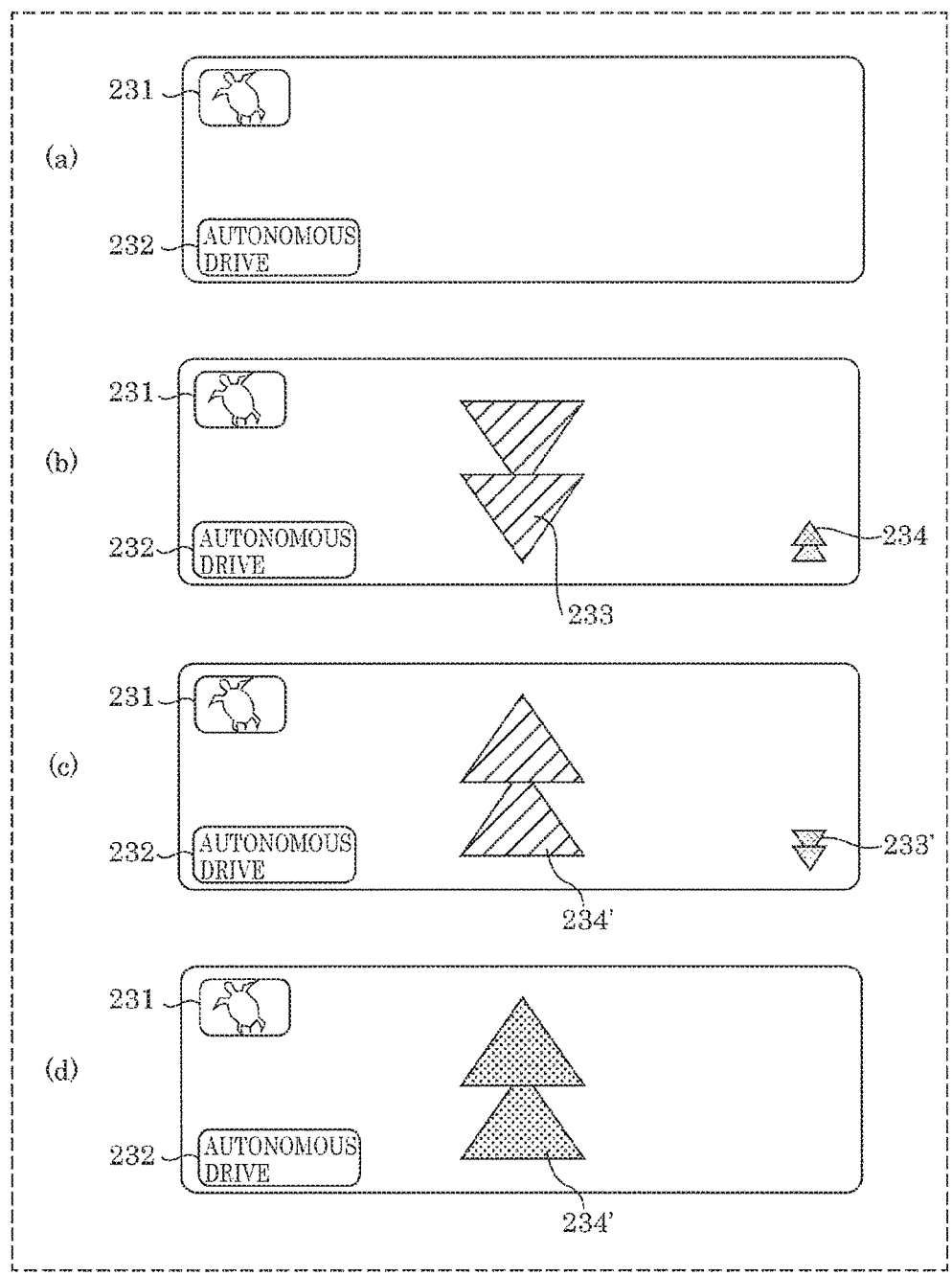
FIG. 24 illustrates screens displayed by a notifier according to Embodiment 4 of the present invention.

FIG. 24 illustrates screens displayed by notifier 92 according to Embodiment 4 of the present invention. The illustrations in FIG. 24 correspond to the second example of a driving environment illustrated in FIG. 7. Note that in FIG. 24, elements that are the same as in FIG. 23 share like reference marks, and detailed description thereof will be omitted. FIG. 24 is the same as FIG. 23 but with symbol 235 indicating "change lanes" removed.

As described before, in the second example (FIG. 7), in contrast to the first example (FIG. 5), since there is a vehicle driving to the right of vehicle 1, vehicle 1 cannot change lanes. Accordingly, in (b) and (c) in FIG. 24, "change lanes" is not displayed. Moreover, in the example illustrated in (c) in FIG. 24, just like in the example illustrated in (c) in FIG. 23, since "accelerate" is selected, vehicle controller 7 reads feature amounts corresponding to the behavior "accelerate" from the driving characteristics model, and causes vehicle 1 to implement the behavior "accelerate" incorporated with the feature amounts, just like in FIG. 23.

Figure 25:
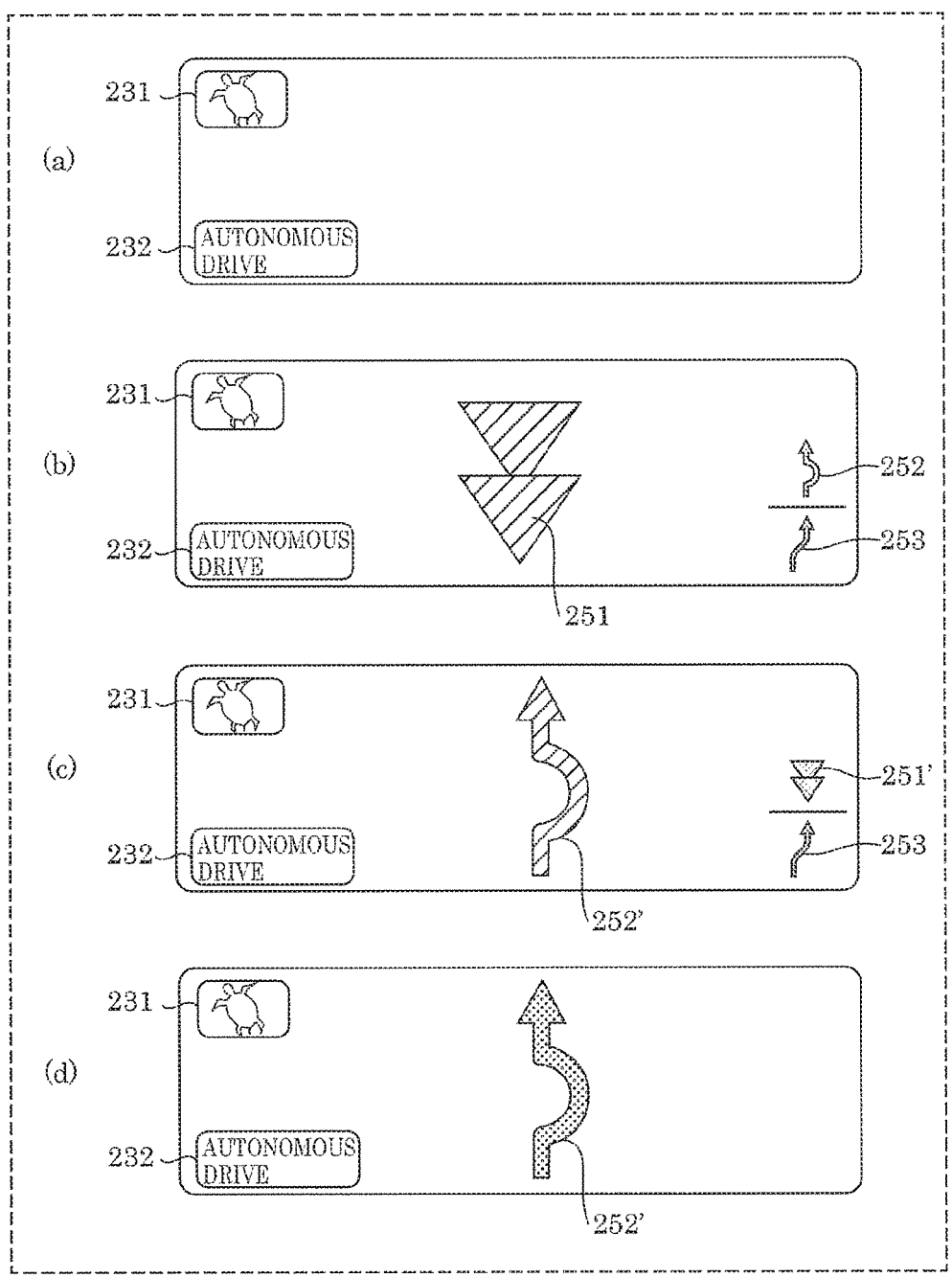
FIG. 25 illustrates screens displayed by a notifier according to Embodiment 4 of the present invention.

FIG. 25 illustrates screens displayed by notifier 92 according to Embodiment 4 of the present invention. The illustrations in FIG. 25 correspond to the third example of a driving environment illustrated in FIG. 8.

(a) in FIG. 25 is the same as (a) in FIG. 23. When vehicle controller 7 determines that the driving environment is the third example illustrated in FIG. 8, vehicle controller 7 determines "decelerate" to be the primary behavior based on the fact that the driving characteristic of the driver is "decelerates often", and causes notifier 92 to display the screen illustrated in (b) in FIG. 25.

In (b) in FIG. 25, symbol 251 indicating "decelerate", which is the primary behavior, is displayed in a first aspect (for example, in a first color). Moreover, symbol 252 indicating "overtake", which is a secondary behavior, and symbol 253 indicating "change lanes", which is a secondary behavior, are displayed.

When the driver changes the behavior to "overtake" using inputs such as those described in Embodiment 1, vehicle controller 7 causes notifier 92 to display the screen illustrated in (c) in FIG. 25.

In (c) in FIG. 25, symbol 252' indicating "overtake", which is the selected behavior, is displayed in the first aspect. Moreover, symbol 251' indicates that symbol 251 displayed as the primary behavior in (b) in FIG. 25 is displayed in place of symbol 252.

Vehicle controller 7 then causes notifier 92 to display the screen illustrated in (a) in FIG. 25, and after the second predetermined period of time has elapsed, subsequently causes notifier 92 to display the screen illustrated in (d) in FIG. 25. Here, in (d) in FIG. 25, symbol 252' selected by the driver as the next behavior and indicating "overtake" is displayed in a second state.

When vehicle controller 7 determines that the next behavior is "overtake", vehicle controller 7 reads feature amounts corresponding to the behavior "overtake" from the driving characteristics model, and causes vehicle 1 to implement the behavior "accelerate" incorporated with the feature amounts.

Next, an example of screens displayed when a driving characteristic of the driver is not "decelerates often".

Figure 26:
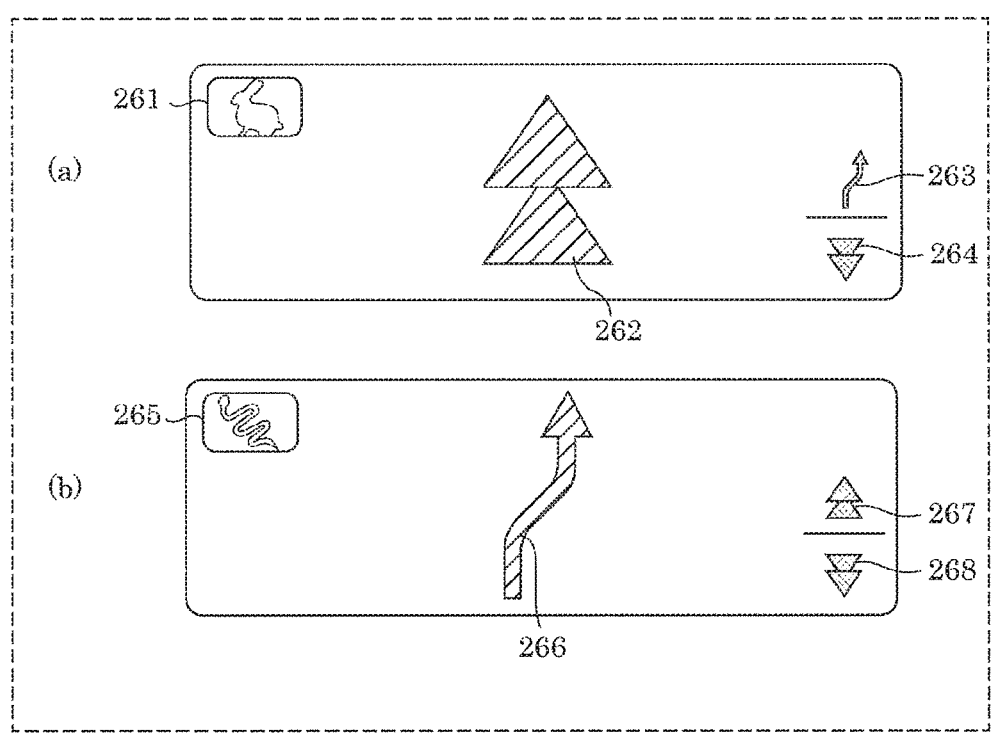
FIG. 26 illustrates screens displayed by a notifier according to Embodiment 4 of the present invention.

FIG. 26 illustrates screens displayed by notifier 92 according to Embodiment 4 of the present invention. The illustrations in FIG. 26 correspond to the first example of a driving environment illustrated in FIG. 5. Note that (a) in FIG. 26 illustrates an example of when a driving characteristic of the driver is "accelerates often", and (b) in FIG. 26 illustrates an example of when a driving characteristic of the driver is "changes lanes often".

In (a) in FIG. 26, symbol 261 indicating that a driving characteristic of the driver is "accelerates often" is displayed. Moreover, symbol 262 indicating "accelerate", which is a primary behavior, is displayed in a first aspect (for example, in a first color). Moreover, symbol 263 indicating "change lanes", which is a secondary behavior, and symbol 264 indicating "decelerate", which is a secondary behavior, are displayed.

Vehicle controller 7 causes notifier 92 to display a screen including symbol 261 such as shown in (a) FIG. 26 to a driver that "accelerates" often (i.e., a driver that selected "accelerate" a high number of times) as determined based on the driving characteristics. Moreover, vehicle controller 7 determines "accelerate" to be the primary behavior based on the fact that the driving characteristic of the driver is "accelerates often", and causes notifier 92 to display the screen illustrated in (a) in FIG. 26.

In (b) in FIG. 26, symbol 265 indicating that a driving characteristic of the driver is "changes lanes often" is displayed. Moreover, symbol 266 indicating "change lanes", which is a primary behavior, is displayed in a first aspect (for example, in a first color). Moreover, symbol 267 indicating "change lanes", which is a secondary behavior, and symbol 268 indicating "decelerate", which is a secondary behavior, are displayed.

For example, vehicle controller 7 causes notifier 92 to display a screen including symbol 265 such as shown in (b) FIG. 26 to a driver that "changes lanes" often (i.e., a driver that selected "change lanes" a high number of times) as determined based on the driving characteristics. Vehicle controller 7 determines "change lanes" to be the primary behavior based on the fact that the driving characteristic of the driver is "changes lanes often", and causes notifier 92 to display the screen illustrated in (b) in FIG. 26.

Hereinbefore, an example using only the driving characteristics model was given, but the driver model may be used in addition to the driving characteristics model, and in FIG. 23, FIG. 25, and FIG. 26, symbol 231 may indicate the type of driver model selected from the input history for the driver. For example, regarding the first example of the driving environment illustrated in FIG. 5, for a driver model that applies to a driver that often selects "decelerate", notifier 92 is caused to display a screen including symbol 231 such as in FIG. 23, and "decelerate" is determined to be the primary behavior. For a driver model that applies to a driver that often selects "accelerate", notifier 92 is caused to display a screen including symbol 261 such as in (a) in FIG. 26, and "accelerate" is determined to be the primary behavior. For a driver model that applies to a driver that often selects "change lanes", notifier 92 is caused to display a screen including symbol 261 such as in (a) in FIG. 26, and "change lanes" is determined to be the primary behavior.

With this embodiment described above, upon determining a future behavior for the vehicle, it is possible to learn the driving environment history of the driver and incorporate the result of the learning into the determination of the future behavior. Moreover, upon the vehicle controller controlling the vehicle, the driving characteristics (driving preferences) of the driver can be learned and this can be applied to the control of the vehicle.

With this, the vehicle can control autonomous driving using timings and input amounts preferred by the driver or passengers, and can inhibit the intervention of unnecessary inputs by the driver during autonomous driving without discrepancy in sensation of when the driver is driving manually.

Note that in the present invention, the functions implemented by vehicle controller 7 may be implemented by a server such as a cloud server. Moreover, storage 8 may be installed in a server such as a cloud server instead of in vehicle 1. Alternatively, storage 8 may store already built driver models and vehicle controller 7 may refer to the driver models stored in storage 8 to determine a behavior.

In this way, in Embodiment 4, vehicle controller 7 is described as obtaining information on a feature amount indicating a driving characteristic of the driver, storing the information on the feature amount in storage 8, and based on information on feature amounts stored in storage 8, building, for each vehicle driving environment, a driver model indicating tendencies of the behaviors of the vehicle selected by the driver using frequencies of each behavior selected.

Moreover, vehicle controller 7 is described as grouping drivers that select similar behaviors together and building a driver model for each vehicle driving environment, for each group.

Moreover, vehicle controller 7 is described as calculating average values of frequencies of behaviors selected by the drivers in each group of drivers that perform similar inputs, and building, for each vehicle driving environment, a driver model indicating tendencies of the behaviors of the vehicle selected by the driver using the calculated average values.

Moreover, vehicle controller 7 is described as building a driver model for each vehicle driving environment based on a vehicle behavior selected by a second driver whose tendencies are similar to tendencies of vehicle behaviors selected by a specific driver, the driver model indicating the tendencies of the vehicle behavior selected by the above-described specific driver using frequencies of each behavior selected.

With this, vehicle controller 7 can build an appropriate driver model from the driving tendencies of the driver, and based on the built driver model, can implement autonomous driving that is even more appropriate for the driver.

(Driver Model Variation)

Note that the driver model described above is modeling of the tendency of a driver to perform an input (behavior) in each driving environment based on, for example, information on the frequency of each input, but the present invention is not limited to this example.

For example, the driver model may be built based on a driving environment history that associates environment parameters indicating past a driving environment (i.e., situation) with an input (behavior) actually selected by the driver in the driving environment. By incorporating the environment parameters into the driver model, the detection and classification of a driving environment can be performed separately, and a selection can be made without having to input (store) the result of the classification into the driver model. More specifically, the differences between the driving environments illustrated in FIG. 23 and FIG. 24 are obtained as environment parameters, and by directly inputting (storing) them into the driver model, "accelerate", "decelerate", and "change lanes" become selections in FIG. 23, and "accelerate" and "decelerate" become selections in FIG. 24. Hereinafter, an example will be given in which such a driver model is built. Note that the driver model described below may also be called a "situation database".

Here, the driving environment history for building the driver model according to this variation will be described. FIG. 27 illustrates one example of a driving environment history. In the driving environment history illustrated in FIG. 27, environment parameters indicating driving environments in which the vehicle driven by driver x has driven in the past are associated with inputs (behaviors) actually selected by the driver in the associated driving environment.

Each set of environment parameters (a) through (c) in the driving environment history illustrated in FIG. 27 indicate, for example, a driving environment corresponding to when vehicle behaviors are presented to the driver such as in (b) in FIG. 8, (b) in FIG. 5, and (b) in FIG. 7, respectively. These environment parameters in the driving environment history are obtained from detected information and infrastructure information.

Detected information is information detected by, for example, a sensor or radar included in the vehicle. Infrastructure information is, for example, GPS information, map information, or information obtained by Vehicle Information and Communication System.

For example, the environment parameters in the driving environment history illustrated in FIG. 27 include: "host vehicle information"; "leading vehicle information" indicating information on the vehicle driving in front of and in the same lane as host vehicle a; "adjacent lane information" indicating information on a lane adjacent to the lane in which the host vehicle is driving; "merge lane information" indicating information on a merge lane when there is a merge lane in the location where the host vehicle e is driving; and "positional information" indicating information on the location of the host vehicle and the surroundings of that location. The environmental parameters may also include information on a vehicle behind the host vehicle. In such cases, the relative speeds of the rear vehicle and the host vehicle, distance between the fronts of the vehicles, and the rate of change in the distance between the fronts of the vehicles may be used. The environmental parameters may also include information on the presence of a vehicle.

For example, "host vehicle information" includes information on the speed Va of the host vehicle. "Leading vehicle information" includes information on the relative speed Vba of the leading vehicle b to the host vehicle, information on the inter-vehicle distance DRba between the leading vehicle and the host vehicle, and information on the rate of change RSb in the size of the leading vehicle.

Here, the speed Va of the host vehicle is detected by a speed sensor included in the host vehicle. The relative speed Vba and the inter-vehicle distance DRba are detected by, for example, a sensor or radar. The rate of change RSb in size is calculated as $RSb=-Vba/DRba$.

"Adjacent lane information" includes information on diagonally rearward vehicle c driving in an adjacent lane and behind the host vehicle, information on diagonally forward vehicle d driving in an adjacent lane and in front of the host vehicle, and information on the residual adjacent lane length DRda of the host vehicle.

The information on the diagonally rearward vehicle includes the relative speed Vca of the diagonally rearward vehicle relative to the host vehicle, the distance Dca between the fronts of the diagonally rearward vehicle and the host vehicle, and the rate of change Rca in the distance between the fronts of the vehicles. The distance Dca between the fronts of the diagonally rearward vehicle and the host vehicle is the distance between the nose (front) of the host vehicle measured in a direction along the direction of travel of the host vehicle (and the diagonally rearward vehicle) and the nose (front) of the diagonally rearward vehicle. Note that the distance between the fronts of the vehicles may be calculated from the inter-vehicle distance and the vehicle lengths. Moreover, the inter-vehicle distance may be used instead of the distance between the fronts of the vehicles.

Here, the relative speed Vca and the distance Dca between the fronts of the vehicles are detected by, for example, a sensor or radar. The rate of change Rca in the distance between the fronts of the vehicles is calculated as $Rca=Vca/Dca$.

The information on the diagonally forward vehicle includes the relative speed Vda of the diagonally forward vehicle relative to the host vehicle, the distance Dda between the fronts of the diagonally forward vehicle and the host vehicle, and the rate of change Rda in the distance between the fronts of the vehicles. The distance Dda between the fronts of the diagonally forward vehicle and the host vehicle is the distance between the nose (front) of the host vehicle measured in a direction along the direction of travel of the host vehicle (and the diagonally forward vehicle) and the nose (front) of the diagonally forward vehicle.

The relative speed Vda and the distance Dda between the fronts of the vehicles are detected by, for example, a sensor or radar. The rate of change Rda in the distance between the fronts of the vehicles is calculated as $Rda=Vda/Dda$.

The residual adjacent lane length DRda for the host vehicle is a parameter indicating the probability that the host vehicle will change lanes to an adjacent lane. More specifically, when the distance between the nose (front) of the host vehicle measured in a direction along the direction of travel of the host vehicle (and the diagonally forward vehicle) and the rear of the diagonally forward vehicle is longer than the inter-vehicle distance DRba between the leading vehicle and the host vehicle, the residual adjacent lane length DRda for the host vehicle is the distance between the nose (front) of the host vehicle and the rear of the diagonally forward vehicle, and when the distance between the nose (front) of the host vehicle and the rear of the diagonally forward vehicle is less than DRba, the DRda is DRba. The residual adjacent lane length DRda for the host vehicle is detected by, for example, a sensor or radar.

"Merge lane information" includes information on the relative speed Vma of a margining vehicle relative to the host vehicle, information on the distance Dma between the fronts of the merging vehicle and the host vehicle, information on the rate of change Rma in the distance between the fronts of the vehicles. Here, the distance Dma between the fronts of the merging vehicle and the host vehicle is the distance between the nose (front) of the host vehicle measured in a direction along the direction of travel of the host vehicle (and the merging vehicle) and the nose (front) of the merging vehicle.

The relative speed Vma and the distance Dma between the fronts of the vehicles are detected by, for example, a sensor or radar. The rate of change Rma in the distance between the fronts of the vehicles is calculated as Rma=Vma/Dma.

In the driving environment history example illustrated in FIG. 27, values indicating the speed, distance, and rate of change described above are classified into one of a plurality of levels, and values indicating the levels into which the values are classified are stored in the driving environment history. Note that the values indicating the speed, distance, and rate of change may be stored as-is without being classified into levels.

The positional information includes information such as "host vehicle positional information", "number of driving lanes", "lane in which host vehicle is driving", "distance until start/end of merging section", "distance until start/end of divergence", distance until start/end of construction section", "distance until start/end of section where lane ends", and "distance until scene of accident". In FIG. 27, "lane in which host vehicle is driving" (indicated as "driving lane" in FIG. 27) and "distance until start/end of merging section" are given as positional information examples.

For example, in the "host vehicle positional information" column, value information indicating longitude and latitude coordinates obtained by GPS are stored. In the "number of driving lanes" column, the number of driving lanes on the road being driven on is stored. In the "lane in which host vehicle is driving" column, value information indicating the position of the lane being driven in is stored. In the "distance until start/end of merging section" column, when there is a start or end of a merging section within a predetermined distance, the distance until start or end of the merging section is classified into one of a plurality of predetermined levels, and the level into which it is classified is stored. Note that when there is no start or end of a merging section within the predetermined distance, "0" is stored in the "distance until start/end of merging section" column.

In the "distance until start/end of divergence" column, when there is a start or end of a divergence within a predetermined distance, the distance until start or end of the divergence is classified into one of a plurality of predetermined levels, and the level into which it is classified is stored. Note that when there is no start or end of a divergence within the predetermined distance, "0" is stored in the "distance until start/end of divergence" column. In the "distance until start/end of construction section" column, when there is a start or end of a construction section within a predetermined distance, the distance until start or end of the construction section is classified into one of a plurality of predetermined levels, and the level into which it is classified is stored. Note that when there is no start or end of a construction section within the predetermined distance, "0" is stored in the "distance until start/end of construction section" column.

In the "distance until start/end of section where lane ends" column, when there is a start or end of a section where the lane ends within a predetermined distance, the distance until start or end of the section where the lane ends is classified into one of a plurality of predetermined levels, and the level into which it is classified is stored. Note that when there is no start or end of a section where the lane ends within the predetermined distance, "0" is stored in the "distance until start/end of section where lane ends" column.

In the "distance until scene of accident" column, when there is a scene of an accident within a predetermined distance, the distance until the scene of the accident is classified into one of a plurality of predetermined levels, and the level into which it is classified is stored. Note that when there is no scene of an accident within the predetermined distance, "0" is stored in the "distance until scene of accident" column.

The positional information may further include information on which of the lanes of the road on which the host vehicle is driving is the merging lane, diverging lane, construction lane, ending lane, or accident lane.

Note that the driving environment history illustrated in FIG. 27 is merely one example, and the present invention is not limited to this example. For example, when the adjacent lane information described above is right lane information, the driving environment history may further include "left lane information", which is the adjacent lane on the opposite side.

"Left lane information" includes information on a diagonally rearward vehicle to the left that is driving in the lane to the left of the host vehicle and behind the host vehicle, information on a diagonally forward vehicle to the left that is driving in the lane to the left of the host vehicle and in front of the host vehicle, and information on the residual left lane length DRda of the host vehicle.

The information on the diagonally rearward vehicle to the left includes the relative speed Vfa of the diagonally rearward vehicle to the left relative to the host vehicle, the distance Dfa between the fronts of the diagonally rearward vehicle to the left and the host vehicle, and the rate of change Rfa in the distance between the fronts of the vehicles. The distance Dfa between the fronts of the diagonally rearward vehicle to the left and the host vehicle is the distance between the nose (front) of the host vehicle measured in a direction along the direction of travel of the host vehicle (and the diagonally rearward vehicle to the left) and the nose (front) of the diagonally rearward vehicle to the left.

Here, the relative speed Vfa and the distance Dfa between the fronts of the vehicles are detected by, for example, a sensor or radar. The rate of change Rfa in the distance between the fronts of the vehicles is calculated as Rfa=Vfa/Dfa.

The information on the diagonally forward vehicle to the left includes the relative speed Vga of the diagonally forward vehicle to the left relative to the host vehicle, the distance Dga between the fronts of the diagonally forward vehicle to the left and the host vehicle, and the rate of change Rga in the distance between the fronts of the vehicles. The distance Dga between the fronts of the diagonally forward vehicle to the left and the host vehicle is the distance between the nose (front) of the host vehicle measured in a direction along the direction of travel of the host vehicle (and the diagonally forward vehicle to the left) and the nose (front) of the diagonally forward vehicle to the left.

Here, the relative speed Vga and the distance Dga between the fronts of the vehicles are detected by for example, a sensor or radar. The rate of change Rga in the distance between the fronts of the vehicles is calculated as Rga=Vga/Dga.

Note that here, the examples in the description assume that the directionality of traffic is left-hand traffic, but the same processes may be applied to left-hand traffic by reversing "right" and "left".

Moreover, the driving environment history illustrated in FIG. 27 may include "rearward vehicle information" indicating information on vehicles driving in the same lane as the host vehicle and behind the host vehicle.

The rearward vehicle information includes the relative speed Vea of the vehicle to the behind the host vehicle, relative to the host vehicle, the distance Dea between the fronts of the vehicle behind the host vehicle and the host vehicle, and the rate of change Rea in the distance between the fronts of the vehicles. The distance Dea between the fronts of the vehicle behind the host vehicle and the host vehicle is the distance between the nose (front) of the host vehicle measured in a direction along the direction of travel of the host vehicle (and the vehicle behind the host vehicle) and the nose (front) of the vehicle behind the host vehicle.

Here, the relative speed Vea and the distance Dea between the fronts of the vehicles are detected by for example, a sensor or radar. The rate of change Rea in the distance between the fronts of the vehicles is calculated as Rea=Vea/Dea.

Note that when, for example, the distance between the fronts of the vehicles cannot be measured due to view being blocked by a moving object, instead of the distance between the fronts of the vehicles, measurable inter-vehicle distance may be used, an approximate value obtained by adding a predetermined vehicle length to the inter-vehicle distance may be used, and the distance between the fronts of the vehicles may be calculated by adding a vehicle length associated with the type of vehicle recognized to the inter-vehicle distance. Moreover, regardless of whether the distance between the fronts of the vehicles can be measured or not, instead of the distance between the fronts of the vehicles, measurable inter-vehicle distance may be used, an approximate value obtained by adding a predetermined vehicle length to the inter-vehicle distance may be used, and the distance between the fronts of the vehicles may be calculated by adding a vehicle length associated with the type of vehicle recognized to the inter-vehicle distance.

The driving environment history may include other various information on the driving environment of the vehicle. For example, the driving environment history may include information on the size and/or type of the leading vehicle, an adjacent vehicle, and/or a merging vehicle, and information on the position of the leading vehicle, an adjacent vehicle, and/or a merging vehicle relative to the host vehicle. For example, the type of a vehicle approaching from the rear may be recognized using a camera sensor, and when the vehicle is an emergency vehicle, the driving environment history may include information indicating that the vehicle is an emergency vehicle. This makes it possible to notify information for dealing with the emergency vehicle. Alternatively, as illustrated in FIG. 22, the driving environment history may include values indicating input amounts, expressed in steps, for the steering wheel, brake, and accelerator; and information on passengers.

Moreover, the driver driving environment history may include an aggregation of behaviors selected while autonomous driving, and may include an aggregation of behaviors implemented while the driver was manually driving. This makes it possible to collect a driving environment history in accordance with the driving state, i.e., where the vehicle was being autonomously or manually driven.

Moreover, in the example in FIG. 27, the environment parameters included in the driving environment history are exemplified as parameters indicating the driving environment at the time the associated behavior of the vehicle was shown to the driver, but the environment parameters may be parameters indicating the driving environment at the time driver selected the associated behavior. Alternatively, the driving environment history may include both environment parameters that indicate the driving environment at the time the associated behavior of the vehicle was shown to the driver and environment parameters that indicate the driving environment at the time driver selected the associated behavior.

Furthermore, when vehicle controller 7 generates the bird's-eye views illustrated in (a) in FIG. 2, (a) in FIG. 5, (a) in FIG. 6, (a) in FIG. 7, (a) in FIG. 8, (a) in FIG. 9, and (a) in FIG. 10, or the display illustrated in (c) in FIG. 14, vehicle controller 7 may also generate, as notification information, at least one of information on environment parameters that are highly contributed and information relating to those environment parameters (for example, icons), which are factors for the selection of the primary behavior and secondary behaviors, and may cause notifier 92 to notify of the notification information by, for example, displaying the generated notification information on top of the bird's-eye view.

In these cases, for example, if the contribution of the inter-vehicle distance DRba between the leading vehicle and the host vehicle and/or the rate of change RSb in the size of the leading vehicle is high, vehicle controller 7 may display a region in which the brightness has been increased or the color has been changed between the leading vehicle and the host vehicle in the bird's-eye view, and cause notifier 92 to notify the driver with notification information.

Moreover, vehicle controller 7 may display, as notification information, an icon indicating that the contribution of the inter-vehicle distance DRba between the leading vehicle and the host vehicle and/or the rate of change RSb is high. Vehicle controller 7 may further cause notifier 92 to depict a line segment connecting the leading vehicle and the host vehicle on the bird's-eye view as the notification information or cause notifier 92 to depict line segments connecting all surrounding vehicles to the host vehicle as the notification information, and highlight the line segment connecting the leading vehicle and the host vehicle on the bird's-eye view.

Moreover, instead of a bird's-eye view, vehicle controller 7 may cause notifier 92 to display an augmented reality (AR) display in which, in an image from the perspective of the driver, the region between the leading vehicle and the host vehicle has been brightened more so than the surrounding regions or the color has been changed to a different color than that of the surrounding regions, as the notification information. Moreover, in the perspective image, vehicle controller 7 may cause notifier 92 to display an AR display including, as the notification information, an icon indicating a high contribution environment parameter in the region between the leading vehicle and the host vehicle.

Moreover, in the perspective image, vehicle controller 7 may display an AR display in which a line segment connecting the leading vehicle and the host vehicle is depicted as the notification information or display an AR display in which line segments connecting all surrounding vehicles to the host vehicle are depicted as the notification information, and highlight the line segment connecting the leading vehicle and the host vehicle.

Note that the method of notifying the driver of the high-contribution environment parameters or of information related to the high-contribution environment parameters is not limited to the above method. For example, vehicle controller 7 may generate, as the notification information, an image in which the leading vehicle associated with the high-contribution environment parameters is displayed highlighted, and cause notifier 92 to display the image.

Moreover, vehicle controller 7 may generate, as the notification information, in a bird's-eye view or AR display, information indicating the direction of, for example the leading vehicle associated with the high-contribution environment parameters, and display that information on the host vehicle or in the region surrounding the host vehicle.

Moreover, instead notifying the driver of the high-contribution environment parameters or of information related to the high-contribution environment parameters, for example, display of a leading vehicle associated with low-contribution environment parameters may be subdued by vehicle controller 7 by, for example, reducing the brightness, to thereby generate, as the notification information, information on high-contribution environment parameters or information related to the high-contribution environment parameters, and vehicle controller 7 may cause notifier 92 to display the generated information.

Next, building of a driver model based on the driving environment history of a driver will be described. Driver models include clustering driver models in which driving environment histories for a plurality of drivers are clustered and built, and individual adaptive driver models in which a driver model for a specific driver (for example, driver x) is built from a plurality of driving environment histories that are similar to the driving environment history of driver x.

First, the clustering driver model will be described. The building method of the clustering driver model includes preliminarily aggregating driving environment histories for each driver, such as the driving environment history illustrated in FIG. 27. Then, a plurality of drivers whose driving environment histories have a high degree of similarity, that is to say a plurality of drivers who have similar driving operation tendencies, are grouped to build the driver model.

For example, when the behaviors in the driving environment histories for driver a and driver b are converted into numerical values based on a predetermined rule, the degree of similarity between driving environment histories can be determined from a correlation value of vectors whose elements are the environment parameter values and the behavior values. In such cases, for example, when the correlation value calculated from the driving environment histories for driver a and driver b exceeds a predetermined value, the driving environment histories for driver a and driver b are grouped together. Note that the calculation of the degree of similarity is not limited to this example.

Next, an individual adaptive driver model will be described. The building method of the individual adaptive driver model includes preliminarily aggregating driving environment histories for a plurality of drivers, as illustrated in FIG. 27, just like with the clustering driver model. Here, the point of difference with the clustering driver model is that the driver model is built for each driver. For example, when a driver model is built for driver y, the driving environment history for driver y is compared with driving environment histories for a plurality of other drivers, and those driving environment histories for drivers having high degrees of similarity are extracted. Then, the individual adaptive driver model for driver y is built from the extracted driving environment histories for the plurality of drivers.

Note that a driver model (situation database) based on the driving environment history illustrated in FIG. 27 is not limited to a clustering driver model or a individual adaptive driver model, and may be, for example, built so as to include the driving environment histories for all drivers.

Here, a usage method of the built driver model will be described by giving an example. Hereinafter, an example will be given in which a driver model of aggregated driving environment histories for four drivers a through d is used for driver x. Note that the driver model is built by vehicle controller 7.

FIG. 28 illustrates a usage method of a driver model according to this variation. In FIG. 28, (a) illustrates environment parameters indicating the current driving environment of the vehicle driven by driver x. In FIG. 28, (a) illustrates one example of a driver model for driver x.

As illustrated in (a) in FIG. 28, a behavior (input) for environment parameters indicating the current driving environment is graphed. Vehicle controller 7 obtains the environment parameters at predetermined intervals, and determines the next behavior from the driver model illustrated in (b) in FIG. 28 using a number of the environment parameters as triggers.

The "trigger" may be an environment parameter indicating that a vehicle input needs to be changed, such as when the distance until the start of a merging section is a predetermined distance or less away, or the relative speed relative to the leading vehicle is a predetermined value or less.

Vehicle controller 7 compares the environment parameters illustrated in (a) in FIG. 28 with the environment parameters in the driving environment histories for the driver models illustrated in (b) in FIG. 28, and the behavior associated with the most similar environment parameters is determined to be the primary behavior. Moreover, other behaviors associated with other similar environment parameters are determined to be secondary behaviors.

Whether environment parameters are similar or not is determined from a correlation value of vectors whose elements are environment parameter values. For example, when a correlation value calculated from a vector whose elements are the environment parameter values illustrated in (a) in FIG. 28 and a vector whose elements are the environment parameter values illustrated in (b) in FIG. 28 exceeds a predetermined value, those environment parameters are determined to be similar. Note that the method for determining whether or not environment parameters are similar or not is not limited to this example.

For example, here the behavior is determined based on the degree of similarity between environment parameters, but instead, first, similar environment parameters may be grouped and then statistics may be extrapolated from the environment parameters in the group, and the behavior may be determined from the statistical data.

In this way, by building, in advance, a personal driver model from driving environment histories for a plurality of drivers, the driver can be notified of an even more appropriate behavior. Note that in order to register a safer driving environment history into the database, information may be stored in storage 8 that indicates a criterion for safe driving, vehicle controller 7 may determine whether a driving environment history meets the criterion or not, and vehicle controller 7 may then register driving environment histories that meet the criterion into the database and not register driving environment histories that do not meet the criterion into the database.

Moreover, by associating parameters indicating the driving environment with behaviors, vehicle controller 7 can determine the next behavior with precision without having to determine what kind of driving environment it is specifically, that is to say, without having to label the driving environment.

Note that the driver model (situation database) may be built from a driving environment history in which a behavior selected by the driver during autonomous driving is associated with environment parameters indicating the driving environment at the time the behavior was presented to the driver. Alternatively the driver model (situation database) may be built from a driving environment history in which a behavior selected by the driver during autonomous driving is associated with environment parameters indicating the driving environment at the time the behavior was implemented by the vehicle.

When the environment parameters indicate the driving environment at the point in time that the behavior selected by the driver was implemented by the vehicle, environment parameters that indicate a future driving environment may be predicted from environment parameters indicating the current driving environment, and the behavior associated with the environment parameters that have the highest degree of similarity with the predicted environment parameters from among the environment parameters indicating the driving environment at the point in time that the behavior selected by the driver was implemented by the vehicle may be determined to be the primary behavior, and the behaviors associated with the other similar environment parameters may be determined to be secondary behaviors.

The above-described prediction is performed by, for example, extrapolating environment parameters for a future point in time from environment parameters indicating the current driving environment and environment parameters indicating a driving environment at a point in time before the current driving environment.

Alternatively the driver model (situation database) may be built from both a driving environment history in which a behavior selected by the driver during autonomous driving is associated with environment parameters indicating the driving environment at the time the behavior was presented to the driver and a driving environment history in which a behavior selected by the driver during autonomous driving is associated with environment parameters indicating the driving environment at the time the behavior was implemented by the vehicle.

In such cases, for example, both driving environment histories are stored in a format like the one illustrated in (b) in FIG. 28, and vehicle controller 7 determines the next behavior from the driving environment histories. Here, vehicle controller 7 may assign priorities to the two driving environment histories and may determine the next behavior preferentially from, for example, the driving environment history in which a behavior selected by the driver during autonomous driving is associated with environment parameters indicating the driving environment at the time the behavior was implemented by the vehicle.

Note that in the present invention, the functions implemented by vehicle controller 7 may be implemented by a server such as a cloud server. In particular, since the amount data resulting from the accumulation of driving environment histories is large, storage 8 may be installed in a server such as a cloud server instead of in vehicle 1. Alternatively, storage 8 may store already built driver models and vehicle controller 7 may refer to the driver models stored in storage 8 to determine a behavior.

Note that in a configuration in which storage 8 is installed in a cloud server, a cache is preferably provided to account for instances in which storage 8 cannot be accessed due to a drop in connection speed or disconnection.

Figure 29:
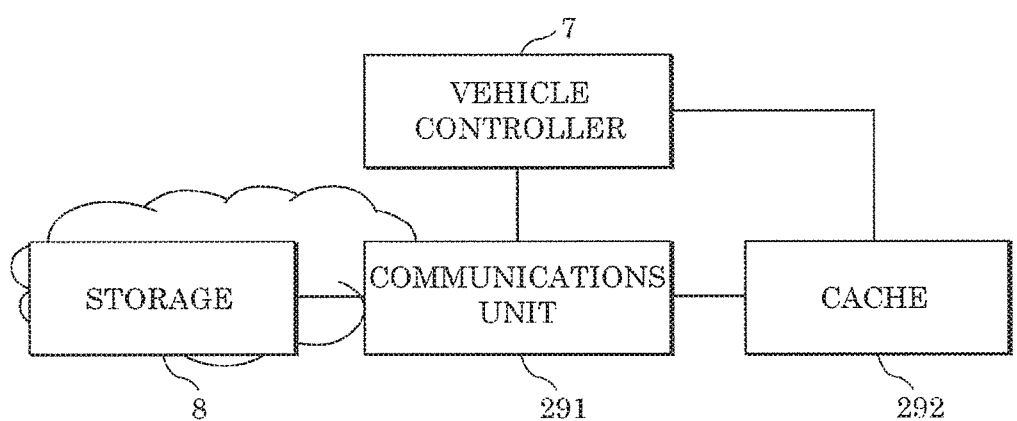
FIG. 29 is a block diagram illustrating one example of a cache arrangement according to this variation.

FIG. 29 is a block diagram illustrating one example of a cache arrangement. Vehicle controller 7 saves driving environment histories in storage 8 via communications unit 291, and causes, via communications unit 291, cache 292 to store some of the driver models (situation databases) stored in storage 8.

Vehicle controller 7 accesses driver models stored in cache 292. Conceivable methods for creating the cache include a method of limiting the cache based on the presence or absence of an environment parameter, a method of using positional information, and a method of processing data. Each will be described in more detail below.

First, the method of limiting the cache based on the presence or absence of an environment parameter will be described. Extracting similar surroundings by comparison is possible if there are sufficient driving environments (situations) including only the same environment parameters. Accordingly, vehicle controller 7 extracts driving environments having only the same environment parameters from among the driving environments stored in storage 8, sorts the extracted driving environments, and stores them in cache 292.

Here, vehicle controller 7 updates the primary cache when an environment parameter obtained from the detected surroundings is updated. With this, vehicle controller 7 can extract similar surroundings even if there is a drop in connection speed. Note that the environment parameter(s) to be checked for updates may be all of the environment parameters described above, or may be one or more of the environment parameters.

Moreover, since the environment parameters update on a moment to moment basis, cache 292 may include a primary cache and a secondary cache. For example, vehicle controller 7 stores driving environments having the same environment parameters in the primary cache. Further, vehicle controller 7 stores, in the secondary cache, at least one of a driving environment temporarily stored in the cache to which one environment parameter has been added and a driving environment temporarily stored in the cache to which one environment parameter has been removed.

With this, vehicle controller 7 can extract a similar surrounding state using only data stored in cache 292, even if the connection is temporarily interrupted.

Figure 30:
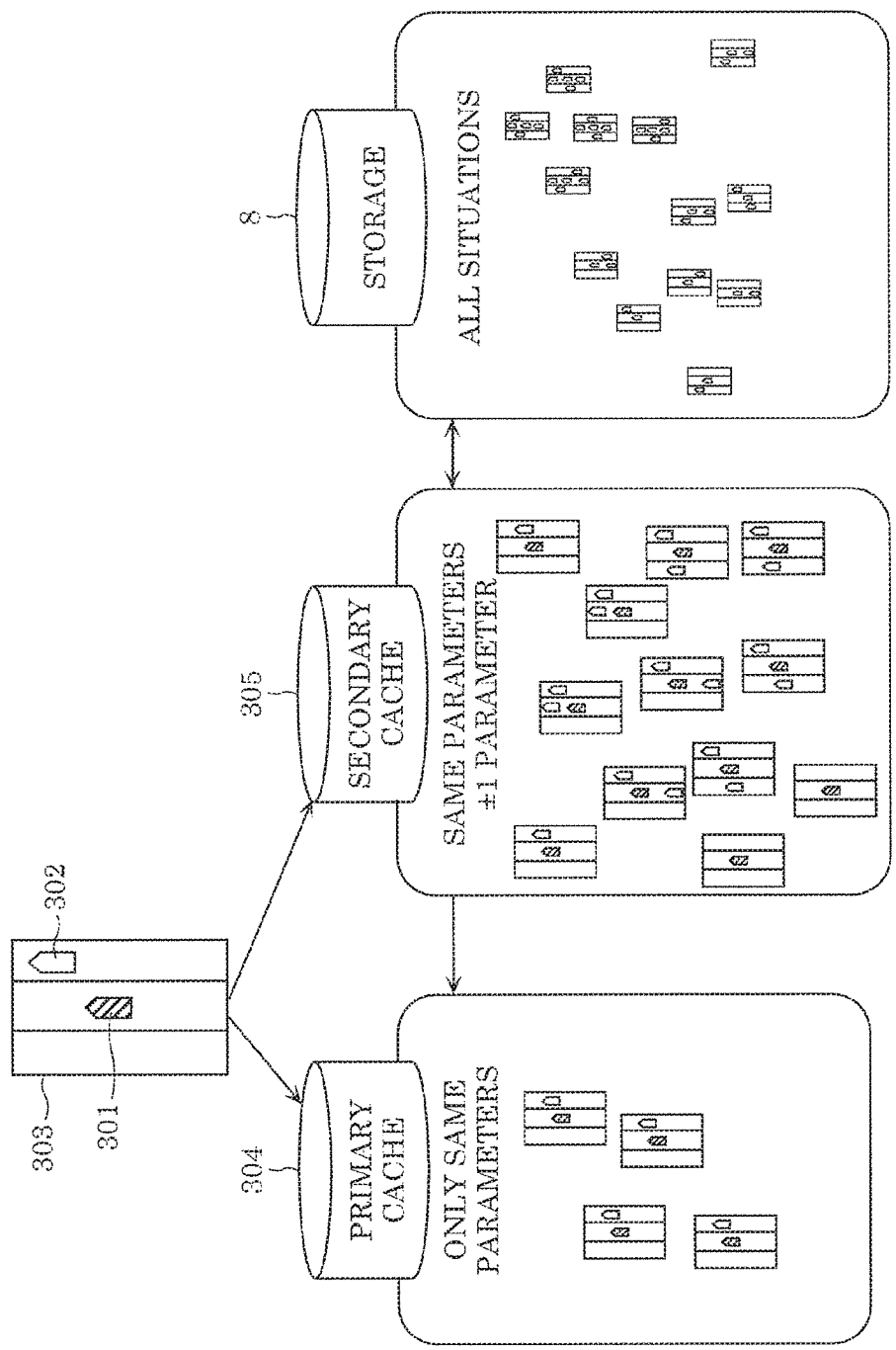
FIG. 30 is a block diagram illustrating one example of a cache creation method according to this variation.

This will be described in further detail with reference to FIG. 30. When sensor 62 detects surrounding state 303 in which only diagonally forward vehicle 302 is present in the surroundings of host vehicle 301, vehicle controller 7 extracts, from storage 8 in which all driving environments (situations) are stored, a driving environment in which only diagonally forward vehicle 302 is present (a driving environment including only the same environment parameters), and stores it in primary cache 304.

Vehicle controller 7 further extracts, from storage 8, a driving environment including, in addition to diagonally forward vehicle 302, one other vehicle (a driving environment to which one environment parameter has been added in addition to the same environment parameters) or a driving environment that does not include diagonally forward vehicle 302 (a driving environment to which one environment parameter has been removed from the same environment parameters), and stores the extracted driving environment in secondary cache 305.

Then, when surrounding state 303 detected by sensor 62 changes, vehicle controller 7 copies the driving environment corresponding to the changed surrounding state 303 from secondary cache 305 to primary cache 304, extracts, from storage 8, a driving environment to which one environment parameter has been added relative to the driving environment corresponding to the changed surrounding state 303 and a driving environment to which one environment parameter has been removed relative to the driving environment corresponding to the changed surrounding state 303, and stores the extracted driving environments into secondary cache 305 to update secondary cache 305. With this, vehicle controller 7 can smoothly extract a similar surrounding state by smoothly comparing surrounding states.

Next, the method that uses positional information will be described. When the environment parameters include positional information, vehicle controller 7 can extract, from storage 8, a driving environment (situation) in which the position indicated in the positional information is within a predetermined range centered on the position of the host vehicle, and store the extracted driving environment in cache 292.

In these cases, when the position indicated in the positional information corresponding to the driving environment is outside of the predetermined range, vehicle controller 7 updates cache 292. With this, even if the connection is interrupted for a long period of time, vehicle controller 7 can extract a similar surrounding state so long as the position is within a predetermined range.

Next, the method including processing data will be described. Input histories including environment parameters are accumulated in storage 8. Vehicle controller 7 divides the environment parameters per predetermined range to generate meshes in a multi-dimensional space. Vehicle controller 7 then generates a table in which behaviors included in the meshes are counted based on classification.

Figure 31:
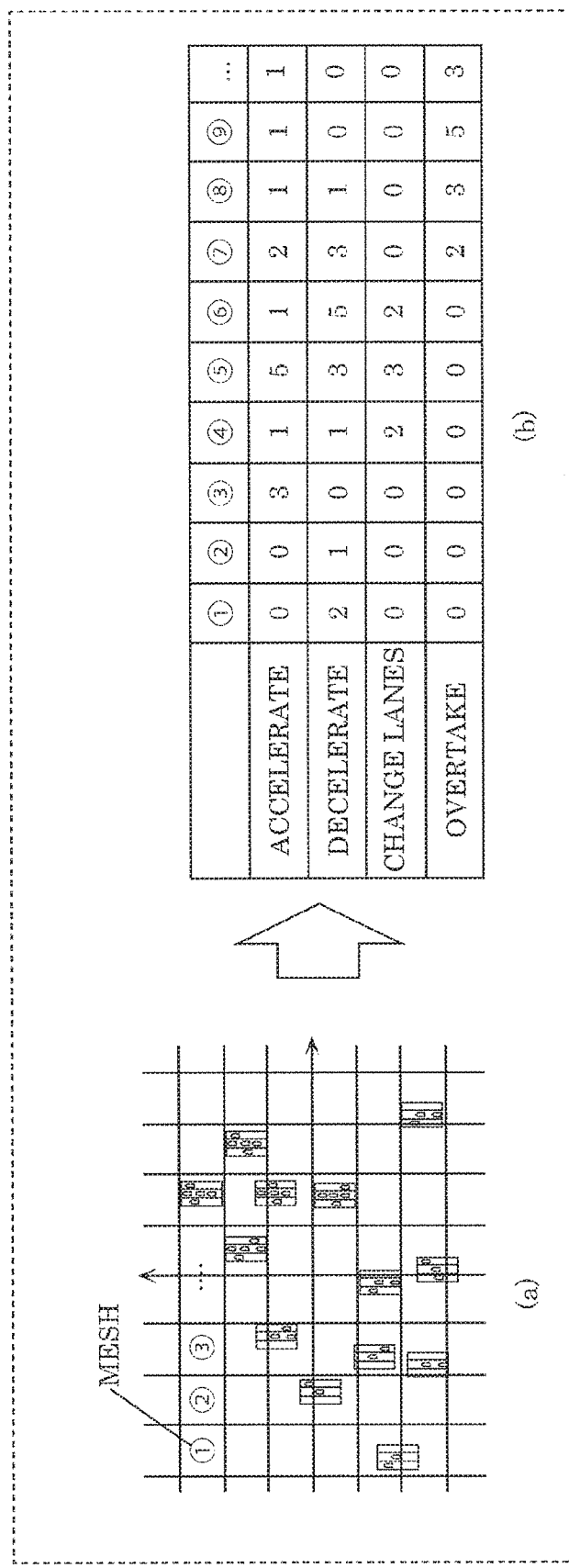
FIG. 31 is a block diagram illustrating one example of a cache creation method according to this variation.

For illustrative purposes, suppose that only two types of environment parameters are used. vehicle controller 7 two-dimensionally maps the environment parameters included in the input histories as illustrated in (a) in FIG. 31, and by dividing the axes of these at predetermined ranges, the plane can be divided into a plurality of blocks. Each of these is referred to as a mesh.

Vehicle controller 7 counts the number of behaviors included in each mesh based on the category of the behavior (for example, accelerate, decelerate, change lanes, overtake, etc.). In FIG. 31, (b) illustrates a table in which the number of behaviors included in each mesh has been counted based on category.

Vehicle controller 7 stores this information in cache 292. Then, upon extracting a similar surrounding state by comparison of surrounding states, vehicle controller 7 determines which mesh the detected environment parameter is positioned in, selects the behavior having the highest count from among the behaviors included in the determined mesh, and determines the selected behavior to be the behavior to be notified to the driver.

For example, when vehicle controller 7 determines that the detected environment parameter is located in mesh number 3, a behavior is determined that notifies of input of the behavior having the highest count from among the behaviors included in mesh number 3 (here, "accelerate"). With this method, cache 292 may be updated at any time, and cache 292 can be maintained at a constant size.

The cache is created using one or a combination of these methods. However, the methods provided above are mere examples to which the creation of the cache is not limited.

In this way, in the driver model expansion example given in Embodiment 4, vehicle controller 7 obtains information on a feature amount indicating driving characteristics of the driver including information on a past driving environment, storage 8 stores the information on the feature amount, and when it is determined that the behavior of the vehicle needs to be changed, vehicle controller 7 determines, from among information on the feature amount stored in storage 8, information that is similar to feature amount indicating the driving characteristics of the driver including information on a newly obtained driving environment, and notifies the driver of a behavior corresponding to the determined information.

Moreover, in the driver model expansion example given in Embodiment 4, information on a feature amount indicating the driving characteristics of the driver including information on a past driving environment is at least one of information on a feature amount at the time the behavior of the vehicle is presented to the driver or information on a feature amount at the time that the driver selected the behavior.

Moreover, in the driver model expansion example given in Embodiment 4, when the information on a feature amount indicating the driving characteristics of the driver including information on a past driving environment is both information on a feature amount at the time the behavior of the vehicle is presented to the driver and information on a feature amount at the time that the driver selected the behavior, vehicle controller 7 determines, from among information on both the feature amounts, information that is similar to a feature amount indicating the driving characteristics of the driver including information on a newly obtained driving environment, and notifies the driver of a behavior corresponding to the determined information.

Moreover, in the driver model expansion example given in Embodiment 4, when the information on a feature amount indicating the driving characteristics of the driver including information on a past driving environment is both information on a feature amount at the time the behavior of the vehicle is presented to the driver and information on a feature amount at the time that the driver selected the behavior, vehicle controller 7 preferentially determines, from among information on feature amounts at the time the driver selected the behavior, information that is similar to a feature amount indicating the driving characteristics of the driver including information on a newly obtained driving environment, and notifies the driver of a behavior corresponding to the determined information.

Moreover, in the driver model expansion example given in Embodiment 4, information on a feature amount indicating the driving characteristics of the driver including information on a past driving environment is information on a feature amount indicating driving characteristics of the driver when the vehicle is being autonomously driven and/or when the vehicle is being manually driven.

With this, vehicle controller 7 can build an appropriate driver model from the driving tendencies of the driver, and based on the built driver model, can implement autonomous driving that is even more appropriate for the driver. By associating parameters indicating the driving environment with behaviors, it is possible to determine the next behavior with precision without having to determine what kind of driving environment it is specifically, that is to say, without having to label the driving environment.

Embodiment 5

Next, Embodiment 5 will be described. In the above embodiment, a method of estimating a driving conduct of the driver was described, but in this embodiment, speed control, inter-vehicle distance control, and acceleration rate control will be described. Driving characteristics (driving habits) regarding speed, inter-vehicle distance, and acceleration rate of the driver when manually driving are collected and applied during autonomous driving.

Figure 32:
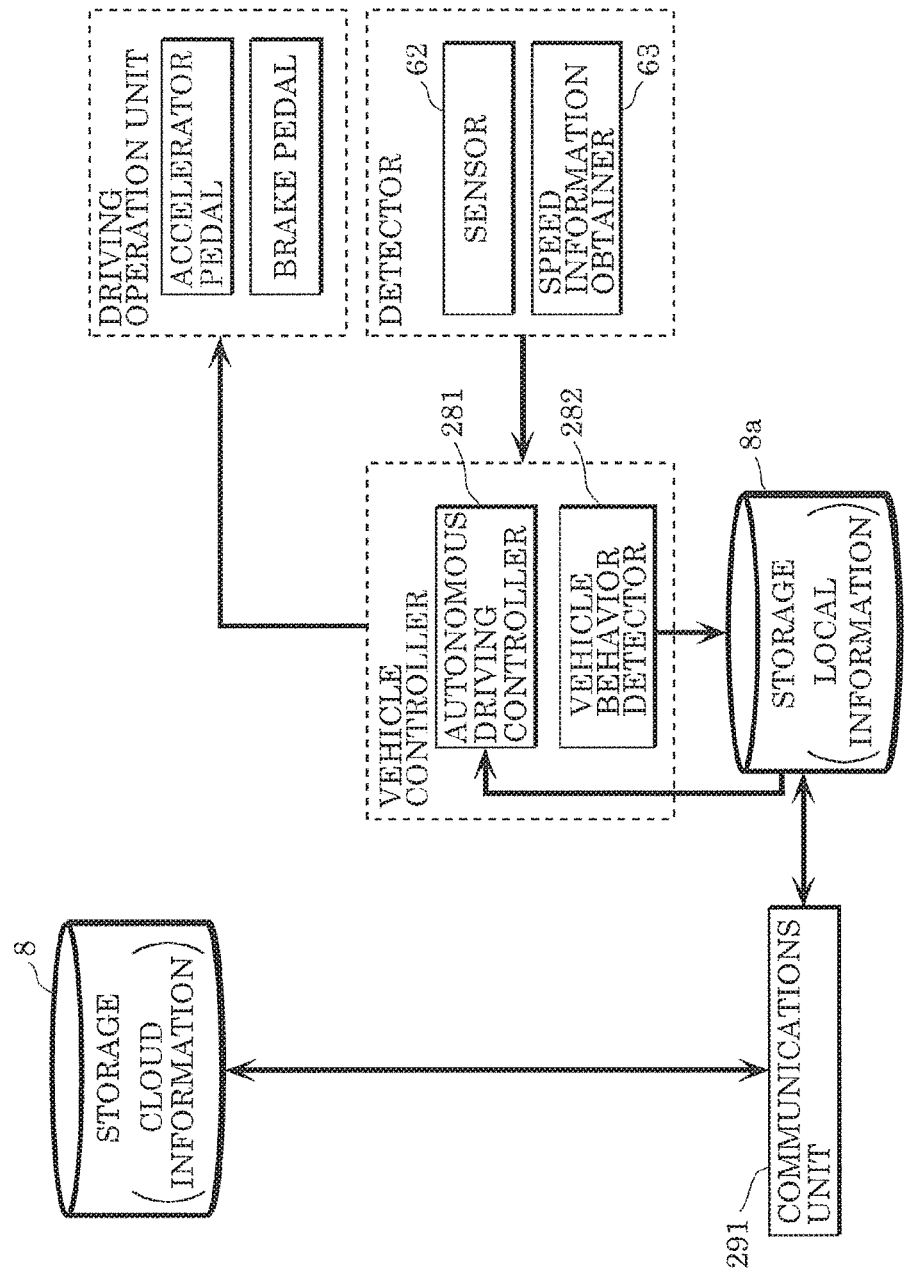
FIG. 32 is a block diagram illustrating relevant components for estimating speed, inter-vehicle distance, and acceleration rate according to Embodiment 5.

This will be described in more detail with reference to FIG. 32. First, the data collection method implemented during manual driving will be described.
(Speed Collection)

Figure 33:
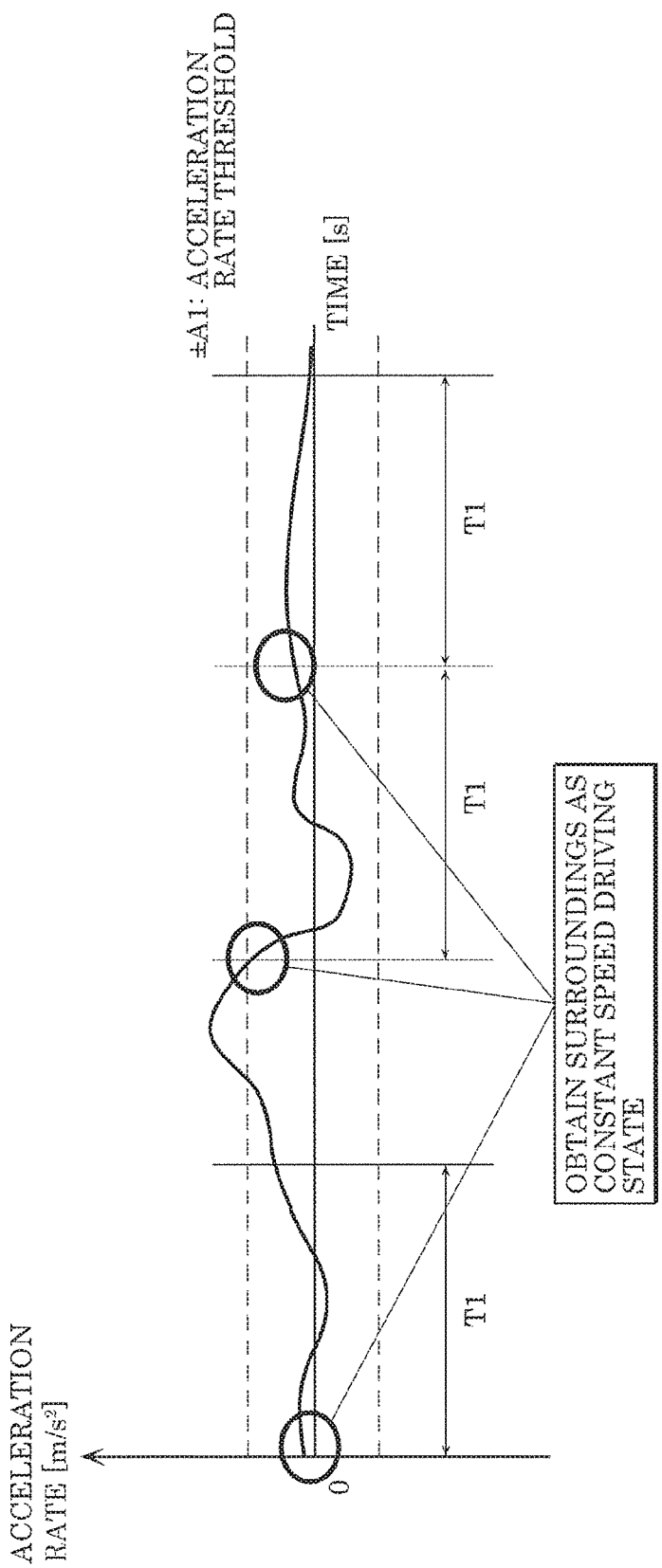
FIG. 33 illustrates the collection timing of the speed and environment parameters according to Embodiment 5.

Vehicle behavior detector 282 according to this embodiment obtains speed information on (the speed of) the host vehicle from speed information obtainer 63 during manual driving, and detects whether there is a leading vehicle or not by using sensor 62. When vehicle behavior detector 282 does not detect a leading vehicle and detects that the host vehicle is driving at a constant speed, vehicle behavior detector 282 stores the speed and environment parameters at that time into storage 8, 8a. For example, as illustrated in FIG. 33, vehicle behavior detector 282 calculates the change in speed, i.e., the acceleration rate, and determines a driving state in which the acceleration rate is within a certain range (threshold ±A1) continuously for a time period of T1 seconds to be a constant speed driving state. Vehicle behavior detector 282 then obtains the speed and environment parameters at the start of the constant speed driving state, stores them in storage 8, 8a, and then restarts the detection of a constant speed driving state. More and more information is stored in storage 8, 8a by repeating these processes. The environment parameters are the same as those described in Embodiment 4, and here indicate the inter-vehicle distance/relative rate of change with a surrounding vehicle, the number of driving lanes, the driving lane position, the driving lane width, and the road condition. Here, driving lane width is a value indicating the width of the lane obtained by a sensor or through an infrastructure, the road condition is a value indicating how slippery the road is obtained by a sensor or through an infrastructure (for example, normal=0, rainy weather=1, icy conditions=2).
(Inter-Vehicle Distance Collection)

Figure 34:
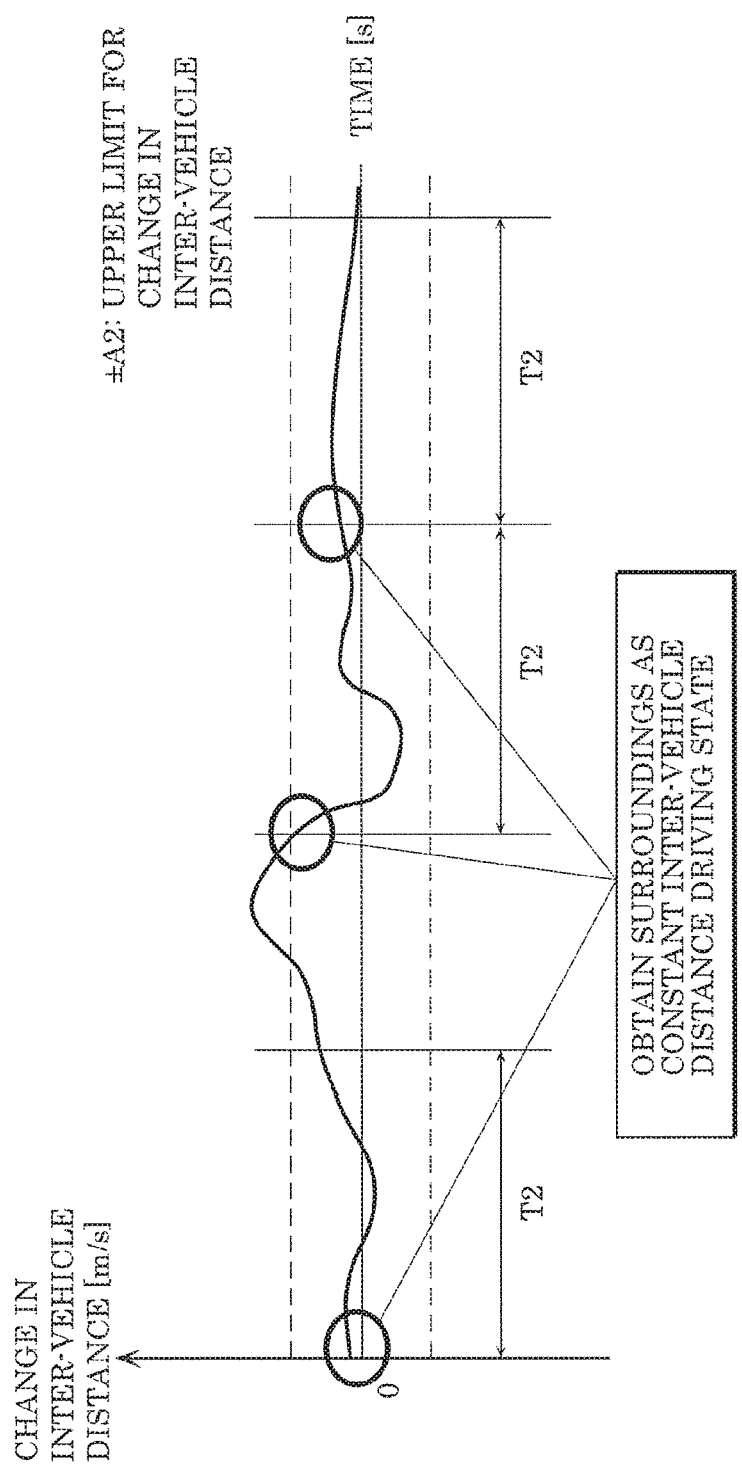
FIG. 34 illustrates the collection timing of the inter-vehicle distance and environment parameters according to Embodiment 6.

As described above, vehicle behavior detector 282 obtains speed information on the host vehicle from speed information obtainer 63 during manual driving, and detects whether there is a leading vehicle or not by using sensor 62. When vehicle behavior detector 282 does detect a leading vehicle and detects that the host vehicle is driving at a constant inter-vehicle distance with the leading vehicle, vehicle behavior detector 282 stores the inter-vehicle distance and environment parameters at that time into storage 8, 8a. For example, as illustrated in FIG. 34, vehicle behavior detector 282 calculates the change in inter-vehicle distance, and determines a driving state in which the variations in inter-vehicle distance are within a certain range (threshold ±A2) continuously for a time period of T2 seconds to be a constant inter-vehicle distance driving state. Vehicle behavior detector 282 then obtains the inter-vehicle distance between the leading vehicle at the start time of the constant inter-vehicle distance driving state and the environment parameters, stores them into storage 8, 8a, and then restarts the detection of a constant inter-vehicle distance driving state. More and more information is stored in storage 8, 8a by repeating these processes. Here, the environment parameters indicate the speed of the host vehicle, the inter-vehicle distance/relative rate of change with a surrounding vehicle (excluding the inter-vehicle distance between the leading vehicle), the number of driving lanes, the driving lane position, the driving lane width, and the road condition.
(Acceleration Rate Collection)

Figure 35:
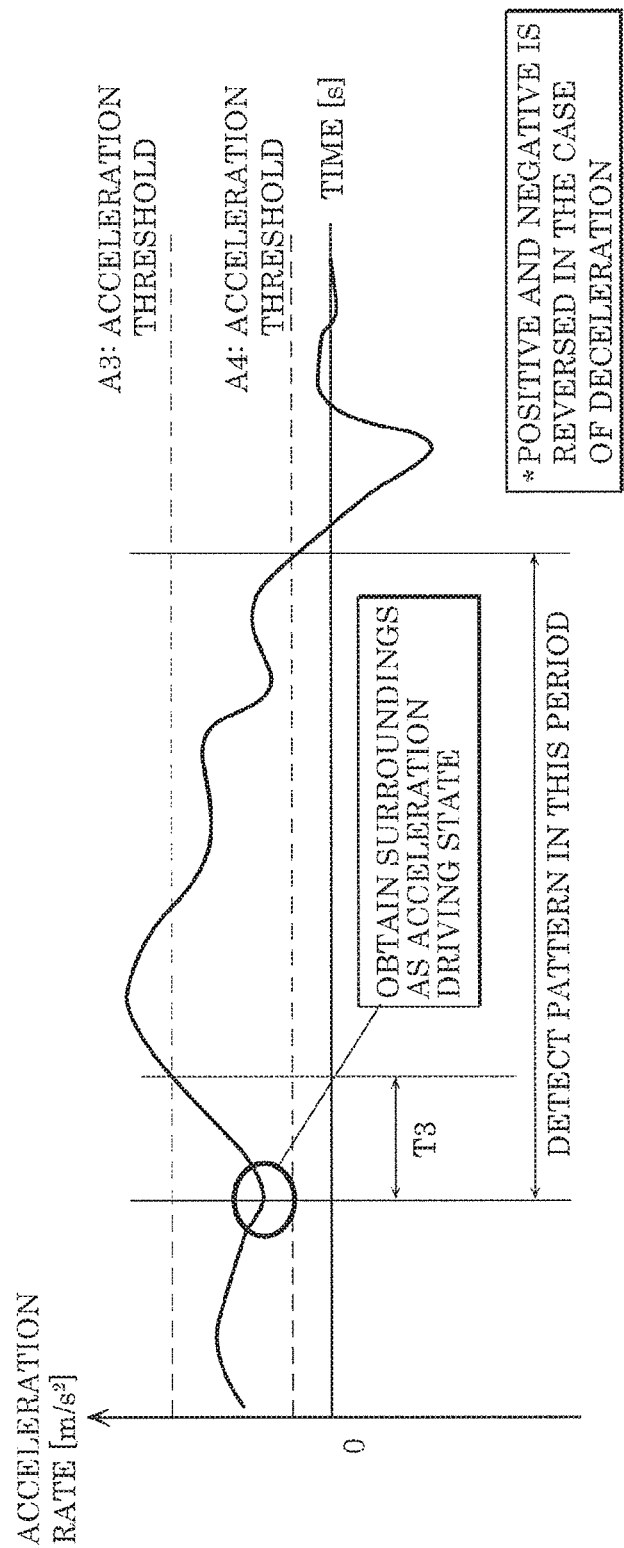
FIG. 35 illustrates the collection timing of the acceleration rate and environment parameters according to Embodiment 5.
Figure 36:
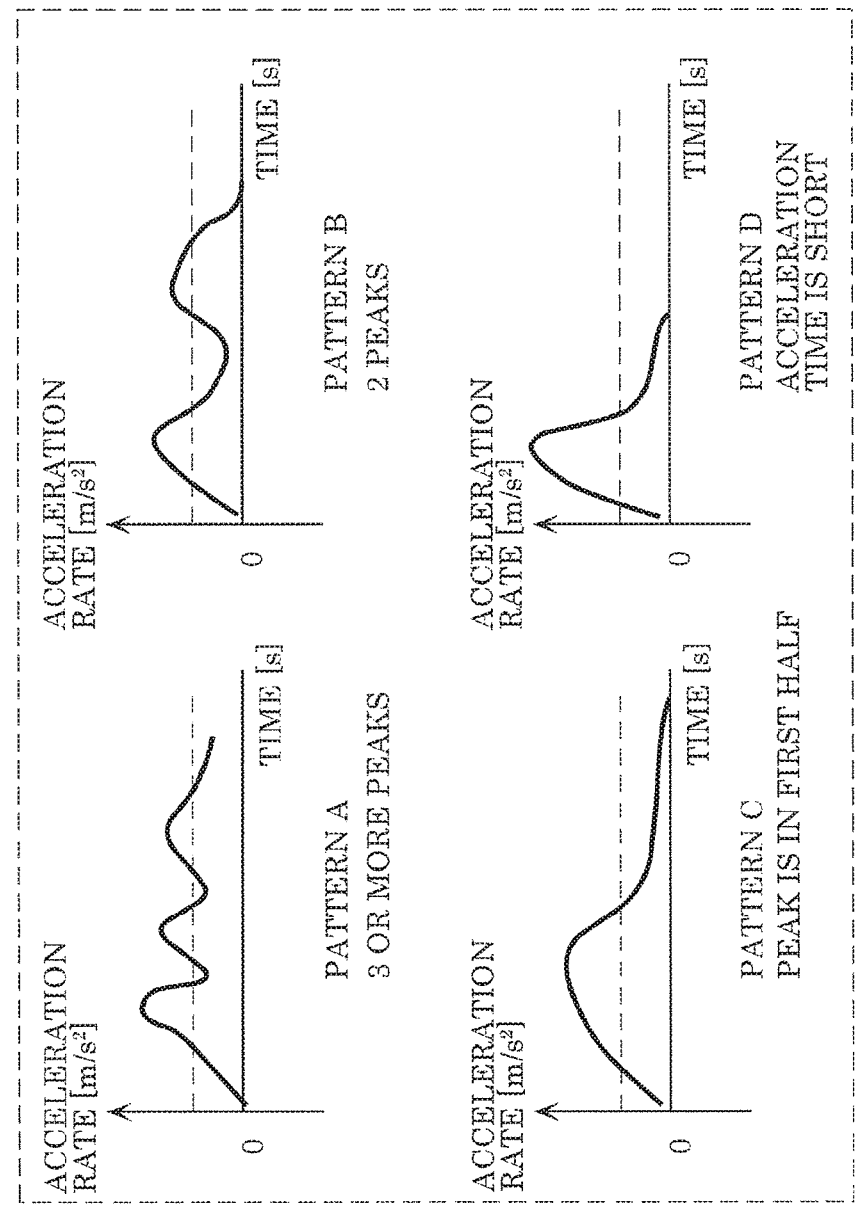
FIG. 36 illustrates examples of acceleration rate patterns according to Embodiment 5.

Vehicle behavior detector 282 further obtains speed information on the host vehicle from speed information obtainer 63 during manual driving, and detects whether there is a leading vehicle or not by using sensor 62. Then, when vehicle behavior detector 282 detects an acceleration greater than or equal to a certain acceleration or deceleration less than or equal to a certain acceleration rate, vehicle behavior detector 282 stores the acceleration rate pattern directly before and after that in association with environment parameters in storage 8, 8a. For example, as illustrated in FIG. 35, vehicle behavior detector 282 obtains the environment parameters at a point in time T3 seconds before the point in time the acceleration rate exceeds a certain threshold A3, and an acceleration rate pattern in a period from the point in time T3 seconds before the point in time the acceleration rate exceeds a certain threshold A3 until the acceleration rate exceeds threshold A4 or until the speed reaches 0 (in the case of deceleration), and stores these in storage 8, 8a. Here, the environment parameters for deceleration indicate the speed of the host vehicle, the inter-vehicle distance/relative rate of change with a surrounding vehicle (excluding the inter-vehicle distance between the leading vehicle), the number of driving lanes, the driving lane position, the driving lane width, the road condition, the distance until a target stop point (when coming to a stop), the distance until the next traffic light, and the lighting state of the traffic light. The distance until the target stop point is the distance until the target stop point when the autonomous driving system determines to come to a stop, and is set to 0 at all other times. The distance until the next traffic light is set to the actual distance until the next traffic light when the distance until the next traffic light is a certain distance or less, and is set to—at all other times. The lighting state of the traffic light is set as red=0, yellow=1, and green=2, for example. Note that the acceleration rate pattern is, for example, a pattern classified by the time that the host vehicle is accelerating and decelerating, the location of the acceleration rate peak, and the number of peaks, such as is illustrated in FIG. 36. Alternatively, the acceleration rate pattern indicates average acceleration rate when the host vehicle is decelerating or accelerating, the period during which the acceleration rate exceeds a given threshold, and the speed at that time.

Autonomous driving controller 281 uses this information stored in storage 8, 8a (FIG. 37, FIG. 38) to control the speed, inter-vehicle distance, and acceleration rate in accordance with the surroundings when the driver sets the host vehicle to autonomous driving. The method is the same as described in Embodiment 4, where the client side uploads data stored in storage 8a to the cloud via communications unit 291. On the cloud side, the data is compared with driving characteristics for another driver, and a driver model is created from a group of similar drivers. At this time, a driver model may be created for each of the speed, inter-vehicle distance, and acceleration rate, and, alternatively, a comprehensive driver model may be created. The created driver model is transmitted to the client side. These processes are performed, for example, directly after the engine has been turned on.

The driver model may be created with the method described in Embodiment 4, but may also be created using, for example, mechanical learning using environment parameters as input values and speed, inter-vehicle distance, and acceleration rate pattern as output values. In these cases, learning is performed using a combination of the environment parameter from the history and speed as training data. The algorithm that is used is, for example, a random forest algorithm, a support vector machine algorithm, or a gradient boosting algorithm. The model generated from the learning is the driver model.

Moreover, the method for creating a driver model for a given driver by collecting similar drivers may be the method described in Embodiment 4, but, for example, when a plurality of local peaks are detected from a data distribution of the driving characteristics (for example, speed) in the cloud, these can be construed to be clusters that are merged together, and a model can be created where a distribution of each local peak is taken to be one cluster to build a plurality of driver models. With this method, the speed may be estimated by selecting a driver model that most closely matches with the driver history on the client side, and, alternatively, a plurality of driver models having a high match percentage may be used, and the speed may be calculated using the average value.

When the driver sets the host vehicle to autonomous driving, autonomous driving controller 281 inputs the environment parameters into the driver model, and the vehicle is controlled in accordance with the obtained speed, inter-vehicle distance, and acceleration/deceleration pattern. With this, setting, the driver does not need to, for example, set the inter-vehicle distance during autonomous driving using a steering wheel switch, and it is possible to achieve autonomous driving that closely resembles the driver's own driving habits.

Summary of Embodiments 4 and 5

Figure 39:
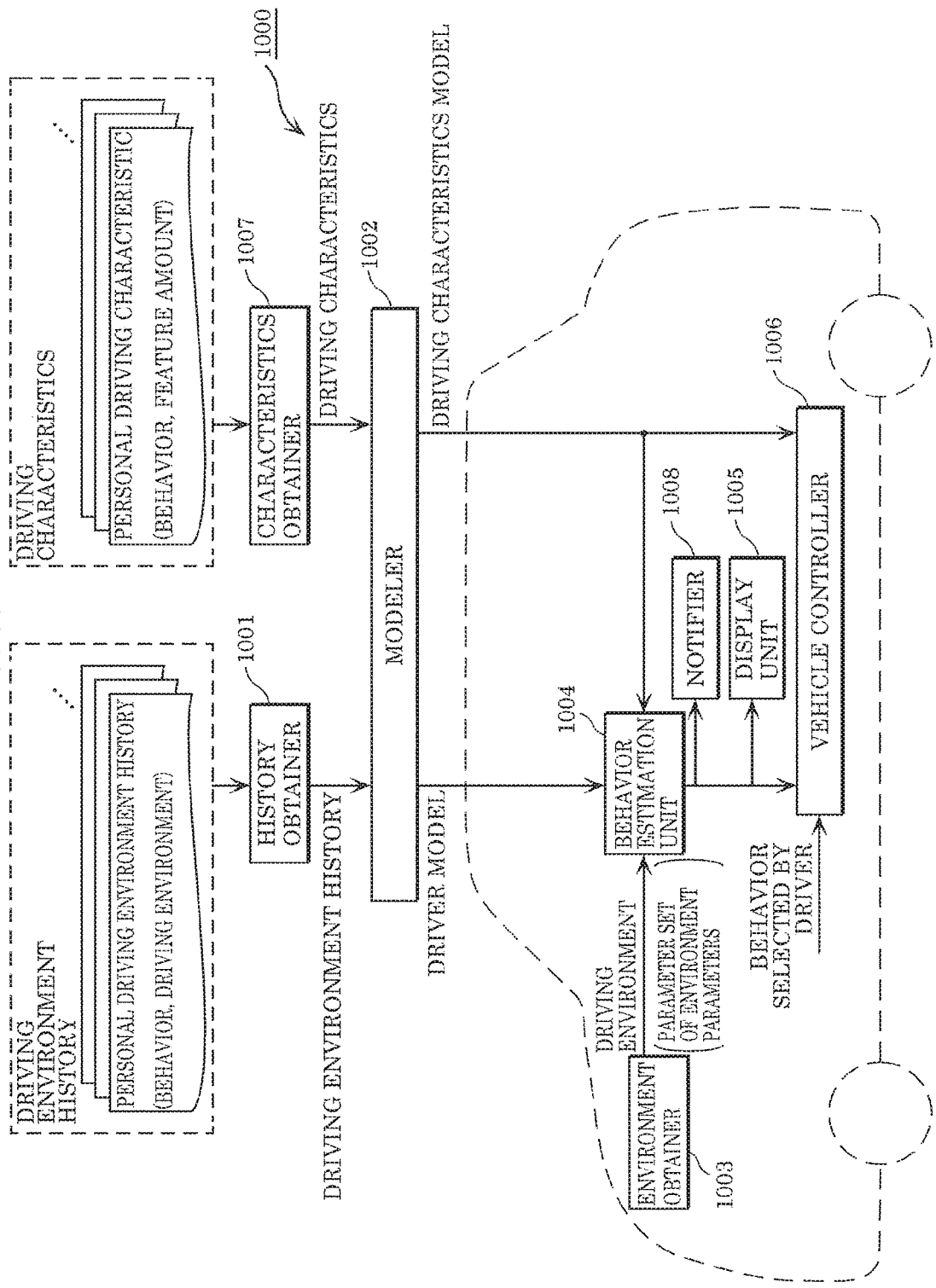
FIG. 39 illustrates a configuration of an information processing system according to one aspect of the present invention.

FIG. 39 illustrates a configuration of an information processing system according to one aspect of the present invention.

Information processing system 1000 includes history obtainer 1001 and modeler 1002.

History obtainer 1001 obtains a personal driving environment history of each of a plurality of drivers. A driving environment history including these personal driving environment histories is, for example, one of the driving environment histories illustrated in FIG. 16, FIG. 17, or FIG. 20, and the personal driving environment history may be the driving environment history of driver x illustrated in FIG. 27. The personal driving environment history indicates one or more vehicle behaviors selected by the driver and a driving environment associated with each of the one or more behaviors. The driving environment is an environment of the vehicle at the time of the selection of the associated behavior. Here, a behavior is, for example, a driving conduct, driving operation, or operational state of the vehicle. Moreover, each of the one or more selected behaviors of the vehicle is a secondary behavior selected by the driver during autonomous driving, as described in Embodiment 1. Alternatively, each of the one or more selected behaviors of the vehicle may be a behavior implemented by manual driving by the driver, that is to say, a behavior selected by the driver during manual driving.

Modeler 1002 models the personal driving environment history of at least one of the plurality of drivers included in the driving environment history, to build a driver model indicating a relationship between a behavior and a driving environment for a vehicle of the at least one of the plurality of drivers. This driver model is, for example, one of the driver models illustrated in FIG. 18, FIG. 21, or (b) in FIG. 28.

Information processing system 1000 includes environment obtainer 1003 and behavior estimation unit 1004. Environment obtainer 1003 obtains a driving environment of a vehicle of a driver that is a target for estimation. The driving environment is, for example, one of the driving environments illustrated in FIG. 16, FIG. 17, or FIG. 20.

Note that environment obtainer 1003 may be detector 6 illustrated in FIG. 1, and the driving environment may be generated based on information detected by detector 6, and that driving environment may be obtained.

Behavior estimation unit 1004 estimates (or determines), in the built driver model, a behavior associated with the driving environment obtained by environment obtainer 1003, as a behavior of the vehicle of the driver that is a target for estimation.

This makes it possible to appropriately estimate a behavior of the vehicle of the driver that is a target for estimation even when the personal driving environment history of the driver that is the target for estimation is not sufficient for behavior estimation, since the behavior of the vehicle of the driver that is the target for estimation is estimated using a driver model. In other words, a driving conduct suited to the driver can be estimated.

Here, modeler 1002 may build a clustering driver model. In other words modeler 1002 models similar personal driving environment histories included in the driving environment history for each group of the similar personal driving environment histories, to build a driver model indicating a relationship between a behavior and a driving environment for the vehicle for each model driver. Such a clustering driver model is, for example, the driver model illustrated in FIG. 18.

In these cases, behavior estimation unit 1004 selects, from that driver model, a model driver having a relationship between a behavior and a driving environment that is similar to the personal driving environment history of the driver that is a target for estimation. Then, behavior estimation unit 1004 estimates, in the relationship between the behavior and driving environment associated with the selected model driver, a behavior associated with the driving environment obtained by environment obtainer 1003, as a behavior of the vehicle of the driver that is a target for estimation.

With this, since a model driver having a behavior-driving environment relationship that is similar to the personal driving environment history of the driver that is a target for estimation is selected and a behavior of the vehicle of the driver that is the target for estimation is estimated by using the model driver's relationship, a behavior (i.e., driving conduct) that is more suited to the driver can be estimated.

Here, each of the personal driving environment histories of the plurality of drivers may indicate, on a per driving environment basis, a frequency of selection of each of predetermined one or more behaviors in the driving environment.

In these cases, on a per driving environment basis, for each of the predetermined one or more behaviors, modeler 1002 averages the frequency of selection of each of the predetermined one or more behaviors indicated in the similar personal driving environment histories, to model the similar personal driving environment histories.

This makes it possible to easily and appropriate perform modeling.

Moreover, modeler 1002 may build an individual adaptive driver model. In other words, modeler 1002 models a plurality of personal driving environment histories that are similar to the personal driving environment history of a driver that is a target for estimation to build a driver model corresponding to the driver that is the target for estimation. Such an individual adaptive driver model is, for example, the driver model illustrated in FIG. 21.

With this, since, in the driving environment history, a plurality of personal driving environment histories that are similar to the personal driving environment history of the driver that is a target for estimation are modeled, it is possible to estimate a behavior (i.e., driving conduct) that is more suited to the driver.

Moreover, as illustrated in FIG. 27, the personal driving environment history of each of the plurality of drivers may indicate, for each of one or more behaviors, a driving environment of the vehicle at the point in time the behavior was selected, as a first parameter set, which is a parameter set of values for at least one environment parameter.

In these cases, modeler 1002 models the environment parameter values included in the first parameter set indicated in the personal driving environment history of the at least one of the plurality of drivers, to build a driver model indicating a relationship between a behavior in the vehicle of the at least one of the plurality of drivers and the first parameter set. The driver model built here is, for example, the driver model illustrated in (b) in FIG. 28. Environment obtainer 1003 obtains the driving environment of the vehicle of the driver that is the target for estimation as a parameter set. Note that similar to the first parameter set, this parameter set also includes values for at least one environment parameter. Behavior estimation unit 1004 estimates, in the built driver model, a behavior associated with a first parameter set that is similar to the parameter set obtained by environment obtainer 1003, as a behavior of the vehicle of the driver that is a target for estimation.

With this, since the driving environment is expressed as parameters, it is possible to segment the driving environment, and thus possible to estimate a behavior (i.e. driving conduct) corresponding to the driving environment not matter what the driving environment is.

Moreover, information processing system 1000 may include display unit 1005 that displays a behavior candidate. Note that this display unit 1005 may be included in notifier 92 illustrated in FIG. 1. Moreover, the personal driving environment history of each of the plurality of drivers may further indicate, for each vehicle behavior selected by the driver, a second parameter set in association with the corresponding behavior, as a driving environment at the time the corresponding behavior was displayed as a candidate, the second parameter set being a parameter set of values for at least one environment parameter. In other words, the personal driving environment history may indicate, in association with the selected behavior, a first parameter set, which is the driving environment at the time a behavior was selected, and a second parameter set, which is the driving environment at the time that behavior was displayed as a candidate. Stated differently, the second parameter set is a driving environment corresponding to a point in time before the point in time corresponding to the first parameter set. Note that the first parameter set is the driving environment at the point in time a behavior is selected, but is also the driving environment at the point in time that behavior is implemented. In other words, there is no significant difference between a driving environment at a point in time when a behavior is selected and a driving environment at a point in time when that behavior is implemented.

In these cases, modeler 1002 models the environment parameter values included in the first parameter set indicated in the personal driving environment history of the at least one of the plurality of drivers and the environment parameter values included in the second parameter set indicated in the personal driving environment history of the at least one of the plurality of drivers, to build a driver model indicating a relationship between a behavior in the vehicle of the at least one of the plurality of drivers, the first parameter set, and the second parameter. Behavior estimation unit 1004 then estimates, in the built driver model, a behavior associated with a first parameter set or second parameter set that is similar to the parameter set obtained by environment obtainer 1003, as a behavior of the vehicle of the driver that is a target for estimation.

The timing of the display of the behavior candidate (display timing) is before the timing of the selection or implementation of the behavior (selection timing). Moreover, the driving environments may be different at the display timing and the selection timing. Regarding the display timing, the driving environment at that time can be obtained, but the driving environment at the subsequent selection timing cannot be obtained. Moreover, the behavior is preferably estimated at the display timing.

In view of this, as described above, modeler 1002 builds a driver model indicating a relationship between (i) the first parameter set, which is the driving environment at the selection timing, (ii) the second parameter set, which is the driving environment at the display timing, and (iii) the selected behavior. Moreover, there are cases in which the parameter set obtained by environment obtainer 1003 is a parameter set at the display timing, and there are cases in which the parameter set obtained by environment obtainer 1003 is a parameter set at the selection timing predicted by, for example, extrapolation from the parameter set at the display timing. Accordingly when the parameter set obtained by environment obtainer 1003 is a parameter set at the display timing, behavior estimation unit 1004 estimates a behavior associated with a second parameter set that is similar to that parameter, as a behavior of the vehicle of the driver that is a target for estimation. This makes it possible to estimate a more appropriate behavior (i.e., driving conduct) in advance. On the other hand, when the parameter set obtained by environment obtainer 1003 is a parameter set at the selection timing, behavior estimation unit 1004 estimates a behavior associated with a first parameter set that is similar to that parameter, as a behavior of the vehicle of the driver that is a target for estimation. This makes it possible to estimate a more appropriate behavior (i.e., driving conduct) in advance, that is to say, at the display timing.

Here, behavior estimation unit 1004 may preferentially estimate, in the built driver model, a behavior associated with a first parameter set that is similar to the parameter set obtained by environment obtainer 1003, as a behavior of the vehicle of the driver that is a target for estimation.

This makes it possible to appropriately perform the processing for behavior estimation.

Moreover, as illustrated in FIG. 37, the personal driving environment history may indicate driving at one or more types of speeds as one or more behaviors. In these cases, as illustrated in FIG. 33, environment obtainer 1003 obtains, as a parameter set, the driving environment of the vehicle of the driver that is a target for estimation, at the time the vehicle is driving at an acceleration rate in a predetermined range including zero, continuously for a first period of time. Note that this sort of driving state is considered as a constant speed driving state. Moreover, the first period of time is, for example, the period of T1 seconds illustrated in FIG. 33. Behavior estimation unit 1004 then estimates, in the built driver model, driving at the speed associated with a first parameter set that is similar to the parameter set obtained by environment obtainer 1003, as a behavior of the vehicle of the driver that is a target for estimation. Information processing system 1000 further includes vehicle controller 1006 that controls the vehicle so as to cause the vehicle to drive at the speed estimated by behavior estimation unit 1004.

This makes it possible to cause the vehicle to drive at a speed that is both in accordance with the driving environment and suited to the driver.

Moreover, as illustrated in FIG. 37, the personal driving environment history may indicate driving at one or more types of inter-vehicle distances as one or more behaviors. In these cases, as illustrated in FIG. 34, environment obtainer 1003 obtains, as a parameter set, the driving environment of the vehicle of the driver that is a target for estimation, at the time an amount of change per unit time in the inter-vehicle distance between the host vehicle and another vehicle (amount of change in inter-vehicle distance [m/s]) is within a predetermined range including zero, continuously for a second period of time. Note that the second period of time is, for example, the period of T2 seconds illustrated in FIG. 34. Behavior estimation unit 1004 then estimates, in the built driver model, driving at the inter-vehicle distance associated with a first parameter set that is similar to the parameter set obtained by environment obtainer 1003, as a behavior of the vehicle of the driver that is a target for estimation. Vehicle controller 1006 controls the vehicle of the driver that is a target for estimation so as to cause the vehicle to drive at the inter-vehicle distance estimated by behavior estimation unit 1004.

This makes it possible to cause the vehicle to drive at an inter-vehicle distance that is both in accordance with the driving environment and suited to the driver.

Moreover, the personal driving environment history may indicate driving at one or more types of acceleration rate patterns (for example, the acceleration rate patterns in FIG. 36) as one or more behaviors. In these case, as illustrated in FIG. 35, environment obtainer 1003 obtains, as a parameter set, the driving environment of the vehicle of the driver that is a target for estimation, at a point in time corresponding to a period from when an absolute value of the acceleration rate of the vehicle exceeds a first threshold until the acceleration rate reaches or drops below a second threshold lower than the first threshold. For example, the first threshold is the acceleration rate threshold A3 in FIG. 35, and the second threshold is the acceleration rate threshold A4 in FIG. 35. The point in time corresponding to this period is, the point in time counting back from the period by the period T3 in FIG. 35. Behavior estimation unit 1004 estimates, in the built driver model, driving in accordance with the acceleration rate pattern associated with a first parameter set that is similar to the parameter set obtained by environment obtainer 1003, as a behavior of the vehicle of the driver that is a target for estimation. Vehicle controller 1006 controls the vehicle of the driver that is a target for estimation so as to cause the vehicle to drive in accordance with the acceleration rate pattern estimated by behavior estimation unit 1004.

This makes it possible to cause the vehicle to drive in accordance with an acceleration rate pattern that is both appropriate for the driving environment and suited to the driver. In this example, driving in accordance with the acceleration rate pattern was presented, but driving in accordance with an average acceleration rate is also acceptable.

Figure 40:
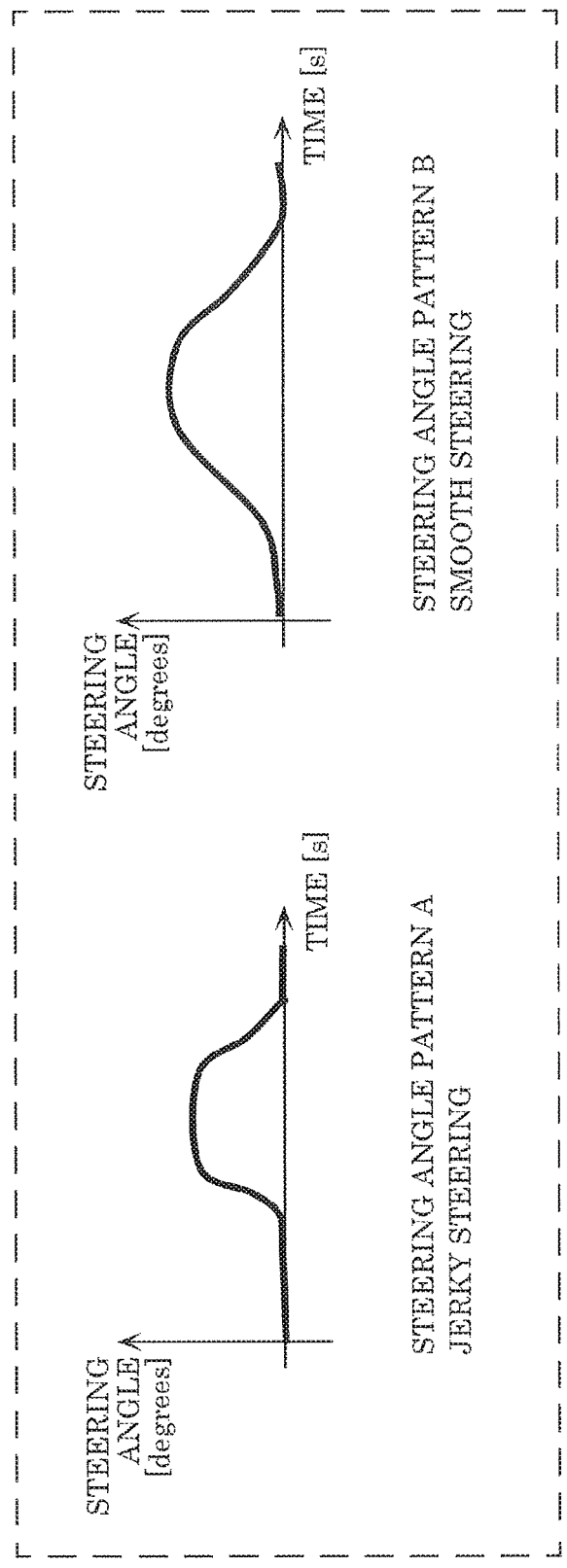
FIG. 40 illustrates examples of steering angle patterns in an information processing system according to one aspect of the present invention.
Figure 41:
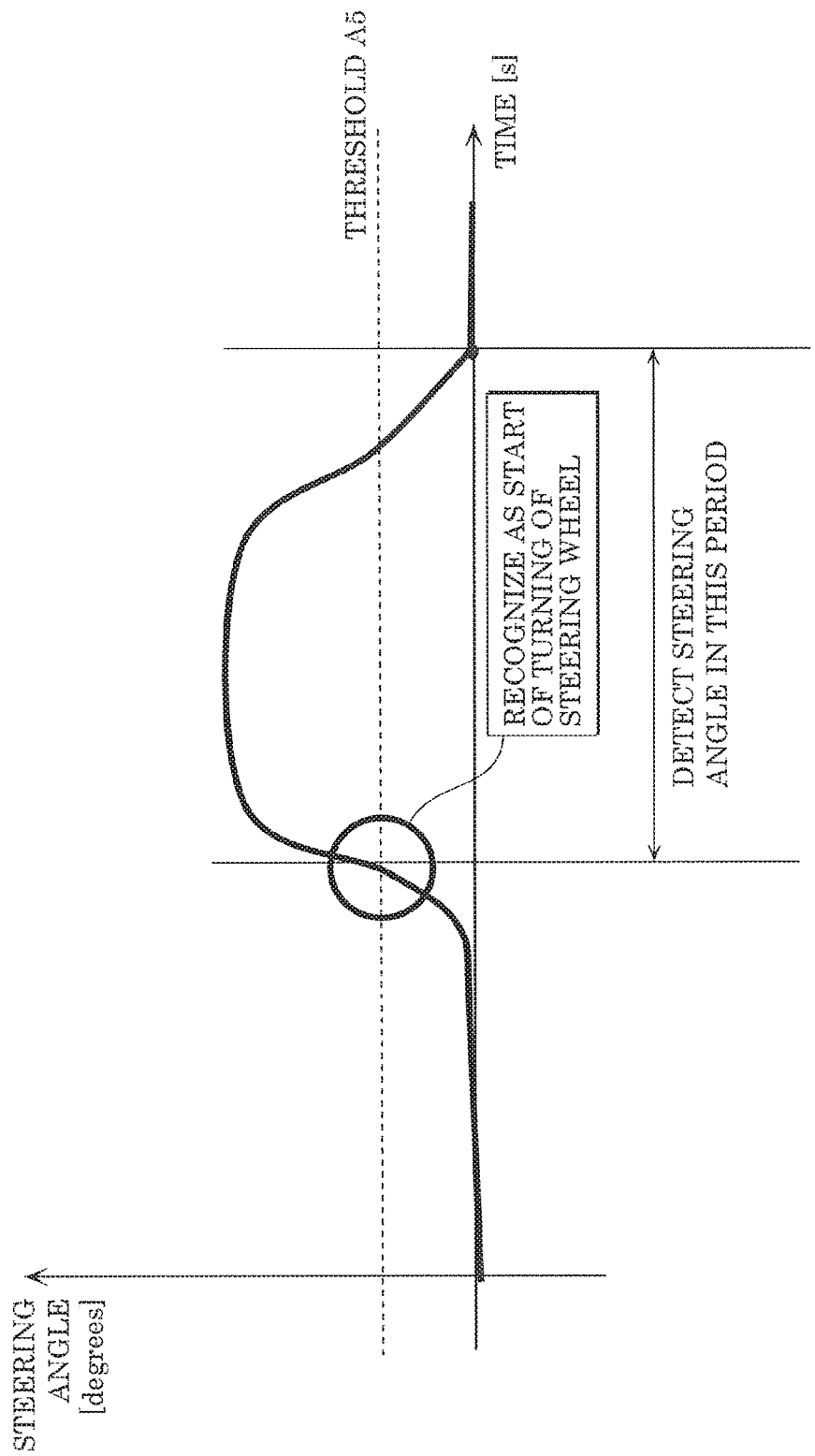
FIG. 41 illustrates the collection timing of the steering angle and environment parameters in an information processing system according to one aspect of the present invention.

Moreover, the personal driving environment history may indicate driving at one or more types of steering angle patterns during a lane change or right or left turn (for example, the steering angle patterns in FIG. 40) as one or more behaviors. In these cases, as illustrated in FIG. 41, environment obtainer 1003 obtains, as a parameter set, the driving environment of the vehicle of the driver that is a target for estimation, at a point in time corresponding to a period from when an absolute value of the steering angle of the vehicle exceeds a first threshold until the absolute value reaches zero. For example, the first threshold is the steering angle threshold A5 in FIG. 41. Behavior estimation unit 1004 estimates, in the built driver model, driving in accordance with the steering angle pattern associated with a first parameter set that is similar to the parameter set obtained by environment obtainer 1003, as a behavior of the vehicle of the driver that is a target for estimation. Vehicle controller 1006 controls the vehicle of the driver that is a target for estimation so as to cause the vehicle to drive in accordance with the steering pattern estimated by behavior estimation unit 1004.

This makes it possible to cause the vehicle to drive in accordance with a steering pattern that is both appropriate for the driving environment and suited to the driver. In this example, driving in accordance with the steering pattern was presented, but driving in accordance with a maximum steering angle and maximum angular velocity of the steering angle is also acceptable.

Information processing system 1000 may further include characteristics obtainer 1007. Characteristics obtainer 1007 obtains driving characteristics including a personal driving characteristic for each of a plurality of drivers. For example, as illustrated in FIG. 22, the personal driving characteristics indicate one or more behaviors, of a vehicle, implemented by driving by the driver, and a feature amount associated with each of the one or more behaviors, the feature amount being a feature amount of the driving of the vehicle performed to implement the behavior it is associated with. For example, the feature amount may be a speed of the vehicle, and may be an input amount of the steering wheel, brake, or accelerator, etc. In these cases, modeler 1002 further models a personal driving characteristic of at least one driver from among the driving characteristics, to build a driving characteristics model indicating a relationship between a behavior and a feature amount in the vehicle of the at least one driver. Note that just like the driver model, the driving characteristics model may be a clustering model or an individual adaptive model. When any given behavior among the one or more behaviors is selected by the driver as a target for implementation, or when it is estimated by behavior estimation unit 1004, vehicle controller 1006 then controls the behavior of the vehicle of the driver that is a target for estimation in accordance with the feature amount associated with the behavior that is the target for implementation, in the built driving characteristics model. For example, as illustrated in FIG. 22, when there are no passengers and the behavior "change lanes" for driver x is estimated, the behavior "change lanes" of the vehicle is controlled in accordance with, for example, the feature amounts: steering wheel "4", brake "6", and accelerator "8".

With this, the behavior of the vehicle of the driver is implemented in accordance with the driving characteristics of that driver, that is to say, with the driving habits of that driver, and as such, it is possible to perform a driving conduct that is further suited to that driver.

Note that at this time, a vehicle characteristics model can also be built.

Figure 42:
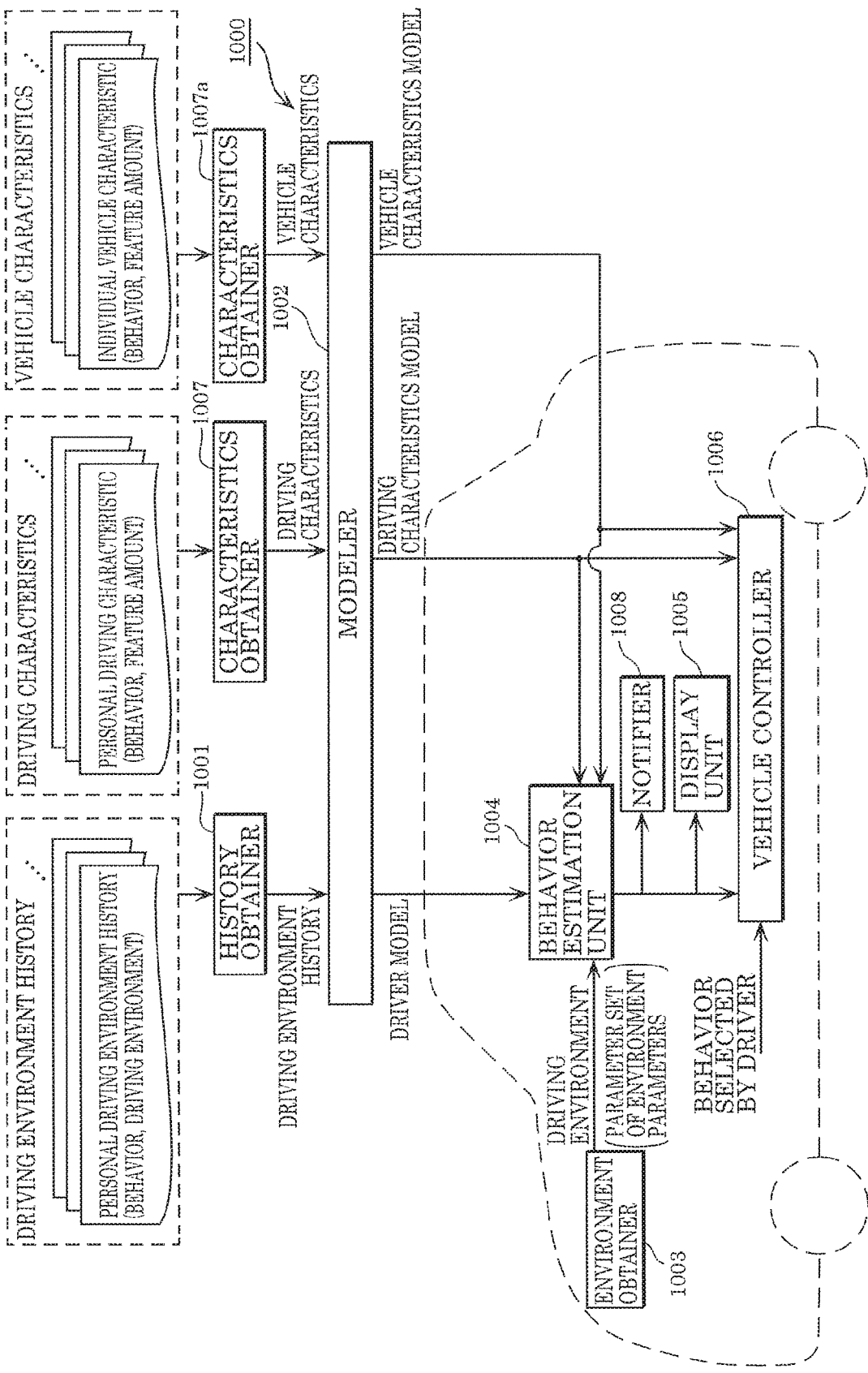
FIG. 42 illustrates a configuration of an information processing system that builds vehicle characteristics models according to one aspect of the present invention.

FIG. 42 illustrates the configuration of an information processing system that builds a vehicle characteristics model. FIG. 43 illustrates vehicle characteristics.

In other words, the influence that the amount that the brake and/or accelerator pedal is pressed down has on vehicle behavior differs greatly from vehicle to vehicle. Estimating this makes it possible to smoothly control the vehicle. For example, combined with the acceleration rate at the time the brake pedal is pressed, brake pedal depression amount and the driving environment of the vehicle are obtained as a parameter set. This parameter set includes, for example, vehicle type ID, speed, road condition (a value indicating, for example, slipperiness, in stages), gradient, wind speed (wind blowing against the direction of travel of the host vehicle), total dead weight (including passengers). Characteristics obtainer 1007a obtains an individual vehicle characteristic for each of a plurality of vehicles. Vehicle characteristics including these individual vehicle characteristics are, for example, the vehicle characteristics illustrated in FIG. 43. The vehicle characteristics indicates, per vehicle ID, situation description parameters (feature amounts) in the vehicle with the associated vehicle ID, and in association with the situation description parameters, a depression amount (behavior) at the time of the driving at the associated situation description parameters.

Modeler 1002 models an individual vehicle characteristic of at least one vehicle in the vehicle characteristics to build a vehicle characteristics model indicating a relationship between a depression amount and the situation description parameters in the at least one vehicle. Using, for example, the same method as used for the driver model, behavior estimation unit 1004 estimates a brake pedal depression amount as a behavior of the vehicle that is a target for estimation using the vehicle characteristics model. In other words, behavior estimation unit 1004 estimates, in the built vehicle characteristics model, a brake pedal depression amount associated with a first parameter set that is similar to the parameter set obtained by environment obtainer 1003 and the acceleration rate estimated from the driving characteristics, as a behavior of the vehicle that is a target for estimation. Vehicle controller 1006 controls the vehicle so as to cause the vehicle to drive in accordance with the brake pedal depression amount estimated by behavior estimation unit 1004. The same control can also be performed for the accelerator.

This makes it possible to smoothly control the vehicle since the vehicle behavior is implemented in accordance with the vehicle characteristics prediction.

Information processing system 1000 may further include notifier 1008 that notifies the driver that is the target for estimation of the behavior estimated by behavior estimation unit 1004, before implementing the behavior. Note that this notifier 1008 may be included in notifier 92 illustrated in FIG. 1.

With this, since the estimated behavior is notified, the driver can easily comprehend what sort of behavior is going to be implemented before it is implemented, which relieves any concern the driver may have.

Note that the vehicle of the driver that is the target for estimation may omit one or all of environment obtainer 1003, behavior estimation unit 1004, display unit 1005, vehicle controller 1006, and notifier 1008, and instead may be provided external to the vehicle. Similarly, the vehicle of the driver that is the target for estimation may omit one or all of history obtainer 1001, modeler 1002, and characteristics obtainer 1007, and instead may be provided external to the vehicle. Among these elements included in information processing system 1000, when a portion of the elements is included in the vehicle and the remaining portion is included external to the vehicle, the elements in and out of the vehicle perform their processes by, for example, communicating over a network such as the internet.

Moreover, vehicle controller 1006 may be vehicle controller 7 illustrated in FIG. 1. Moreover, history obtainer 1001, characteristics obtainer 1007, modeler 1002, and behavior estimation unit 1004 may be vehicle controller 7 illustrated in FIG. 1.

Moreover, for example, the personal driving environment histories and the personal driving characteristics are generated by vehicle controller 1006 installed in each vehicle. Vehicle controller 1006 may generate and accumulate the personal driving environment history and the personal driving characteristics during autonomous driving, and may generate and accumulate them during manual driving.

Figure 44:
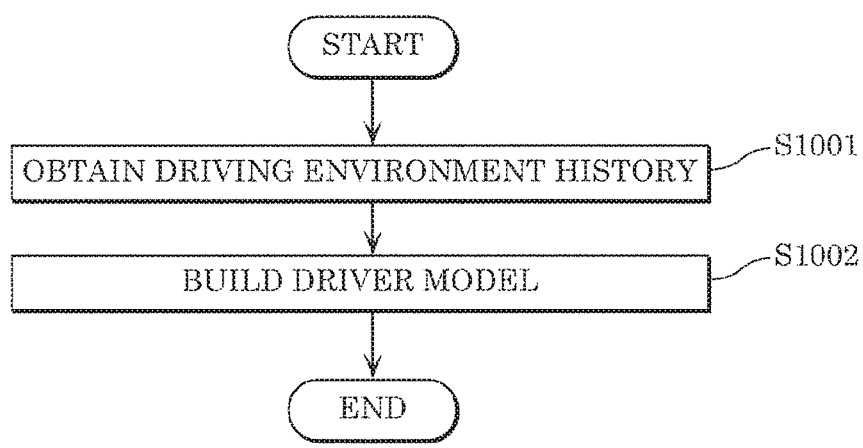
FIG. 44 is a flow chart of an information processing method according to one aspect of the present invention.

FIG. 44 is a flow chart of an information processing method according to one aspect of the present invention.

The information processing method according to one aspect of the present invention includes steps S1001 and S1002.

In step S1001, a driving environment history is obtained. The driving environment history includes a personal driving environment history of each of a plurality of drivers, each of the personal driving environment histories indicating one or more vehicle behaviors selected by the driver, and a driving environment associated with each of the one or more behaviors. The driving environment is a driving environment of the vehicle at the point in time of selection of the behavior it is associated with.

In step S1002, the personal driving environment history of at least one of the plurality of drivers included in the driving environment history is modeled to build a driver model indicating a relationship between a behavior and a driving environment for the vehicle of the least one of the plurality of drivers.

This makes it possible to appropriately estimate a behavior of the vehicle of the driver that is a target for estimation even when the personal driving environment history of the driver that is the target for estimation is not sufficient for behavior estimation, since the behavior of the vehicle of the driver that is the target for estimation is estimated using a driver model. In other words, a driving conduct suited to the driver can be estimated.

Variation of Embodiments 4 and 5

In Embodiments 4 and 5, a behavior (driving conduct) of the vehicle of the driver is estimated, and the vehicle is controlled so as to implement the estimated behavior. In contrast, in this variation, for example, during manual driving, a dangerous behavior of the vehicle of the driver is estimated, and the driver is warned not so as to prevent the dangerous behavior from being implemented.

Figure 45:
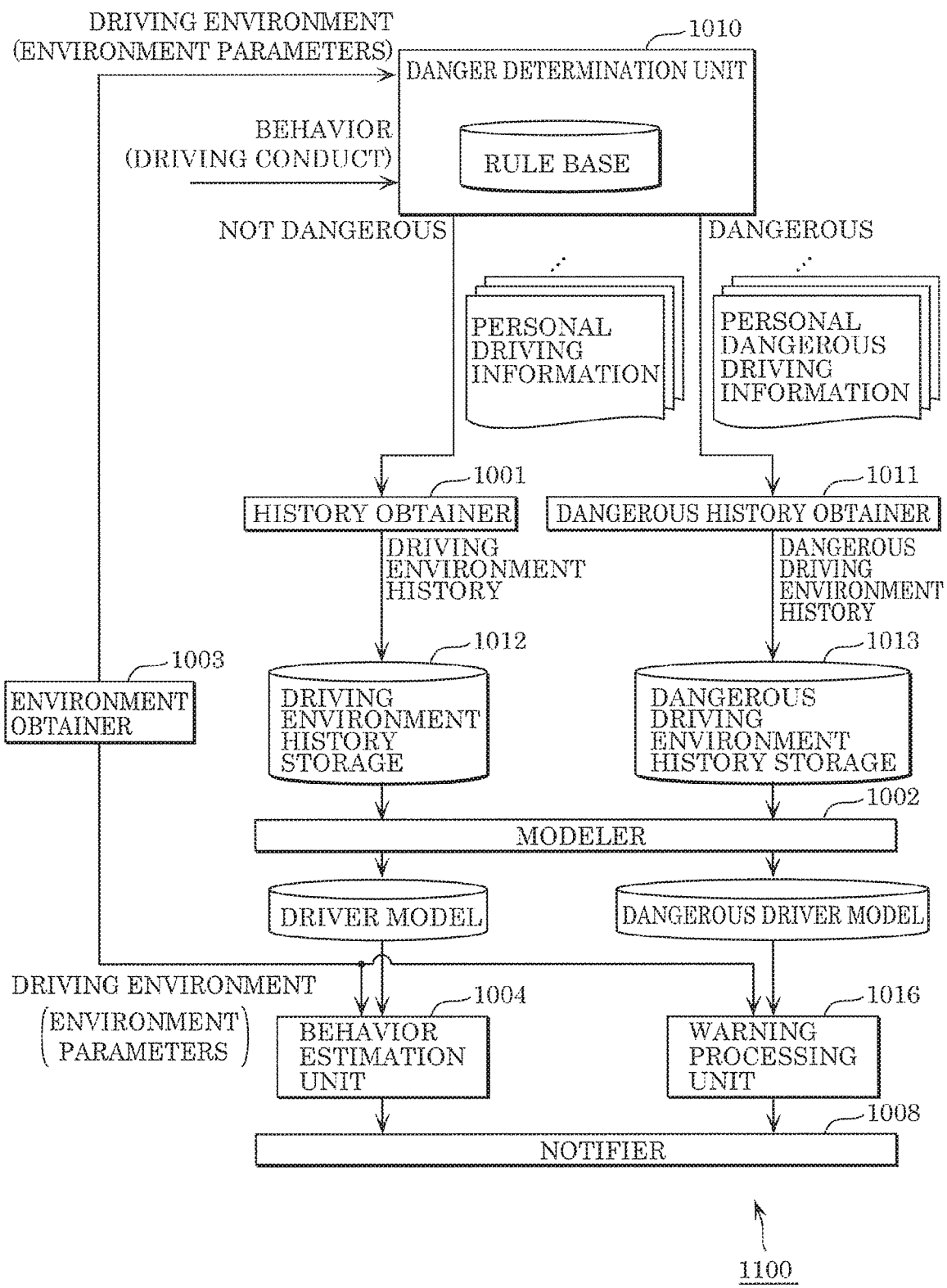
FIG. 45 illustrates a configuration of an information processing system according to a variation of one aspect of the present invention.

FIG. 45 illustrates a configuration of an information processing system according to this variation.

Just like information processing system 1000 described above, information processing system 1100 according to this variation includes history obtainer 1001, modeler 1002, environment obtainer 1003, and behavior estimation unit 1004. Information processing system 1100 further includes danger determination unit 1010, dangerous history obtainer 1011, driving environment history storage 1012, dangerous driving environment history storage 1013, and warning processing unit 1016.

Danger determination unit 1010 obtains a vehicle behavior selected by the driver and the driving environment of the vehicle at the time the behavior was selected, and determines, based on a predetermined determination criterion, whether that behavior is dangerous or not. When danger determination unit 1010 is installed in the vehicle, in addition to obtaining the behavior and driving environment of the vehicle, danger determination unit 1010 also obtains the behavior and driving environment of another vehicle, and determines whether that behavior is dangerous or not. In other words, for each of a plurality of drivers, danger determination unit 1010 obtains a vehicle behavior selected by the driver and the driving environment of the vehicle at the time the behavior was selected, and determines, based on a predetermined determination criterion, whether that behavior is dangerous or not. Danger determination unit 1010 stores a rule base as the predetermined determination criterion. This rule base indicates whether a plurality of types of behaviors are dangerous or not.

Moreover, when danger determination unit 1010 determines that the behavior is not dangerous, information including that behavior and driving environment is output as personal driving information. On the other hand, when danger determination unit 1010 determines that the behavior is dangerous, information including that behavior and driving environment is output as personal dangerous driving information.

For each of the plurality of drivers, history obtainer 1001 obtains, as a personal driving environment history of the driver, an information group including a plurality of units of the personal driving information output from danger determination unit 1010. History obtainer 1001 then stores a driving environment history including the personal driving environment histories for the plurality of drivers in driving environment history storage 1012.

For each of the plurality of drivers, dangerous history obtainer 1011 obtains, as a personal dangerous driving environment history of the driver, an information group including a plurality of units of the personal dangerous driving information output from danger determination unit 1010. Dangerous history obtainer 1011 then stores a dangerous driving environment history including the personal dangerous driving environment histories for the plurality of drivers in driving environment history storage 1013.

In addition to building the driver model by using the above-described driving environment histories, modeler 1002 also builds a dangerous driver model by using the dangerous driving environment histories described above. In other words, modeler 1002 models a personal dangerous driving environment history of at least one of the plurality of drivers included in the dangerous driving environment history, to build a dangerous driver model indicating a relationship between a dangerous behavior and a driving environment for the at least one of the vehicles. Just like the driver model, this dangerous driver model may be a clustering model or an individual adaptive model.

Warning processing unit 1016 estimates, in the built driver model, a dangerous behavior associated with the driving environment obtained by environment obtainer 1003, as a behavior of the vehicle of the driver that is a target for estimation. Warning processing unit 1016 then executes processes for warning the driver of the estimated dangerous behavior. Notifier 1008 warns the driver in accordance with the processing by warning processing unit 1016.

FIG. 46 illustrates one example of a dangerous driving environment history stored in dangerous driving environment history storage 1013.

The dangerous driving environment history indicates, for example, for each driver ID for identifying the driver, the driving environment of the vehicle of the driver having that driver ID, and a dangerous behavior (i.e., risk) selected in that driving environment. Moreover, the driving environment includes, for example, environment parameter values for speed (km/h), leading vehicle inter-vehicle distance (m), leading vehicle relative rate of change, front-left vehicle inter-vehicle distance (m), and front-left vehicle relative rate of change. Note that the leading vehicle relative rate of change is the rate of change in the inter-vehicle distance between the front of the host vehicle and the front of the leading vehicle, and the front-left vehicle relative rate of change is the rate of change in the inter-vehicle distance between the front of the host vehicle and the front of the front-left vehicle. Moreover, "risk" refers to a rear-end collision, lane departure, contact with a right-back vehicle, etc.

In such an information processing system 1100, when the driver associated with a personal dangerous driving environment history similar to the driver that is a target for estimation has previously performed a dangerous driving act, a warning is given in accordance with the type of risk upon the driving environment at the time that the dangerous driving act was performed is obtained in the vehicle of the driver that is a target for estimation.

For example, when a driving environment indicating a high risk of a rear-end collision with the leading vehicle is obtained by environment obtainer 1003, warning processing unit 1016 estimates "rear-end collision" as a dangerous behavior. Specifically that driving environment indicates, for example, the inter-vehicle distance and brake timing. If the driver, who has a personal dangerous driving environment history similar to the driver that is a target for estimation, has previously had a rear-end collision in that driving environment, warning processing unit 1016 determines that there is a risk of rear-end collision in that driving environment. Warning processing unit 1016 then causes notifier 1008, which is configured as, for example, a HUD, to display a warning message prompting the driver to brake early.

Moreover, when a driving environment indicating a high risk of lane departure is obtained by environment obtainer 1003, warning processing unit 1016 estimates "lane departure" as a dangerous behavior. Specifically that driving environment indicates, for example, speed, input amount (steering angle) of the brake handle, the width of the lane, and the curvature of the road being driven on. If the driver, who has a personal dangerous driving environment history similar to the driver that is a target for estimation, has previously, for example, departed from the driving lane while driving through a curve, in that driving environment, warning processing unit 1016 determines that there is a risk of lane departure in that driving environment. Warning processing unit 1016 then causes notifier 1008, which is configured as, for example, a HUD, to display a warning message prompting the driver to decelerate. Here, warning processing unit 1016 may cause notifier 1008 to display, for example, the input amount (steering angle) of the steering wheel that is appropriate for the curve or a driving line.

Moreover, when a driving environment indicating a high risk of contact with another vehicle resulting from a lane change is obtained by environment obtainer 1003, warning processing unit 1016 estimates "contact" as a dangerous behavior. Specifically, that driving environment indicates, for example, the inter-vehicle distance between a right-rear vehicle and the host vehicle. If the driver, who has a personal dangerous driving environment history similar to the driver that is a target for estimation, has previously come into contact with a right-rear vehicle in that driving environment, warning processing unit 1016 determines that there is a risk of contact in that driving environment. Warning processing unit 1016 then causes notifier 1008, which is configured as, for example, a HUD, to display a warning message notifying the driver that a right-rear vehicle is nearing the host vehicle.

Moreover, when a driving environment indicating a high risk of contact with an obstacle such as a pedestrian is obtained by environment obtainer 1003, warning processing unit 1016 estimates "contact" as a dangerous behavior. Specifically, that driving environment indicates, for example, the distance between the obstacle and the host vehicle. If the driver, who has a personal dangerous driving environment history similar to the driver that is a target for estimation, has previously come into contact with an obstacle (or performed an emergency maneuver to circumvent contact) in that driving environment, warning processing unit 1016 determines that there is a risk of contact with the obstacle in that driving environment. Warning processing unit 1016 then causes notifier 1008, which is configured as, for example, a HUD, to display a warning message warning the driver of the obstacle.

Moreover, when a driving environment indicating a high risk of a blind spot collision when turning right or left is obtained by environment obtainer 1003, warning processing unit 1016 estimates "blind spot collision" as a dangerous behavior. Specifically that driving environment indicates, for example, the driving location (specifically an intersection, and the distance between the obstacle and the host vehicle. If the driver, who has a personal dangerous driving environment history similar to the driver that is a target for estimation, has previously had a blind spot collision in that driving environment, warning processing unit 1016 determines that there is a risk of a blind sport collision in that driving environment. Warning processing unit 1016 then causes notifier 1008, which is configured as, for example, a HUD, to display a warning message warning the driver of a blind spot collision.

In this sort of variation, for example, when the driver that is a target for estimation is manually driving, it is possible to alert the driver to avoid a dangerous behavior such as a rear-end collision or lane departure, which makes it possible to reduce the occurrence of dangerous behavior.

Embodiments according to the present invention have hereinbefore been described in detail with reference to the drawings, but the functions of the devices and processing units described above can be realized by a computer program.

A computer that realizes the above functions via a program includes, for example, an input device such as a keyboard, mouse, and/or touch panel, an output device such as a display and/or speaker(s), a processor or central processing unit (CPU), read only memory (ROM), random access memory (RAM), a storage device such as a hard disk and/or solid state drive (SSD), a reading device that reads information from a storage medium such as a universal serial bus (USB) memory, and a network card that performs communication over a network, and each unit is connected via a bus.

The reading device reads the above-described program from a recordable medium storing the program and stores the program into the storage device. Alternatively, the network card performs communication with a server connected to the network, and stores a program, downloaded from the server, for realizing the functions of the above-described devices into the storage device.

Then, the processor or CPU copies the program stored in the storage device into the RAM, and the commands included in the program are sequentially read from the RAM and executed, whereby the functions of the above-described units are realized.

INDUSTRIAL APPLICABILITY

The information processing system, information processing method, and program according to the present invention are applicable to devices and systems that process information related to the driving of a vehicle.

REFERENCE MARKS IN THE DRAWINGS 1 vehicle
2 brake pedal
3 accelerator pedal
4 turn signal lever
5 steering wheel
6 detector
7, 1006 vehicle controller
8 storage
9 information notification device
10 touch panel
29a-29c, 29g, 39a-39c, 39g, 59a-59c, 59g, 69a, 69c, 69g, 79a, 79c, 79g, 89a-89c, 89g, 99b, 99c, 99g, 109a-109d, 109e, 109g, 121, 121a-121d display region
51 input interface
51a-51h input button
59, 69, 79, 89, 99 text information
91 information obtainer
92, 1008 notifier
101, 1005 display unit
102 input unit
109 display
111, 112, 113, 114, 121, 121', 122, 122', 123, 131, 131', 132, 133, 134, 134', 135-137, 231, 232, 233, 233', 234, 234', 235, 251, 251', 252, 252', 253, 261, 262, 263, 264, 265, 266, 267, 268 symbol
291 communications unit
292 cache
301 host vehicle
302 diagonally forward vehicle
303 detected surrounding state
304 primary cache
305 secondary cache
1000 information processing system
1001 history obtainer
1002 modeler
1003 environment obtainer
1004 behavior estimation unit
1007 characteristics obtainer

The invention claimed is:

1. An information processing system, comprising:
a history obtainer that obtains a personal driving environment history of each of a plurality of drivers, each of personal driving environment histories indicating one or more behaviors, of a vehicle, selected by a driver, and a driving environment associated with each of the one or more behaviors, the driving environment being a driving environment of the vehicle at a point in time of a selection of a behavior it is associated with;
a modeler that models, from a driving environment history including the personal driving environment histories of the plurality of drivers, the personal driving environment history of at least one of the plurality of drivers, to build a driver model indicating a relationship between the driving environment and a selected behavior for the vehicle of the at least one of the plurality of drivers;
an environment obtainer that obtains a driving environment of a vehicle of a target driver that is a target for estimation;
a behavior estimation unit configured to, in the driver model built, estimate an estimated behavior of the target driver, the estimated behavior being associated with the driving environment obtained by the environment obtainer; and a display unit configured to display a behavior candidate wherein each of the personal driving environment histories of the plurality of drivers indicates, for each of the one or more behaviors, of the vehicle, selected by the driver, a first parameter set which is a parameter set including each value of at least one environment parameter, as the driving environment of the vehicle at the point in time of selection of the behavior, and a second parameter set which is a parameter set including each value of at least one environment parameter, as the driving environment at a time a corresponding behavior was displayed as the behavior candidate, the modeler models the value of each environment parameter included in the first parameter set and the value of each environment parameter included in the second parameter set indicated in the personal driving environment history of the at least one of the plurality of drivers, to build the driver model indicating a relationship between the first parameter set, the second parameter set, and the selected behavior for the vehicle of the at least one of the plurality of drivers, the environment obtainer obtains the driving environment of the vehicle of the target driver that is the target for estimation as a parameter set, and the behavior estimation unit is configured to, in the driver model built, estimate the estimated behavior of the target driver, the estimated behavior being associated with the first parameter set or the second parameter set that is similar to the parameter set obtained by the environment obtainer.

2. The information processing system according to claim 1, wherein the modeler models similar personal driving environment histories included in the driving environment history for each group of the similar personal driving environment histories, to build the driver model indicating a relationship between the driving environment and the selected behavior for the vehicle for each model driver, the behavior estimation unit is configured to:

select, from the driver model, a model driver having a relationship, between a selected behavior and a driving environment, that is similar to the personal driving environment history of the target driver that is the target for estimation; and estimate, in the relationship between the selected behavior and the driving environment of the model driver selected, the estimated behavior of the target driver, the estimated behavior being associated with the driving environment obtained by the environment obtainer.

3. The information processing system according to claim 2, wherein each of the personal driving environment histories of the plurality of drivers indicates, on a per driving environment basis, a frequency of selection of each of predetermined one or more behaviors in the driving environment, and the modeler, on a per driving environment basis, for each of the predetermined one or more behaviors, averages the frequency of selection of each of the predetermined one or more behaviors indicated in the similar personal driving environment histories, to model the similar personal driving environment histories.

4. The information processing system according to claim 1, wherein the modeler models, from the driving environment history, a plurality of personal driving environment histories that are similar to the personal driving environment history of the target driver that is the target for estimation, to build the driver model corresponding to the target driver that is the target for estimation.

5. The information processing system according to claim 1, wherein the behavior estimation unit is configured to, in the driver model built, preferentially estimate a behavior associated with the first parameter set that is similar to the parameter set obtained by the environment obtainer, as the estimated behavior of the target driver that is the target for estimation.

6. The information processing system according to claim 1, wherein the personal driving environment history indicates driving at one or more types of speeds as the one or more behaviors, the environment obtainer obtains, as a parameter set, the driving environment of the vehicle of the target driver that is the target for estimation, at a time the vehicle is driving at an acceleration rate in a predetermined range including zero, continuously for a first period of time, the behavior estimation unit is configured to, in the driver model built, estimate driving at a speed associated with the first parameter set that is similar to the parameter set obtained by the environment obtainer, as the estimated behavior of the target driver that is the target for estimation, and the information processing system further comprises:

a vehicle controller that controls the vehicle to cause the vehicle to drive at the speed estimated by the behavior estimation unit.

7. The information processing system according to claim 1, wherein the personal driving environment history indicates driving at one or more types of inter-vehicle distances as the one or more behaviors, the environment obtainer obtains, as a parameter set, the driving environment of the vehicle of the target driver that is the target for estimation, at a time an amount of change per unit time in inter-vehicle distance between the vehicle and another vehicle is within a predetermined range including zero, continuously for a second period of time, the behavior estimation unit is configured to, in the driver model built, estimate driving at an inter-vehicle distance associated with the first parameter set that is similar to the parameter set obtained by the environment obtainer, as the estimated behavior of the target driver that is the target for estimation, and the information processing system further comprises:

a vehicle controller that controls the vehicle to cause the vehicle of the target driver that is the target for estimation to drive at the inter-vehicle distance estimated by the behavior estimation unit.

8. The information processing system according to claim 1, wherein the personal driving environment history indicates driving at one or more types of acceleration rate patterns as the one or more behaviors, the environment obtainer obtains, as a parameter set, the driving environment of the vehicle of the target driver that is a target for estimation, at a point in time corresponding to a period from when an absolute value of an acceleration rate of the vehicle exceeds a first threshold until the acceleration rate reaches or drops below a second threshold lower than the first threshold, the behavior estimation unit is configured to, in the driver model built, estimate driving in accordance with an acceleration rate pattern associated with the first parameter set that is similar to the parameter set obtained by the environment obtainer, as the estimated behavior of the target driver that is the target for estimation, and the information processing system further comprises:

a vehicle controller that controls the vehicle to cause the vehicle of the target driver that is the target for estimation to drive in accordance with the acceleration rate pattern estimated by the behavior estimation unit.

9. The information processing system according to claim 1, further comprising:

a characteristics obtainer that obtains a personal driving characteristic of each of a plurality of drivers, each of the personal driving characteristics indicating one or more behaviors, of a vehicle, implemented by driving by the driver, and a feature amount associated with each of the one or more behaviors, the feature amount being a feature amount of the driving of the vehicle performed to implement the behavior it is associated with; and a vehicle controller that controls the vehicle of the target driver that is the target for estimation, wherein the modeler further models, from driving characteristics including the personal driving characteristics of the plurality of drivers, the personal driving characteristic of at least one of the plurality of drivers, to build a driving characteristics model indicating a relationship between a behavior and a feature amount for the vehicle of the at least one of the plurality of drivers, and the vehicle controller, when any behavior among the one or more behaviors is selected by the driver as a target for implementation or estimated by the behavior estimation unit as a target for implementation, controls driving of the vehicle of the target driver that is the target for estimation in accordance with a feature amount associated with the behavior that is the target for implementation in the driving characteristics model built.

10. The information processing system according to claim 1, further comprising:

a danger determination unit configured to, for each of the plurality of drivers, obtain a behavior, of the vehicle, selected by the driver and a driving environment of the vehicle at a time of selection of the behavior, and determine, based on a predetermined determination criterion, whether that behavior is dangerous or not.

11. The information processing system according to claim 10, further comprising:

a dangerous history obtainer that obtains a personal dangerous driving environment history of each of the plurality of drivers; and a warning processing unit configured to perform a process for warning a driver, wherein the danger determination unit is configured to, when a behavior of the vehicle is (a) determined to be not dangerous, output information including the behavior and the driving environment as personal driving information, and when (b) determined to be dangerous, output information including the behavior and the driving environment, as personal dangerous driving information, the history obtainer obtains, for each of the plurality of drivers, an information group including a plurality of units of the personal driving information output from the danger determination unit, as the personal driving environment history of the driver, the dangerous history obtainer obtains, for each of the plurality of drivers, an information group including a plurality of units of the personal dangerous driving information output from the danger determination unit as the personal dangerous driving environment history of the driver, the modeler further models, from a dangerous driving environment history including the personal dangerous driving environment histories of the plurality of drivers, the personal dangerous driving environment history of at least one of the plurality of drivers, to build a dangerous driver model indicating a relationship between a dangerous behavior and a driving environment for the vehicle of the at least one of the plurality of drivers, and the warning processing unit is configured to, in the driver model built, estimate a dangerous behavior associated with the driving environment obtained by the environment obtainer, as a behavior of the vehicle of the target driver that is the target for estimation, and execute processing for warning the target driver that is the target for estimation of the estimated dangerous behavior.

12. An information processing method, comprising:

obtaining a driving environment history including a personal driving environment history of each of a plurality of drivers, each of personal driving environment histories indicating one or more behaviors, of a vehicle, selected by a driver, and a driving environment associated with each of the one or more behaviors, the driving environment being a driving environment of the vehicle at a point in time of a selection of a behavior it is associated with;

building a driver model by modeling the personal driving environment history of at least one of the plurality of drivers included in the driving environment history including the personal driving environment histories of the plurality of drivers, the driver model indicating a relationship between the driving environment and a selected behavior for the vehicle of the at least one of the plurality of drivers;

obtaining a driving environment of a vehicle of a target driver that is a target for estimation;

estimating, in the driver model built, an estimated behavior of the target driver, the estimated behavior being associated with the driving environment obtained; and displaying a behavior candidate, wherein each of the personal driving environment histories of the plurality of drivers indicates, for each of the one or more behaviors, of the vehicle, selected by the driver, a first parameter set which is a parameter set including each value of at least one environment parameter, as the driving environment of the vehicle at the point in time of selection of the behavior, and a second parameter set which is a parameter set including each value of at least one environment parameter, as the driving environment at a time a corresponding behavior was displayed as the behavior candidate, in the building of the driver model the value of each environment parameter included in the first parameter set and the value of each environment parameter included in the second parameter set indicated in the personal driving environment history of the at least one of the plurality of drivers is modeled to build the driver model indicating a relationship between the first parameter set, the second parameter set, and the selected behavior for the vehicle of the at least one of the plurality of drivers, in the obtaining of the driving environment, the driving environment of the vehicle of the target driver that is the target for estimation is obtained as a parameter set, and in the estimating of the estimated behavior of the target driver, in the driver model built, the estimated behavior of the target driver is associated with the first parameter set or the second parameter set that is similar to the parameter set obtained.

13. A non-transitory computer-readable recording medium for use in a computer, the recording medium having a computer program recorded thereon for causing the computer to execute:

obtaining a personal driving environment history of each of a plurality of drivers, each of personal driving environment histories indicating one or more behaviors, of a vehicle, selected by a driver, and a driving environment associated with each of the one or more behaviors, the driving environment being a driving environment of the vehicle at a point in time of a selection of a behavior it is associated with;

building a driver model by modeling the personal driving environment history of at least one of the plurality of drivers included in the driving environment history including the personal driving environment histories of the plurality of drivers, the driver model indicating a relationship between the driving environment and a selected behavior for the vehicle of the at least one of the plurality of drivers obtaining a driving environment of a vehicle of a target driver that is a target for estimation;

estimating, in the driver model built, an estimated behavior of the target driver, the estimated behavior being associated with the driving environment obtained; and displaying a behavior candidate wherein each of the personal driving environment histories of the plurality of drivers indicates, for each of the one or more behaviors, of the vehicle, selected by the driver, a first parameter set which is a parameter set including each value of at least one environment parameter, as the driving environment of the vehicle at the point in time of selection of the behavior, and a second parameter set which is a parameter set including each value of at least one environment parameter, as the driving environment at a time a corresponding behavior was displayed as the behavior candidate, in the building of the driver model the value of each environment parameter included in the first parameter set and the value of each environment parameter included in the second parameter set indicated in the personal driving environment history of the at least one of the plurality of drivers is modeled to build the driver model indicating a relationship between the first parameter set, the second parameter set, and the selected behavior for the vehicle of the at least one of the plurality of drivers, in the obtaining of the driving environment, the driving environment of the vehicle of the target driver that is the target for estimation is obtained as a parameter set, and in the estimating of the behavior, in the driver model built, the estimated behavior of the target driver is associated with the first parameter set or the second parameter set that is similar to the parameter set obtained.

14. The information processing system according to claim 1, further comprising:

a notifier that notifies the target driver that is the target for estimation of the behavior estimated by the behavior estimation unit, before the behavior is implemented.

* * * * *